US012738064B2

(12) United States Patent
Obinata et al.

(10) Patent No.: US 12,738,064 B2
(45) Date of Patent: Sep. 15, 2026

(54) RECORDING MEDIUM, ALERT GENERATION METHOD, AND INFORMATION PROCESSING APPARATUS

(71) Applicant: Fujitsu Limited, Kawasaki (JP)

(72) Inventors: Yuya Obinata, Kawasaki (JP); Yasuhiro Aoki, Kawasaki (JP); Takuma Yamamoto, Yokohama (JP); Daisuke Uchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 237 days.

(21) Appl. No.: 18/461,005

(22) Filed: Sep. 5, 2023

(65) Prior Publication Data

US 2024/0212351 A1 Jun. 27, 2024

(30) Foreign Application Priority Data

Dec. 23, 2022 (JP) ................................ 2022-207686

(51) Int. Cl.
*G06V 20/52* (2022.01)
*G06K 7/14* (2006.01)
(Continued)

(52) U.S. Cl.
CPC ........... *G06V 20/52* (2022.01); *G06K 7/1413* (2013.01); *G06V 20/40* (2022.01); *G06V 20/68* (2022.01)

(58) Field of Classification Search
CPC ........ G06V 20/52; G06V 20/68; G06V 20/40; G06K 7/1413
See application file for complete search history.

(56) References Cited

U.S. PATENT DOCUMENTS 7,334,729 B2 2/2008 Brewington
7,909,248 B1 * 3/2011 Goncalves ........... G07G 1/0072 235/462.14
(Continued)

FOREIGN PATENT DOCUMENTS

AU 2020289885 10/2021
JP 2015-41157 3/2015
(Continued)

OTHER PUBLICATIONS

Rondán, Nicolás, et al. "Self-Checkout System Prototype for Point-of-Sale using Image Recognition with Deep Neural Networks." 2021 IEEE URUCON. IEEE, 2021. (Year: 2021).*
(Continued)

*Primary Examiner* — Nathan A Mitchell
(74) *Attorney, Agent, or Firm* — Fujitsu Intellectual Property Center

(57) ABSTRACT

A non-transitory computer-readable recording medium stores therein an alert generation program that causes a computer to execute a process including acquiring video image of a person who is scanning a code of a commodity product to an accounting machine, specifying, by analyzing the acquired video image, from among a plurality of commodity product candidates that are set in advance, a commodity product candidate that corresponds to the commodity product that is included in the video image, acquiring an item of the commodity product that has been registered to the accounting machine by scanning the code of the commodity product to the accounting machine, and generating, based on an item of the specified commodity product candidate and the item of the commodity product acquired from the accounting machine, an alert that indicates an abnormality of the commodity product that has been registered to the accounting machine.

11 Claims, 38 Drawing Sheets

(51) Int. Cl.

| | |
|---|---|
| ***G06V 20/40*** | (2022.01) |
| ***G06V 20/68*** | (2022.01) |

(56) References Cited

U.S. PATENT DOCUMENTS

| | | | | |
|---|---|---|---|---|
| 8,196,822 | B2 | 6/2012 | Goncalves | |
| 8,336,761 | B1 | 12/2012 | McCloskey | |
| 10,192,208 | B1 * | 1/2019 | Catoe | G07G 1/0054 |
| 10,650,265 | B1 | 5/2020 | Price et al. | |
| 10,664,722 | B1 * | 5/2020 | Sharma | G06N 3/09 |
| 11,727,229 | B1 | 8/2023 | Lupo et al. | |
| 11,798,380 | B2 | 10/2023 | Brakob et al. | |
| 12,014,544 | B2 | 6/2024 | Brakob et al. | |
| 12,141,652 | B1 * | 11/2024 | Kotlarsky | G06V 10/82 |
| 12,141,775 | B2 | 11/2024 | Handshaw et al. | |
| 12,400,206 | B2 * | 8/2025 | Brakob | G06V 20/52 |
| 2007/0158417 | A1 | 7/2007 | Brewington | |
| 2010/0059589 | A1 * | 3/2010 | Goncalves | G07G 1/0054<br>382/218 |
| 2012/0127314 | A1 | 5/2012 | Clements | |
| 2018/0096567 | A1 * | 4/2018 | Farrow | G06V 20/41 |
| 2019/0354770 | A1 | 11/2019 | Darvish | |
| 2020/0104565 | A1 | 4/2020 | Zucker et al. | |
| 2020/0234056 | A1 | 7/2020 | Pricochi et al. | |
| 2020/0242392 | A1 * | 7/2020 | Scott | G06K 7/1473 |
| 2020/0410825 | A1 | 12/2020 | Birnie et al. | |
| 2021/0117949 | A1 * | 4/2021 | Guo | G06T 7/70 |
| 2021/0374376 | A1 * | 12/2021 | Swope | G06K 7/1417 |
| 2021/0397800 | A1 | 12/2021 | Kim | |
| 2022/0067568 | A1 | 3/2022 | Hemmatiyan et al. | |
| 2022/0194454 | A1 * | 6/2022 | Carter | G06Q 20/325 |
| 2022/0230514 | A1 * | 7/2022 | Nakagawasai | G06V 10/751 |
| 2023/0037427 | A1 * | 2/2023 | Brakob | G06V 20/68 |
| 2023/0048635 | A1 * | 2/2023 | Kravitz | G07G 1/0018 |
| 2023/0124756 | A1 * | 4/2023 | Trim | G07G 1/0063<br>705/23 |
| 2023/0131444 | A1 * | 4/2023 | Palande | G07G 1/0009<br>705/23 |
| 2023/0177391 | A1 * | 6/2023 | Packwood | G06N 3/092<br>706/12 |
| 2023/0245535 | A1 * | 8/2023 | Xiao | G06V 20/52<br>382/103 |
| 2024/0289604 | A1 * | 8/2024 | Kotlarsky | G06K 7/1443 |

FOREIGN PATENT DOCUMENTS

| | | |
|---|---|---|
| JP | 2019-29021 | 2/2019 |
| JP | 2022-39930 | 3/2022 |
| JP | 2022-187215 | 12/2022 |
| KR | 10-2233126 B1 | 3/2021 |
| KR | 10-2419220 B1 | 7/2022 |

OTHER PUBLICATIONS

EESR—The Extended European Search Report mailed on Nov. 14, 2023 for European Patent Application No. 23196796.9 [9 pages].

KROA—Korean Office Action mailed on Mar. 12, 2025 for Korean Patent Application No. 10-2023-0127219, with English translation (12 pages).

KROA—Korean Office Action mailed Mar. 12, 2025 for Korean Patent Application No. 10-2023-0121691, with English translation (10 pages).

EESR—Extended European Search Report mailed on Feb. 8, 2024 for corresponding European Patent Application No. 23194450.5 (7 pages).

USPTO—Final Office Action mailed Oct. 28, 2025 for U.S. Appl. No. 18/452,621 [pending].

USPTO—Non-Final Office Action mailed May 9, 2025 for U.S. Appl. No. 18/452,621 [pending].

JPOA—Japanese Office Action for Japanese Patent Application No. 2022-207557 dated Jun. 18, 2026, with English translation (5 pages).

EPOA—European Office Action mailed Aug. 11, 2026 for European Patent Application No. 23194450.5 (10 pages). **All references cited in EPOA were previously disclosed.

* cited by examiner

- SHINE MUSCAT GRAPES
- PREMIUM KYOHO GRAPES
- INEXPENSIVE GRAPES A
- INEXPENSIVE GRAPES B
- IMPERFECT GRAPES A

⋮

RECORDING MEDIUM, ALERT GENERATION METHOD, AND INFORMATION PROCESSING APPARATUS

CROSS-REFERENCE TO RELATED APPLICATION

This application is based upon and claims the benefit of priority of the prior Japanese Patent Application No. 2022-207686, filed on Dec. 23, 2022, the entire contents of which are incorporated herein by reference.

FIELD

The embodiments discussed herein are related to an alert generation program, and the like.

BACKGROUND

An image recognition technology for recognizing a specific object from an image has been widely used. With this technology, for example, a region of the specific object included in the image is specified as a bounding box (Bbox). In addition, there is also a technology for performing image recognition that identifies an object by using machine learning. Furthermore, it is conceivable to apply this type of the image recognition technology to, for example, monitor a motion of purchasing performed by a customer in a store or manage work performed by workers in a factory.

In stores, such as supermarkets and convenience stores, self-service checkout registers are becoming widely used. A self-service checkout register is a point of sale (POS) checkout register system in which a user who purchases commodity products performs a series of processes between a process of reading bar code assigned to each of the commodity products and a process of calculating a payment amount. For example, by installing the self-service checkout register, it is possible to implement an improvement of a labor shortage caused by a decrease in population and suppression of labor costs. The related technology is described, for example, in Japanese Laid-open Patent Publication No. 2019-29021.

SUMMARY

According to an aspect of an embodiment, a non-transitory computer-readable recording medium stores therein an alert generation program that causes a computer to execute a process including acquiring video image of a person who is scanning a code of a commodity product to an accounting machine, specifying, by analyzing the acquired video image, from among a plurality of commodity product candidates that are set in advance, a commodity product candidate that corresponds to the commodity product that is included in the video image, acquiring an item of the commodity product that has been registered to the accounting machine by scanning the code of the commodity product to the accounting machine, and generating, based on an item of the specified commodity product candidate and the item of the commodity product acquired from the accounting machine, an alert that indicates an abnormality of the commodity product that has been registered to the accounting machine.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

At the self-service checkout register described above, there is an aspect in which it is difficult to detect a fraudulent act because a scan of a commodity product code or calculation of a payment amount is entrusted by a user himself or herself. For example, even if image recognition Artificial Intelligence (AI) is used in an aspect of detecting the fraudulent act described above, a huge amount of training data is needed for a training of the image recognition AI. However, in stores, such as supermarkets and convenience stores, many types of commodity products are present, and, in addition, a life cycle of each of the commodity products is short, so that a replacement of each of commodity products frequently occurs. It is difficult to tune the image recognition AI in accordance with the life cycle of these types of commodity products, or it is difficult to conduct a training of new image recognition AI.

In addition, at the self-service checkout register described above, a scan of a commodity product code or calculation of a payment amount is entrusted by a user himself or herself, so that there is another aspect in which it is difficult to suppress a fraudulent act, that is, a so-called label switch, conducted by re-labelling a label attached on a high-priced commodity product to a label attached on a low-priced commodity product and scanning the low-priced commodity product.

Accordingly, it is an object in one aspect of an embodiment of the present invention to provide an alert generation program, an alert generation method, and an information processing apparatus capable of suppressing a label switch conducted at a self-service checkout register.

Preferred embodiments will be explained with reference to accompanying drawings. Furthermore, the present embodiment is not limited by the embodiments. In addition, each of the embodiments can be used in any appropriate combination as long as they do not conflict with each other.

First Embodiment

Overall Configuration

Figure 1:
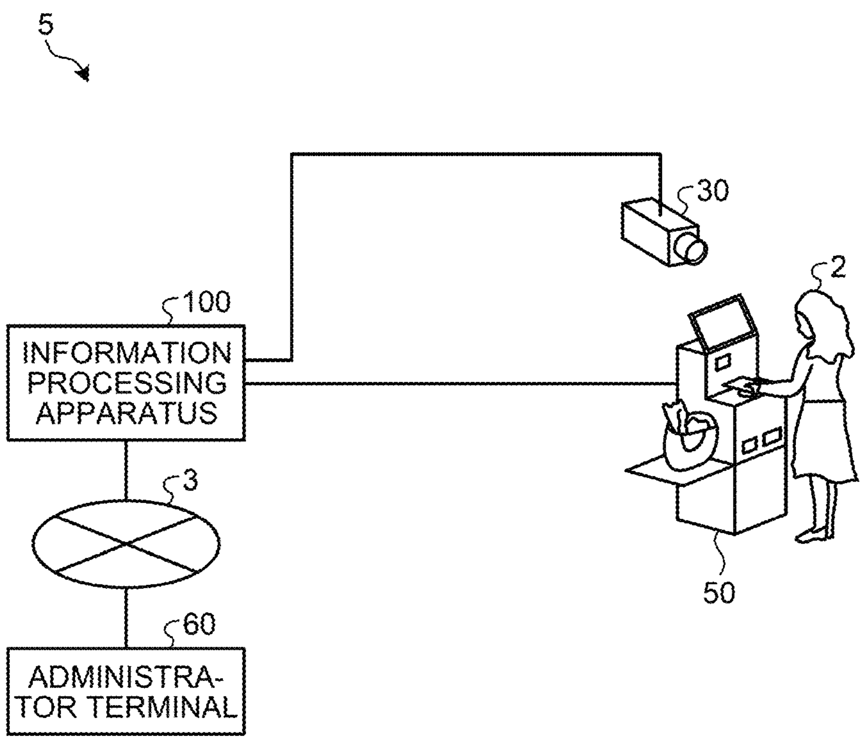
FIG. 1 is a diagram illustrating an example of the overall configuration of a self-service checkout register system according to a first embodiment.

FIG. 1 is a diagram illustrating an example of the overall configuration of a self-service checkout register system 5 according to a first embodiment. As illustrated in FIG. 1, the self-service checkout register system 5 includes a camera 30, a self-service checkout register 50, an administrator terminal 60, and an information processing apparatus 100.

The information processing apparatus 100 is one example of a computer that is connected to the camera 30 and the self-service checkout register 50. The information processing apparatus 100 is connected to the administrator terminal 60 via a network 3. The network 3 may be various communication networks that are used regardless of a wired or wireless connection. In addition, the camera 30 and the self-service checkout register 50 may be connected to the information processing apparatus 100 via the network 3.

The camera 30 is one example of an image capturing device that captures a video image of a region including the self-service checkout register 50. The camera 30 transmits data on the video image to the information processing apparatus 100. In a description below, the data on the video image is sometimes referred to as "video image data".

In the video image data, a plurality of image frames obtained in time series are included. A frame number is assigned to each of the image frames in an ascending order in time series. A single image frame is image data of a still image that is captured by the camera 30 at a certain timing.

The self-service checkout register 50 is one example of an accounting machine in which a user 2 who purchases a commodity product registers the commodity product to be purchased at a checkout register and calculates a payment amount (payment) by himself or herself, and is called "Self-checkout", "automated checkout", "self-checkout machine", "self-check-out register", or the like. For example, if the user 2 moves a commodity product that is targeted for a purchase to a scan region included in the self-service checkout register 50, the self-service checkout register 50 scans a code that is printed or attached on the commodity product, and registers the commodity product that is targeted for the purchase. Hereinafter, a process in which a commodity product is registered to the self-service checkout register 50 is sometimes referred to as "registered at a checkout register". In addition, the "code" mentioned here may be a bar code that meets the standards defined by the Japanese Article Number (JAN), the Universal Product Code (UPC), the European Article Number (EAN), or the like, or may be another two-dimensional code.

The user 2 repeatedly performs a motion of registering at a checkout register described above, and, when a scan of each of the commodity products has been completed, the user 2 operates a touch panel of the self-service checkout register 50, and makes a request for calculation of a payment amount. When the self-service checkout register 50 receives the request for calculation of the payment amount, the self-service checkout register 50 presents the number of commodity products targeted for the purchase, an amount of money for the purchase, and the like, and then, performs a process of calculation of the payment amount. The self-service checkout register 50 registers, as self-service checkout register data (commodity product information) in a storage unit, information on the commodity products scanned in a period of time between a point at which the user 2 starts the scan and a point at which the user 2 makes the request for calculation of the payment amount, and then, transmits the information to the information processing apparatus 100.

The administrator terminal 60 is one example of a terminal device that is used by an administrator of the store. For example, the administrator terminal 60 may be a mobile terminal device carried by the administrator of the store. In addition, the administrator terminal 60 may be a personal computer, such as a desktop personal computer or a laptop personal computer. In this case, the administrator terminal 60 may be arranged in, for example, a backyard of the store, or may be arranged in an office located outside of the store. As one aspect, the administrator terminal 60 receives various notifications from the information processing apparatus 100. In addition, here, a terminal device that is used by the administrator of the store is cited as an example; however, the administrator terminal 60 may be a terminal device that is used by anyone who is involved in the store.

With this configuration, the information processing apparatus 100 acquires a video image on a person who is scanning a code of a commodity product to the self-service checkout register 50. Then, the information processing apparatus 100 specifies, on the basis of the acquired video image and a machine learning model (zero-shot image classifier), from among a plurality of commodity product candidates (texts) that are set in advance, a commodity product candidate that corresponds to the commodity product that is included in the video image. After that, the information processing apparatus 100 acquires, by scanning the code of the commodity product to the self-service checkout register 50, an item of the commodity product that has been identified by the self-service checkout register 50. After that, the information processing apparatus 100 generates, on the basis of an item of the specified commodity product candidate and the item of the commodity product acquired from the self-service checkout register 50, an alert that indicates an abnormality of the commodity product that has been registered to the self-service checkout register 50.

As a result, as one aspect, the information processing apparatus 100 is able to output an alert at the time of detection of a label switch conducted in the self-service checkout register 50, and is thus able to suppress the label switch conducted in the self-service checkout register 50.

2. Functional Configuration

Figure 2:
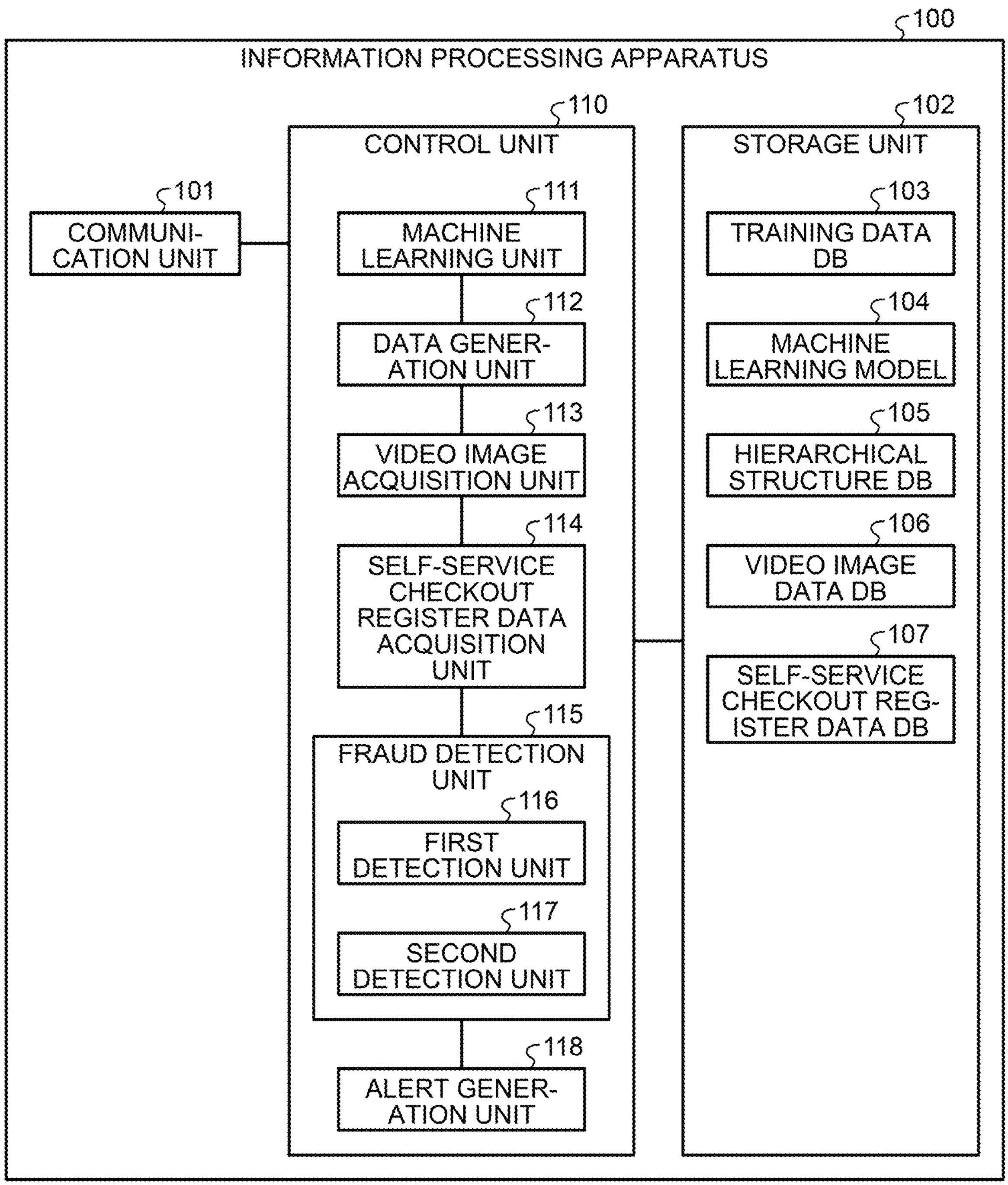
FIG. 2 is a functional block diagram illustrating a functional configuration of an information processing apparatus according to the first embodiment.

FIG. 2 is a functional block diagram illustrating a functional configuration of the information processing apparatus 100 according to the first embodiment. As illustrated in FIG. 2, the information processing apparatus 100 includes a communication unit 101, a storage unit 102, and a control unit 110.

2-1. Communication Unit

The communication unit 101 is a processing unit that controls communication with another device and is implemented by, for example, a communication interface or the like. For example, the communication unit 101 receives video image data from the camera 30, and outputs a processing result obtained by the control unit 110 to the administrator terminal 60.

2-2. Storage Unit

The storage unit 102 is a processing unit that stores therein various kinds of data, a program executed by the control unit 110, or the like, and is implemented by, for example, a memory, a hard disk, or the like. The storage unit 102 stores therein a training data DB 103, a machine learning model 104, a hierarchical structure DB 105, a video image data DB 106, and a self-service checkout register data DB 107.

2-2-1. Training Data DB

Figure 3:
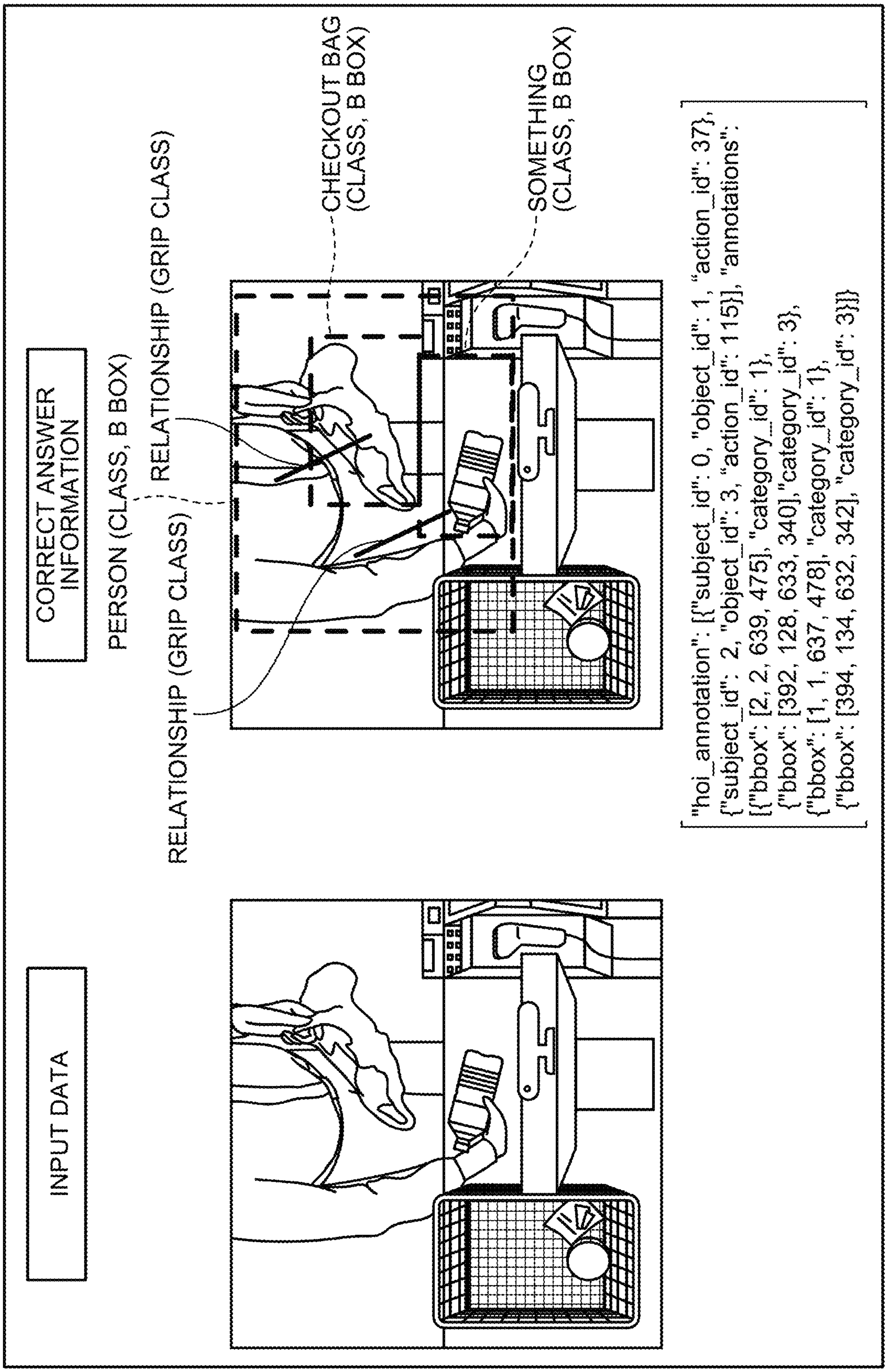
FIG. 3 is a diagram illustrating an example of training data that is used for a first machine learning model.

The training data DB 103 is a database that stores therein data that is used for a training of a first machine learning model 104A. For example, a case will be described by using an example illustrated in FIG. 3 in which Human Object Interaction Detection (HOID) is used for the first machine learning model 104A. FIG. 3 is a diagram illustrating training data that is used for the first machine learning model 104A. As illustrated in FIG. 3, each of the pieces of training data includes image data that corresponds to input data, and correct answer information that has been set to the associated image data.

In the correct answer information, a class of a person and an object that are the detection target, a class that indicates an interaction between a person and an object, and a bounding box (Bbox indicating region information on an object) that indicates a region of each of the classes are set. For example, as the correct answer information, region information on a Something class that indicates an object that is a commodity product or the like and that is other than a checkout bag, region information on a class of a person that indicates a user who purchases a commodity product, and a relationship (grip class) that indicates an interaction between the Something class and the class of the person are set. In other words, as the correct answer information, information on an object that is being gripped by a person is set.

In addition, as the correct answer information, region information on a class of a checkout bag that indicates a checkout bag, region information of a class of a person that indicates a user who uses the checkout bag, and a relationship (grip class) that indicates an interaction between the class of the checkout bag and the class of the person are set. In other words, as the correct answer information, information on the checkout bag that is being gripped by the person is set.

In general, if a Something class is learned by using a object identification (object recognition), all of the backgrounds, clothes, small goods, and the like that are not related to a task are consequently detected. In addition, all of these items correspond to Something, so that a lot of Bboxes are just identified in the image data and nothing is recognized. In a case of the HOID, it is possible to recognize a special relationship (there may be another case indicating sitting, operating, etc.) that indicates an object that is held by a person, so that it is possible to use for a task (for example, a fraud detection task to be performed at the self-service checkout register) as meaningful information. After an object has been detected as Something, a checkout bag or the like is identified as a unique class represented by Bag (checkout bag). The checkout bag is valuable information for the fraud detection task performed at the self-service checkout register, but is not valuable information for other tasks. Accordingly, it is worth to use on the basis of unique knowledge of the fraud detection task that is performed at the self-service checkout register in a course of a motion of taking out a commodity product from a basket (shopping basket) and putting the commodity product into the bag, and thus, a useful effect is obtained.

2-2-2. Machine Learning Model

A description will be given here by referring back to FIG. 2. The machine learning model 104 indicates a machine learning model that is used for a fraud detection task performed on the self-service checkout register 50. As an example of this kind of the machine learning model 104, the first machine learning model 104A that is used from an aspect in which, for example, an object, such as a commodity product, that is being gripped by the user 2 is specified, and a second machine learning model 104B that is used from an aspect in which an item of the commodity product is specified may be included.

The first machine learning model 104A may be implemented by, as merely one example, the HOID described above. In this case, the first machine learning model 104A identifies, from the input image data, a person, a commodity product, and a relationship between the person and the commodity product, and then outputs an identification result. For example, the items of "the region information on a class of a person, the region information on a class of a commodity product (object), and an interaction between the person and the commodity product" are output. In addition, here, a case will be described as an example in which the first machine learning model 104A is implemented by the HOID; however, the case may be implemented by a machine learning model using various neural networks or the like.

The second machine learning model 104B may be implemented by, as merely one example, a zero-shot image classifier. In this case, the second machine learning model 104B is constituted such that a list of texts and an image are used as an input, and a text that has the maximum degree of similarity to the image and that are included in the list of the texts is output as a label of the input image.

Here, as an example of the zero-shot image classifier described above, Contrastive Language-Image Pre-training (CLIP) may be included. The CLIP mentioned here implements embedding of a plurality of types of images and texts, what is called multi-modal, with respect to a feature space. In other words, in CLIP, by training an image encoder and a text encoder, it is possible to implement embedding in which a distance between vectors is closer regarding a pair of an image and a text that have a closer meaning. For example, the image encoder may be implemented by Vision Transformer (ViT), or may be implemented by a convolutional neural network, such as a Residual Neural Network (ResNet). In addition, the text encoder may be implemented by a Transformer constituted of Generative Pre-trained Transformer (GPT) based architectures, or may be implemented by a regression typed neural network, such as Long Short-Term Memory (LSTM).

2-2-3. Hierarchical Structure DB

The hierarchical structure DB 105 is a database that stores therein a hierarchical structure in which an attribute of a commodity product is listed for each of a plurality of hierarchies. The hierarchical structure DB 105 is data that is generated by a data generation unit 112, which will be described later, and corresponds to one example of reference source data that is referred to by the zero-shot image classifier that is used as one example of the second machine learning model 104B. For example, for the text encoder included in the zero-shot image classifier, the list in which the texts that corresponds to the respective attributes of the commodity products belonging to the same hierarchy are listed is referred to in the order from a hierarchy at an upper level, that is, a shallow hierarchy, from among the hierarchies that are included in the hierarchical structure DB 105.

2-2-4. Video Image Data DB

The video image data DB 106 is a database that stores therein the video image data that has been captured by the camera 30 that is installed in the self-service checkout register 50. For example, the video image data DB 106 stores therein image data, in units of frames, that is acquired by the camera 30 on the basis of each of the self-service checkout registers 50 or each of the cameras 30, an output result of the HOID obtained by inputting the acquired image data to the HOID, and the like.

2-2-5. Self-Service Checkout Register Data DB

The self-service checkout register data DB 107 is a database that stores therein various kinds of data acquired from the self-service checkout register 50. For example, the self-service checkout register data DB 107 stores therein, for each of the self-service checkout register 50, an item name of a commodity product and the number of purchased commodity products that have been registered at a checkout register as the commodity products targeted for a purchase, a billing amount that is a total amount of money of all of the commodity products targeted for the purchase, and the like.

2-3. Control Unit

The control unit 110 is a processing unit that manages the entirety of the information processing apparatus 100 and is implemented by, for example, a processor or the like. The control unit 110 includes a machine learning unit 111, the data generation unit 112, a video image acquisition unit 113, a self-service checkout register data acquisition unit 114, a fraud detection unit 115, and an alert generation unit 118. In addition, the machine learning unit 111, the data generation unit 112, the video image acquisition unit 113, the self-service checkout register data acquisition unit 114, the fraud detection unit 115, and the alert generation unit 118 are implemented by an electronic circuit that is included in a processor or implemented by a process or the like that is executed by the processor.

2-3-1. Machine Learning Unit

Figure 4:
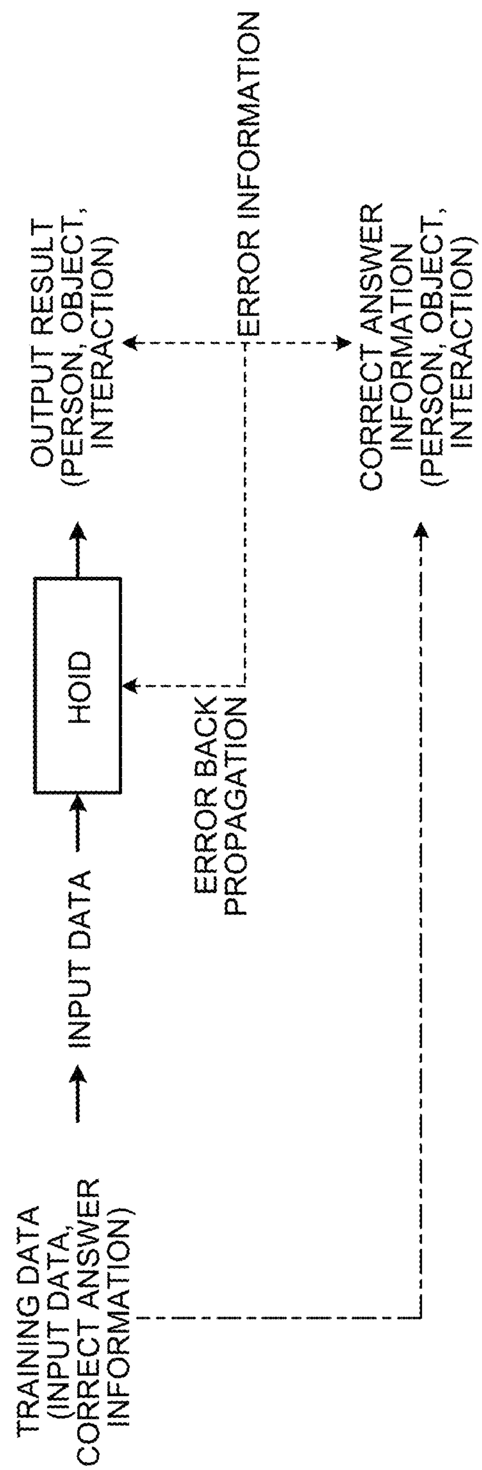
FIG. 4 is a diagram illustrating machine learning performed on the first machine learning model.

The machine learning unit 111 is a processing unit that performs machine learning on the machine learning model 104. As one aspect, the machine learning unit 111 performs machine learning on the first machine learning model 104A by using each of the pieces of training data that are stored in the training data DB 103. FIG. 4 is a diagram illustrating machine learning performed on the first machine learning model 104A. FIG. 4 illustrates an example in which the HOID is used for the first machine learning model 104A. As illustrated in FIG. 4, the machine learning unit 111 inputs the input data included in the training data to the HOID, and acquires an output result of the HOID. In the output result, the class of the person, the class of the object, the interaction between the person and the object, and the like that are detected by the HOID are included. Then, the machine learning unit 111 calculates error information indicating an error between correct answer information on the training data and the output result of the HOID, and performs machine learning on the HOID by using error back propagation such that the error is decreased. Consequently, the first machine learning model 104A that has been trained is generated. The first machine learning model 104A that has been trained in this way is stored in the storage unit 102.

As another aspect, the machine learning unit 111 performs machine learning on the second machine learning model 104B. Here, an example in which the second machine learning model 104B is trained by the machine learning unit 111 included in the information processing apparatus 100 will be described; however, the second machine learning model 104B that has been trained is released on the Internet or the like, so that machine learning does not always need to be performed by the machine learning unit 111. In addition, the machine learning unit 111 is able to perform fine-tune on the second machine learning model 104B in the case where accuracy of the second machine learning model 104B is insufficient after the second machine learning model 104B that has been trained is used for an operation of the self-service checkout register system 5.

Figure 5:
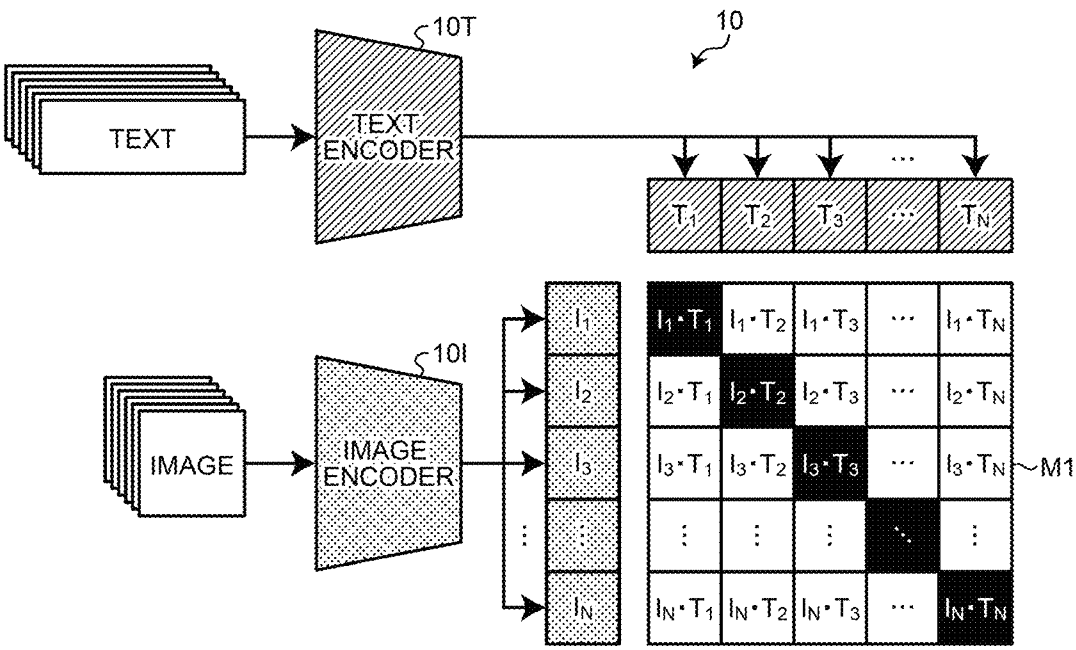
FIG. 5 is a diagram illustrating machine learning performed on a second machine learning model.

FIG. 5 is a diagram explaining machine learning performed on the second machine learning model 104B. In FIG. 5, a CLIP model 10 is illustrated as an example of the second machine learning model 104B. As illustrated in FIG. 5, for a training of the CLIP model 10, a pair of an image and a text is used as training data. For this type of training data, it is possible to use data set, what is called a WebImageText (WIT), obtained by extracting a pair of an image and a text that has been described as a caption of the image from a Web page on the Internet. For example, a pair of a photograph in which a dog is captured, or an image, such as a picture, in which an illustration of a dog is depicted and a text of "photograph of the dog" that is described as the caption of the photograph or the image is used as the training data. In this way, by using WIT for the training data in this way, it is possible to eliminate an operation of labelling and acquire a large amount of training data.

From among these pairs of the images and the texts, the image are input to an image encoder 10I, and the texts are input to a text encoder 10T. The image encoder 10I in which the images have been input outputs vectors in each of which the received image is embedded in a feature space. In contrast, the text encoder 10T in which the texts have been input outputs vectors in each of which the received text is embedded in a feature space.

For example, FIG. 5 exemplifies a mini batch with a batch size N containing the training data including an N pairs constituted of a pair of an image 1 and a text 1, a pair of an image 2 and a text 2, . . . , and a pair of an image N and a text N. In this case, by inputting the N pairs of images and texts to the image encoder 10I and the text encoder 10T, respectively, it is possible to obtain a similarity matrix M1 of N×N embedded vectors. In addition, the "degree of similarity" mentioned here may be, as merely one example, an inner product or cosine similarity between the embedded vectors.

Here, for a training of the CLIP model 10, various formats are used for a caption of a text on a Web and thus the labels are undefined, so that an objective function called Contrastive objective is used.

In Contrastive objective, in a case of an $i^{th}$ image in the mini batch, an $i^{th}$ text corresponds to a correct pair, so that the $i^{th}$ text is set as a positive example, whereas all of the other texts are set as negative examples. In other words, a single positive example and N−1 negative examples are set to each of the pieces of training data, so that N positive examples and $N^2$−N negative examples are consequently generated in the entirety of the mini batch. For example, in a case of an example of the similarity matrix M1, elements of N diagonal components that are indicated by an invert display of black and white are set as a positive example, and $N^2$−N elements that are displayed in white are set as a negative example.

In the similarity matrix M1 having a structure in this way, parameters of the image encoder 10I and the text encoder 10T that maximize the degree of similarity of the N pairs corresponding to the positive examples and that minimize the degree of similarity of the $N^2$−N pairs corresponding to the negative examples are trained.

For example, taking the $1^{st}$ image 1 as an example, the $1^{st}$ text is set as a positive example and the $2^{nd}$ text and the subsequent texts are set as negative examples, and then, a loss, for example, a cross entropy error, in the row direction of the similarity matrix M1 is calculated. By calculating this kind of loss for each of the N images, the losses related to the respective images are obtained. In contrast, taking the $2^{nd}$ text 2 as an example, the $2^{nd}$ image is set as a positive example and all of the other images other than the $2^{nd}$ image are set as negative examples, and then, each of the losses is calculated in the column direction of the similarity matrix M1. By calculating this kind of loss for each of the N texts, the losses related to the respective texts are obtained. An update of the statistical value of the losses related to these images and the losses about these texts, for example, the parameters that minimize the average, is performed on the image encoder 10I and the text encoder 10T.

As a result of training the image encoder 10I and the text encoder 10T that minimize this type of Contrastive objective, the CLIP model 10 that has been trained is generated.

2-3-2. Data Generation Unit

A description will be given here by referring back to FIG. 2. The data generation unit 112 is a processing unit that generates the reference source data that is referred to by the second machine learning model 104B. As merely one example, the data generation unit 112 generates a list of the texts, the so-called class caption, that are input to the zero-shot image classifier that is one example of the second machine learning model 104B.

Figures 6, 7:
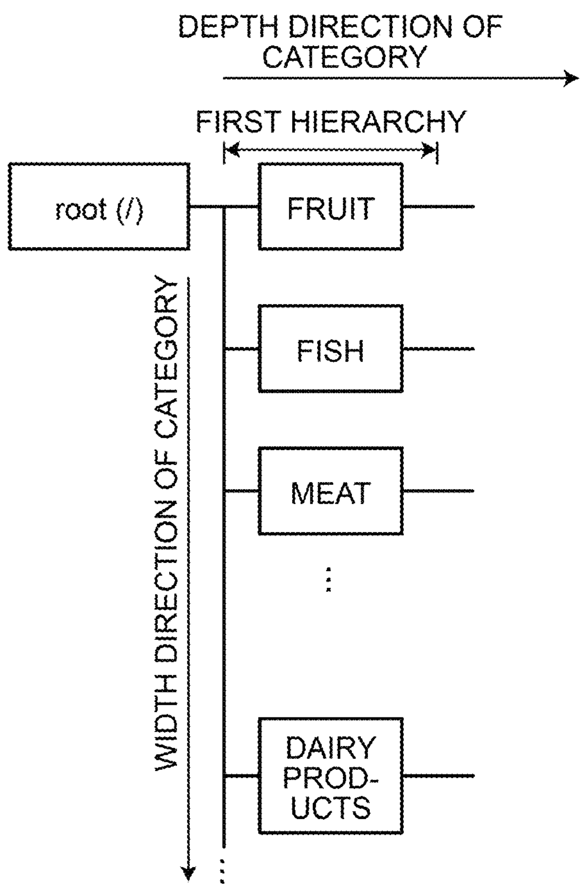
FIG. 6 is a diagram illustrating one example of a commodity product list.
FIG. 7 is a diagram illustrating one example of a template.

More specifically, the data generation unit 112 acquires a commodity product list of commodity products provided in stores, such as supermarkets or convenience stores. Acquiring this kind of the commodity product list is implemented by acquiring a list of commodity products that have been registered to commodity product master in which, as merely one example, the commodity products provided in a store are stored as a database. Consequently, as merely one example, the commodity product list illustrated in FIG. 6 is acquired. FIG. 6 is a diagram illustrating one example of the commodity product list. In FIG. 6, as an example of the commodity product item related to fruit "grapes" from among all of the commodity products that are sold in the store, "Shine Muscat grapes", "premium Kyoho grapes", "inexpensive grapes A", "inexpensive grapes B" and "imperfect grapes A" are selectively illustrated.

Furthermore, as merely one example, the data generation unit 112 acquires a template of a hierarchical structure illustrated in FIG. 7. Regarding acquiring of the template of the hierarchical structure, the template is able to be generated by setting the categories of the commodity products of, for example, "fruit", "fish", "meat", and the like that are sold in the store are set as the elements that are included in a first hierarchy. FIG. 7 is a diagram illustrating one example of the template. As illustrated in FIG. 7, the template has a hierarchical structure in which a root is set as the highest level. Furthermore, in the first hierarchy in which a depth from the root is "1", the categories of "fruit", "fish", "meat", . . . , "dairy products" and the like are included as the elements (nodes). In addition, in FIG. 7, from the aspect of simplifying the explanation, the template in which the categories of the commodity products are the first hierarchy has been exemplified; however, a large classification of the commodity products, for example, a classification of fruit, fish, and the like may be set as the first hierarchy, and a small classification of the commodity products, for example, a classification of grapes, apple, and the like may be set as a second hierarchy.

Subsequently, the data generation unit 112 adds the attribute, that is, for example, the attribute related to a "price", or the like, that has been assigned by the system definition or the user definition for each element that is included in the lowermost hierarchy, that is, for example, the first hierarchy at this point of time, in the template of the hierarchical structure. Hereinafter, the attribute related to the "price" is sometimes referred to as a "price attribute". In addition, in the following, as merely one example of the attribute, the price attribute is cited as an example and details thereof will be described later, however; as an additional remark, another attribute related to, for example, a "color", a "shape", "quantity in stock", or the like may also be added.

Figure 8:
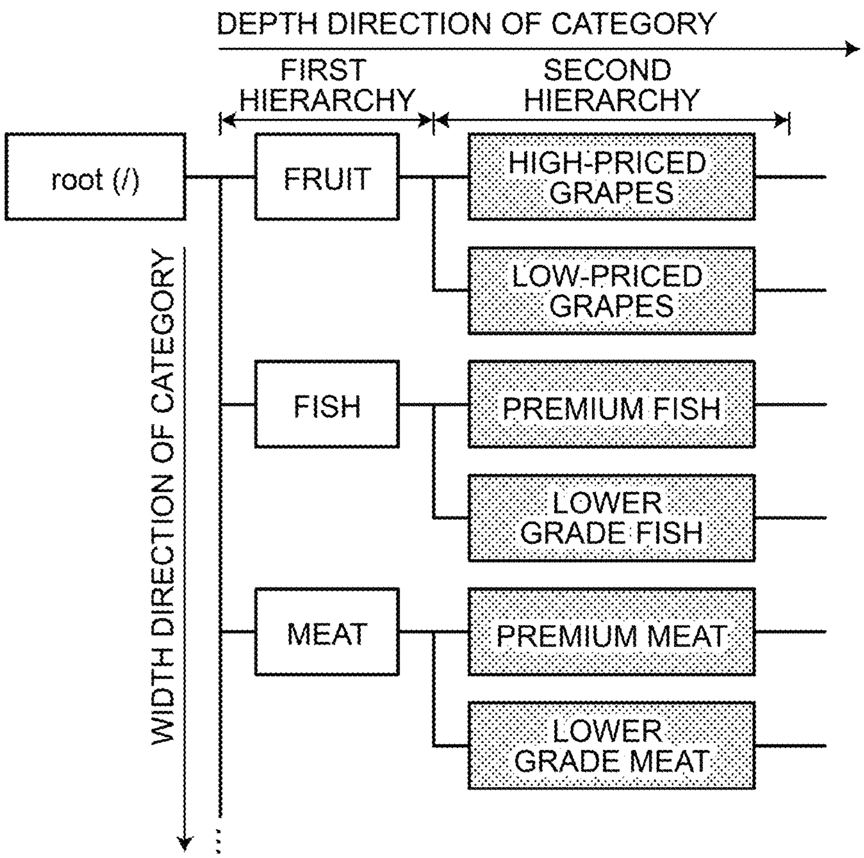
FIG. 8 is a diagram (1) explaining generation of hierarchical structure data.

FIG. 8 is a diagram (1) explaining generation of the hierarchical structure data. In FIG. 8, the elements of the portions corresponding to the template illustrated in FIG. 7 are indicated in white, and the portions of the attributes added to the respective elements are indicated by the hatching. As illustrated in FIG. 8, in each of the elements included in the first hierarchy, the attribute related to the "price" is added. For example, taking the element "fruit" included in the first hierarchy as an example, an element "high-priced grapes" included in the second hierarchy and an element "low-priced grapes" included in the second hierarchy are added to the element "fruit" that is included in the first hierarchy. Here, in FIG. 8, as merely one example, an example in which two price attributes are added to each of the elements will be described; however, the example is not limited to this. For example, it may be possible to add the number of price attributes that is less than two or three or more may be added to each element. For example, three price attributes of the element "high-priced grapes" included in the second hierarchy, the element "mid-priced grapes" included in the second hierarchy, and the element "low-priced grapes" included in the second hierarchy may be added to the element "fruit" that is included in the first hierarchy. In addition to this, it is also possible to change the number of price attributes that are assigned to in accordance with the elements that are included in the first hierarchy. In this case, it is possible to increase the number of price attributes as the number of commodity product items belonging to the elements included in the first hierarchy or as a variation in prices is increased.

Then, the data generation unit 112 extracts, for each element included in the lowermost hierarchy constituted in the hierarchical structure that is being generated, that is, for each element k corresponding to the price attribute belonging to the second hierarchy at the present moment, a commodity product item in which the degree of similarity to the element k is equal to or larger than a threshold th1.

Figure 9:
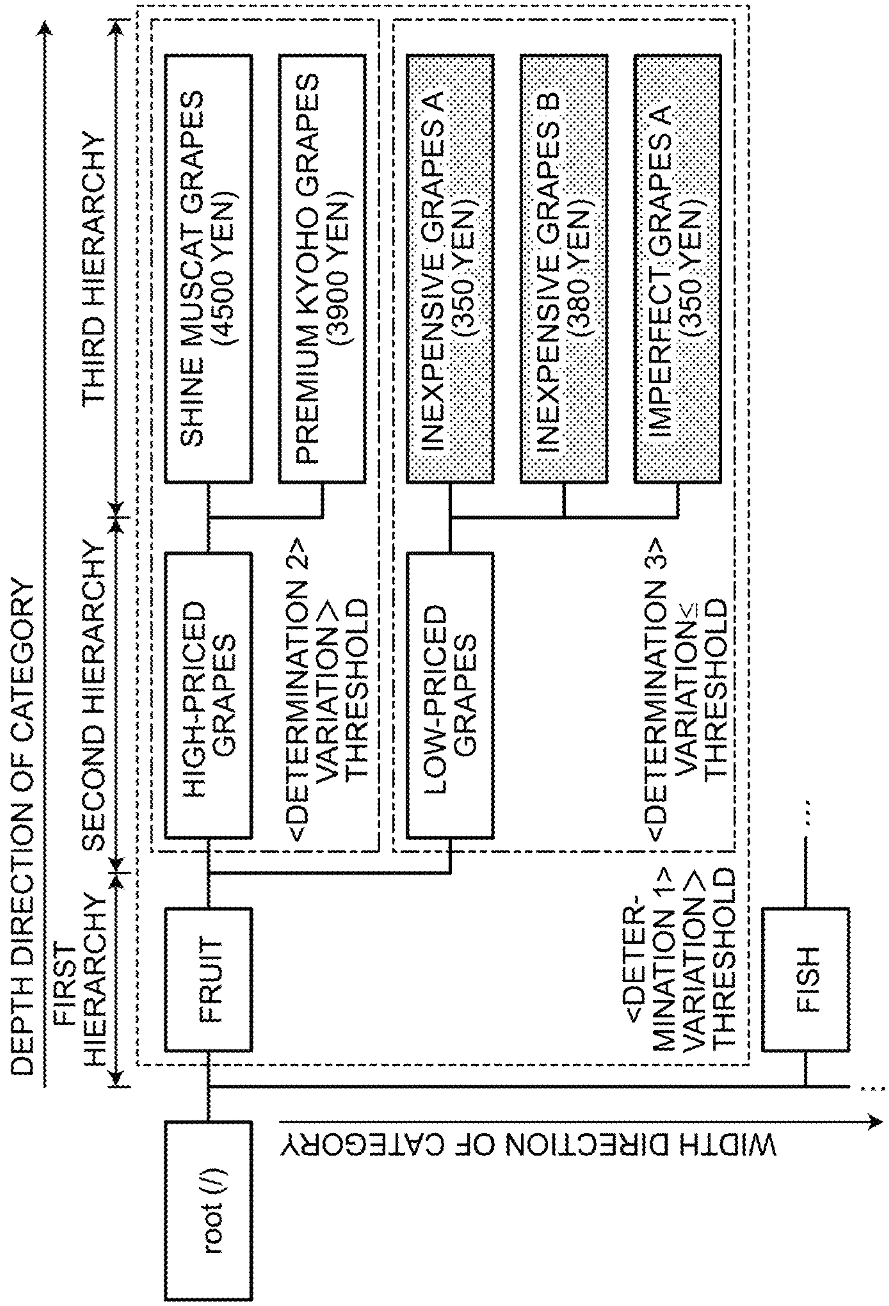
FIG. 9 is a diagram (2) explaining generation of hierarchical structure data.

FIG. 9 is a diagram (2) explaining generation of the hierarchical structure data. In FIG. 9, an example related to the category "fruit" of the commodity product is selectively illustrated. For example, an extraction example of the commodity product item related to the element "high-priced grapes" included in the second hierarchy illustrated in FIG. 9 will be described. In this case, an embedded vector of the element "high-priced grapes" that is included in the second hierarchy is obtained by inputting the text "high-priced grapes" that corresponds to the element "high-priced grapes" in the second hierarchy to the text encoder 10T included in the CLIP model 10, an embedded vector of the element "high-priced grapes" that is included in the second hierarchy is obtained. In contrast, an embedded vector of each of the commodity product items is obtained by inputting, for each of the commodity product items included in the commodity product list illustrated in FIG. 7, the text with respect to each of the respective commodity product items to the text encoder 10T that is included in the CLIP model 10. Then, the degree of similarity between the embedded vector of the element "high-priced grapes" included in the second hierarchy and the embedded vector of each of the commodity product items is calculated. As a result, for the element "high-priced grapes" included in the second hierarchy, the commodity product items of "Shine Muscat grapes" and "premium Kyoho grapes" in each of which the degree of similarity to the embedded vector of the element "high-priced grapes" included in the second hierarchy is equal to or larger than the threshold th1 are extracted. Similarly to this, for the element "low-priced grapes" included in the second hierarchy, the commodity product items of "inexpensive grapes A", "inexpensive grapes B", and "imperfect grapes A" in each of which the degree of similarity to the embedded vector of the element "low-priced grapes" included in the second hierarchy is equal to or larger than the threshold th1 are extracted. In addition, here, an example in which the commodity product items are extracted by using a matching of the embedded vectors between the texts has been described; however, one or both of the embedded vectors may be used as the embedded vectors of an image.

After that, the data generation unit 112 calculates, for each element n included in the $m^{th}$ hierarchy from the first hierarchy to the $M-1^{th}$ hierarchy excluding the $M^{th}$ hierarchy that is the lowermost hierarchy from among all of the M hierarchies that are included in the hierarchical structure that is being generated, a variation in prices V of the commodity product items belonging to the element n. After that, the data generation unit 112 determines whether or not the variation in prices V is equal to or less than a threshold th2. At this time, if the variation in prices V is equal to or less than the threshold th2, the data generation unit 112 decides to abort the retrieval of the hierarchies that are ranked lower than the hierarchy in which the element n belongs. In contrast, if the variation in prices V is not equal to or less than the threshold th2, the data generation unit 112 increments a loop counter m of the hierarchy by one, and iterates calculation of the variation in prices and threshold determination on the variation related to each of the elements that belong to the hierarchy that is ranked at one level lower than the hierarchy in which the element n belongs.

As merely one example, a case in which the first hierarchy illustrated in FIG. 9 is set as the $m^{th}$ hierarchy, and the element "fruit" included in the first hierarchy is set as an element n will be described as an example. In this case, as indicated by the frame border using the broken line illustrated in FIG. 9, in the element "fruit" included in the first hierarchy, five commodity product items of Shine Muscat grapes (4500 yen), premium Kyoho grapes (3900 yen), inexpensive grapes A (350 yen), inexpensive grapes B (380 yen), imperfect grapes A (350 yen), and the like are included. At this time, a variation in prices $V_{11}$ is not equal to or less than the threshold th2 (determination 1 in FIG. 9), so that a search conducted in the lower hierarchy is continued. That is, a loop counter m of the hierarchy is incremented by one, and the second hierarchy is set as the $m^{th}$ hierarchy.

In the following, a case in which the second hierarchy illustrated in FIG. 9 is set as the $m^{th}$ hierarchy and the element "high-priced grapes" included in the second hierarchy is set as the element n will be described as an example. In this case, in the element "high-priced grapes" included in the second hierarchy, as indicated by the frame border using the dot-and-dash line illustrated in FIG. 9, two commodity product items of Shine Muscat grapes (4500 yen), premium Kyoho grapes (3900 yen), and the like are included. At this time, a variation in prices $V_{21}$ is not equal to or less than the threshold th2 (determination 2 in FIG. 9), but the element "high-priced grapes" included in the second hierarchy is the element included in the hierarchy that is ranked one level higher than the third hierarchy that is the lowermost hierarchy, so that a search is ended.

Furthermore, a case in which the second hierarchy illustrated in FIG. 9 is set as the $m^{th}$ hierarchy and the element "low-priced grapes" included in the second hierarchy is set as the element n will be described as an example. In this case, in the element "low-priced grapes" included in the second hierarchy, as indicated by the frame border using the chain double-dashed line illustrated in FIG. 9, three commodity product items of inexpensive grapes A (350 yen), inexpensive grapes B (380 yen), imperfect grapes A (350 yen), and the like are included. At this time, a variation in prices $V_{22}$ is equal to or less than the threshold th2 (determination 3 in FIG. 9), so that it is decided to abort a search conducted in the lower hierarchy.

After that, the data generation unit 112 iterates the search until it is decided to abort the search that is started for each element included in the first hierarchy, or until all of the elements included in the $M-1^{th}$ hierarchy have been searched. Then, the data generation unit 112 decides the depth of each of the routes in the hierarchical structure on the basis of the determination result of the variation in prices obtained at the time of the search described above.

As merely one example, if an element in which the variation in prices of the commodity product item is equal to or less than the threshold th2 is present in a route between the element at the highest level and the element at the lowermost hierarchy included in all of the M hierarchies constituted in the hierarchical structure, the data generation unit 112 sets the subject element as a terminal node. In contrast, if an element in which the variation in prices of the commodity product item is equal to or less than the threshold th2 is not present in a route between the element at the highest level and the element at the lowermost hierarchy included in all of the M hierarchies constituted in the hierarchical structure, the data generation unit 112 sets the element corresponding to the commodity product item as the terminal node.

For example, in the example illustrated in FIG. 9, a route connecting the element "fruit" in the first hierarchy, the element "high-priced grapes" in the second hierarchy, and the element "Shine Muscat grapes" in the third hierarchy or the element "premium Kyoho grapes" in the third hierarchy will be cited as an example. In this route, it is determined that both of the variation in prices $V_{11}$ of the element "fruit" in the first hierarchy and the variation in prices $V_{21}$ of the element "high-priced grapes" in the second hierarchy are not equal to or less than the threshold th2. Accordingly, in this route, the element "Shine Muscat grapes" in the third hierarchy and the element "premium Kyoho grapes" in the third hierarchy are set as the terminal nodes.

In the following, in the example illustrated in FIG. 9, a route connecting the element "fruit" in the first hierarchy, the element "low-priced grapes" in the second hierarchy, and one of the element "inexpensive grapes A" in the third hierarchy, the element "inexpensive grapes B" in the third hierarchy, and the element "imperfect grapes A" in the third hierarchy will be cited as an example. In this route, it is determined that the variation in prices $V_{11}$ of the element "fruit" in the first hierarchy is not equal to or less than the threshold th2, but it is determined that the variation in prices $V_{22}$ of the element "low-priced grapes" in the second hierarchy is equal to or less than the threshold th2. Accordingly, in this route, the element "low-priced grapes" in the second hierarchy is set as the terminal node.

Figure 10:
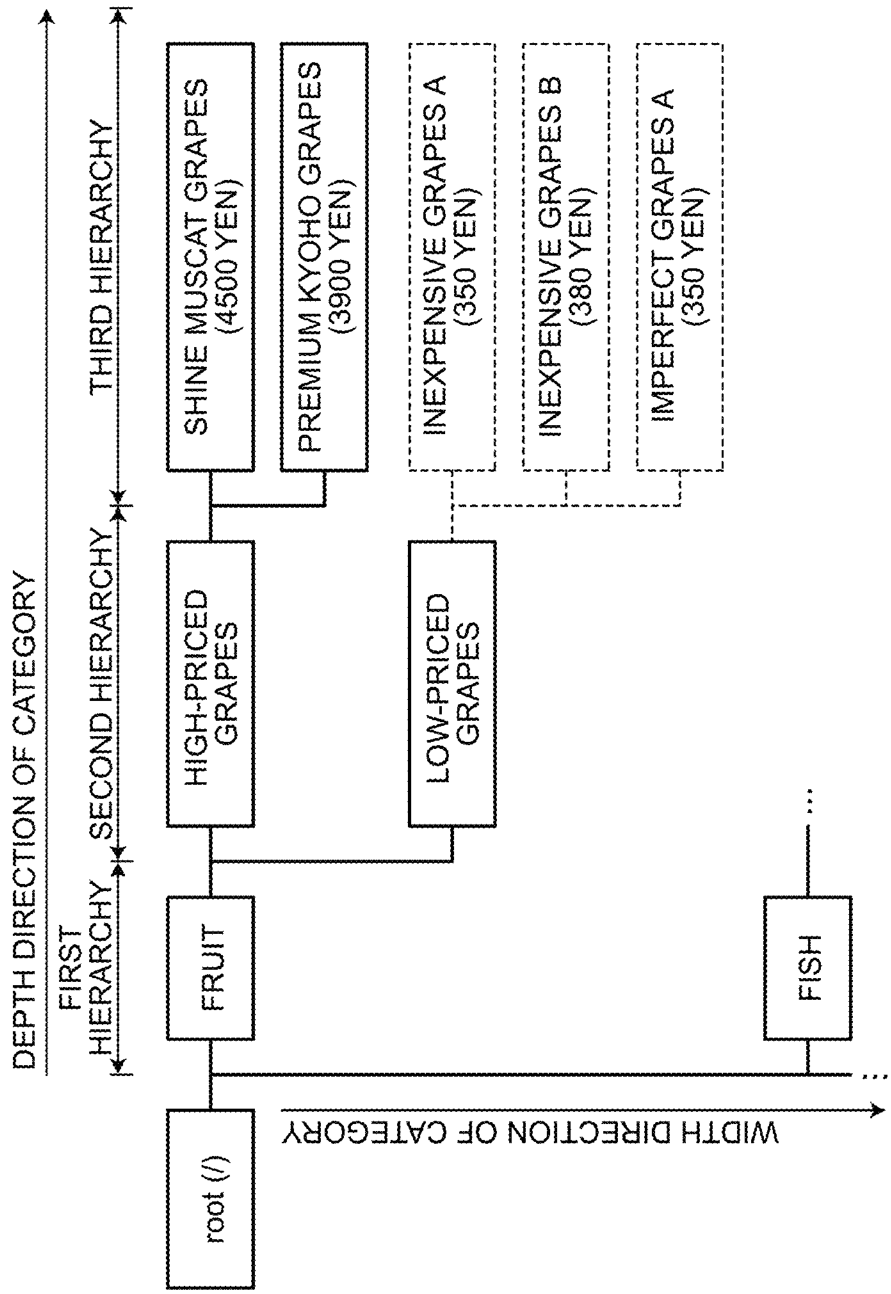
FIG. 10 is a diagram illustrating one example of a hierarchical structure.

In this way, the hierarchical structure illustrated in FIG. 10 has been determined as a result of decision of the depth of each of the routes of the M hierarchies in the hierarchical structure illustrated in FIG. 9. The hierarchical structure generated in this way is stored in the hierarchical structure DB 105 included in the storage unit 102.

FIG. 10 is a diagram illustrating one example of the hierarchical structure. In FIG. 10, the elements in each of which the variation in prices of the commodity product item is equal to or less than the threshold th2 and that are located subsequent to the terminal node are indicated by the broken lines. As illustrated in FIG. 10, in the hierarchical structure, a route connecting the element "fruit" in the first hierarchy, the element "high-priced grapes" in the second hierarchy, and one of the element "Shine Muscat grapes" in the third hierarchy and the element "premium Kyoho grapes" in the third hierarchy is included. Furthermore, in the hierarchical structure, a route connecting the element "fruit" in the first hierarchy and the element "low-priced grapes" in the second hierarchy is included.

A list of the class captions are input to the zero-shot image classifier that is one example of the second machine learning model 104B in accordance with the hierarchical structure as described above. For example, as the list of the class captions of the first hierarchy, the list of the text "fruit", the text "fish", and the like is input to the text encoder 10T included in the CLIP model 10. At this time, it is assumed that "fruit" is output by the CLIP model as the label of the class that corresponds to an input image with respect to the image encoder 10I. In this case, as the list of the class captions of the second hierarchy, a list of the text "high-priced grapes" and the text "low-priced grapes" is input to the text encoder 10T that is included in the CLIP model 10.

In this way, a list in which the texts corresponding to the attributes of the commodity products belonging to the same hierarchy are listed in the order of the upper level hierarchy constituted in the hierarchical structure is input as the class captions that are used in the CLIP model 10. Consequently, it is possible to allow the CLIP model 10 to narrow down the candidates for the commodity product items in units of hierarchies. Consequently, it is possible to reduce the processing cost for task implementation as compared to a case in which a list of the texts corresponding to all of the commodity product items in a store is input as the class captions that are used in the CLIP model 10.

Furthermore, in the hierarchical structure that is to be referred to by the CLIP model 10, an element that belongs to the hierarchy that is ranked lower than the hierarchy that includes the element in which the variation in prices of the commodity product item is equal to or less than the threshold th2 is omitted, so that it is possible to perform clustering on the commodity product items in each of which the amount of damage is small at the time of occurrence of a fraudulent act. Consequently, it is possible to implement a further reduction in the processing cost for the task implementation.

In addition, in stores, such as supermarkets and convenience stores, a large number of types of commodity products are present, a life cycle of each of the commodity products is short, so that a replacement of each of commodity products frequently occurs.

The hierarchical structure data that is to be referred to by the CLIP model 10 is a plurality of commodity product candidates that are arranged inside of a store at the present moment from among the candidates for the large number of types of commodity products that are targeted for the replacements. That is, a part of the hierarchical structure in the CLIP model 10 is only updated in accordance with the replacement of the commodity products that are arranged inside of a store. From among the candidates for the large number of types of commodity products that are targeted for the replacement, it is possible to easily manage the plurality of commodity product candidates that are arranged inside of a store at the present moment.

2-3-3. Video Image Acquisition Unit

A description will be given here by referring back to FIG. 2. The video image acquisition unit 113 is a processing unit that acquires video image data from the camera 30. For example, the video image acquisition unit 113 acquires, from the camera 30 that is installed in the self-service checkout register 50, video image data at an arbitrary period, for example, in units of frames. Then, if image data included in a new frame has been acquired, the video image acquisition unit 113 inputs the acquired image data to the first machine learning model 104A, for example, a HOID model and acquires an output result of the HOID. After that, the video image acquisition unit 113 associates the image data included in the acquired new frame with the output result of the HOID included in the acquired new frame for each frame, and stores the associated data in the video image data DB 106.

2-3-4. Self-Service Checkout Register Data Acquisition Unit

The self-service checkout register data acquisition unit 114 is a processing unit that acquires, as the self-service checkout register data, information on the commodity product that has been registered at a checkout register of the self-service checkout register 50. The "registered at a checkout register" mentioned here can be implemented by, in addition to scanning a commodity product code that is printed or attached on the commodity product, manually inputting the commodity product code by the user 2. In this case, as a user interface, a field for inputting the number of commodity products may possibly be included. As described in the latter case, the reason for allowing the user 2 to operate the manual input of the commodity product code is that it is not always able to print or attach the labels of the codes onto all of the respective commodity products. In this way, the self-service checkout register data that has been acquired in response to the registration operation performed at a checkout register of the self-service checkout register 50 is stored in the self-service checkout register data DB 107.

2-3-5. Fraud Detection Unit

The fraud detection unit 115 is a processing unit that detects various fraudulent acts on the basis of the video image data obtained by capturing the surrounding area of the self-service checkout register 50. As illustrated in FIG. 2, the fraud detection unit 115 includes a first detection unit 116 and a second detection unit 117.

2-3-6-5. First Detection Unit

The first detection unit 116 is a processing unit that detects a fraudulent act, as it is called the label switch, that is performed by re-labelling a label attached on a high-priced commodity product to a label attached on a low-priced commodity product and scanning the label attached on the low-priced commodity product.

As one aspect, in the case where a new commodity product code has been acquired by way of a scan performed at the self-service checkout register 50, the first detection unit 116 starts up a process. In this case, the first detection unit 116 retrieves a frame that corresponds to the time at which the commodity product code is scanned and that is included in the frames that are stored in the video image data DB 106. Then, the first detection unit 116 generates an image of the commodity product that is being gripped by the user 2 on the basis of the output result obtained from the HOID that corresponds to the frame in which a hit occurs in the retrieval. Hereinafter, the image of the commodity product that is being gripped by the user 2 is sometimes referred to as a "gripped commodity product image".

Figure 11:
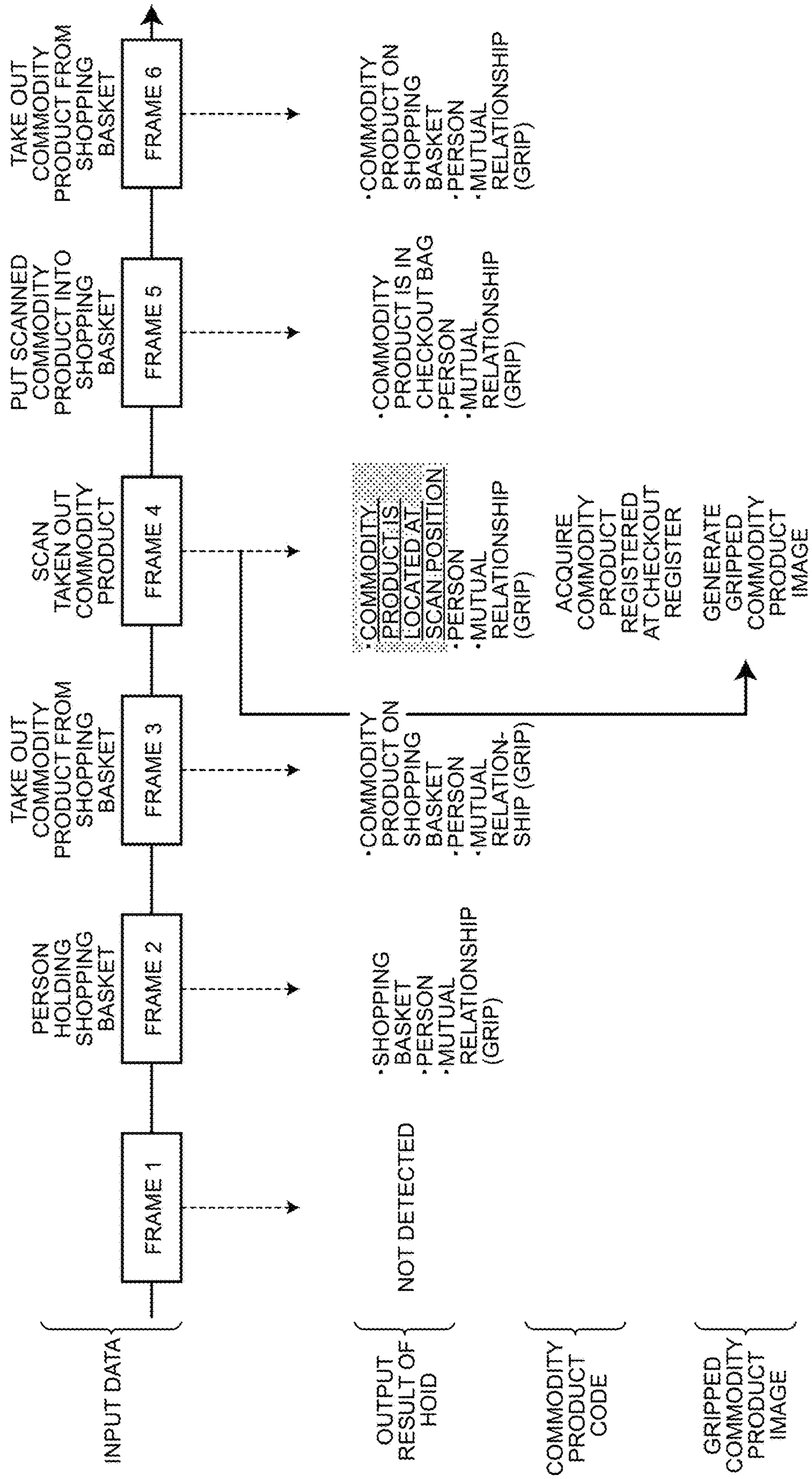
FIG. 11 is a diagram (1) explaining generation of a gripped commodity product image.

FIG. 11 is a diagram (1) explaining a gripped commodity product image. FIG. 11 illustrates image data that is input data with respect to the HOID model and illustrates the output results obtained from the HOID in time series of the frames with the frame numbers "1" to "6" acquired from the camera 30. For example, as for the example illustrated in FIG. 11, a frame is retrieved on the basis of the time at which the commodity product code that has been registered at a checkout register of the self-service checkout register 50 is scanned, by retrieving the frame that is the closest to that time, and in which the degree of overlap between a Bbox of an object and a scan position is equal to or larger than the threshold and an interaction is a grip class. As a result, a gripped commodity product image is generated by using the output result obtained from the HOID performed in the frame with a frame number of "4" and in which a hit occurs in the retrieval. Consequently, it is possible to specify the image in which the user 2 is gripping the commodity product at the scan position.

Figure 12:
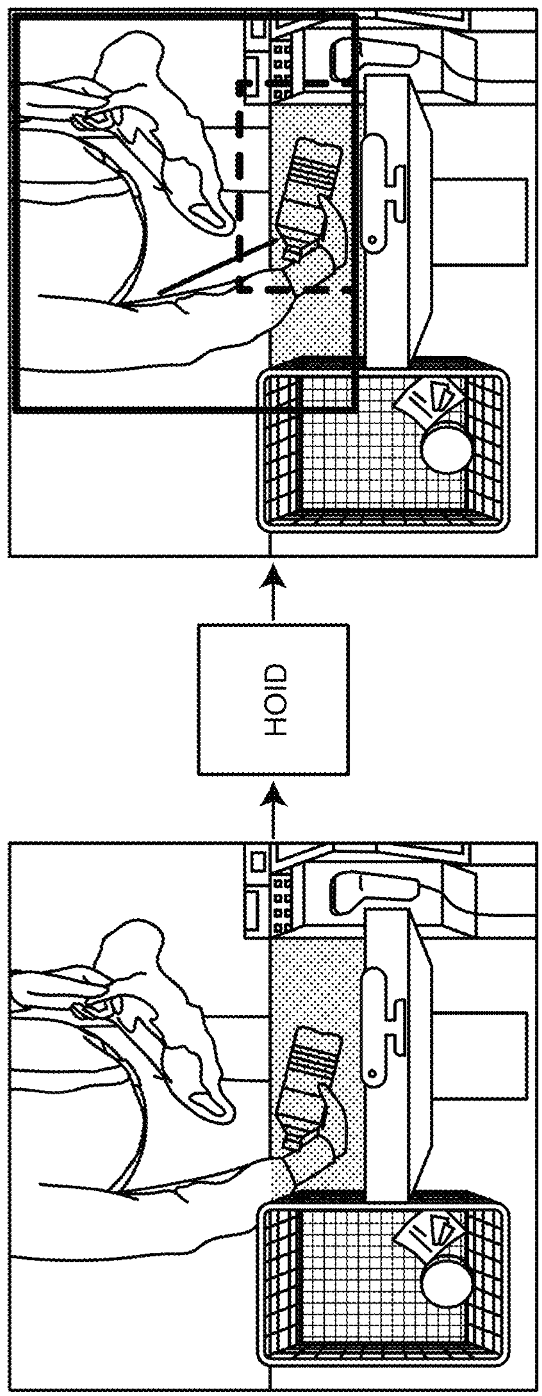
FIG. 12 is a diagram (2) explaining generation of a gripped commodity product image.

FIG. 12 is a diagram (2) explaining generation of a gripped commodity product image. FIG. 12 illustrates the image data corresponding to the frame number "4" illustrated in FIG. 11 and the output result that is obtained from the HOID in the case where the image data is input to the HOID model. Furthermore, FIG. 12 illustrates a Bbox of the person indicated by a frame border drawn by using the solid line, and a Bbox of the object indicated by a frame border drawn by using the broken line. As illustrated in FIG. 12, in the output result obtained from the HOID, the Bbox of the person, the Bbox of the object, a probability value of the interaction between the person and the object, a class name, and the like are included. The first detection unit 116 refers to the Bbox of the object from among these items and generates a gripped commodity product image by cutting out, from the image data included in the frame with the frame number "4", the Bbox of the object, that is, a partial image corresponding to the frame border drawn by using the broken line illustrated in FIG. 12.

After the gripped commodity product image has been generated in this way, the first detection unit 116 inputs the generated gripped commodity product image to the zero-shot image classifier that is one example of the second machine learning model 104B. Furthermore, the first detection unit 116 inputs, to the zero-shot image classifier in accordance with the hierarchical structure stored in the hierarchical structure DB 105, a list of the texts corresponding to the attributes of the commodity products belonging to the same hierarchy in the order of the upper level hierarchy. Consequently, the candidates for the commodity product items are narrowed down as the depth of the hierarchy of the text that is input to the zero-shot image classifier is deeper. After that, the first detection unit 116 determines whether or not the commodity product item that has been registered at a checkout register by way of the scan matches the commodity product item that has been specified by the zero-shot image classifier or a commodity product item group that is included in the attribute of the upper level thereof. At this time, if both of the commodity product items do not match, it is possible to detect that a label switch has been performed. In addition, specifying the commodity product item performed by using the zero-shot image classifier will be described in detail later by using FIG. 17 to FIG. 21.

2-3-6-5. Second Detection Unit

The second detection unit 117 is a processing unit that detects a fraudulent act, as it is called the banana trick, that is performed by registering a low-priced commodity product at a checkout register instead of registering a high-priced commodity product without a label at a checkout register. An operation of registering a commodity product without a label at a checkout register in this way is performed by a manual input by the user 2.

Figure 13:
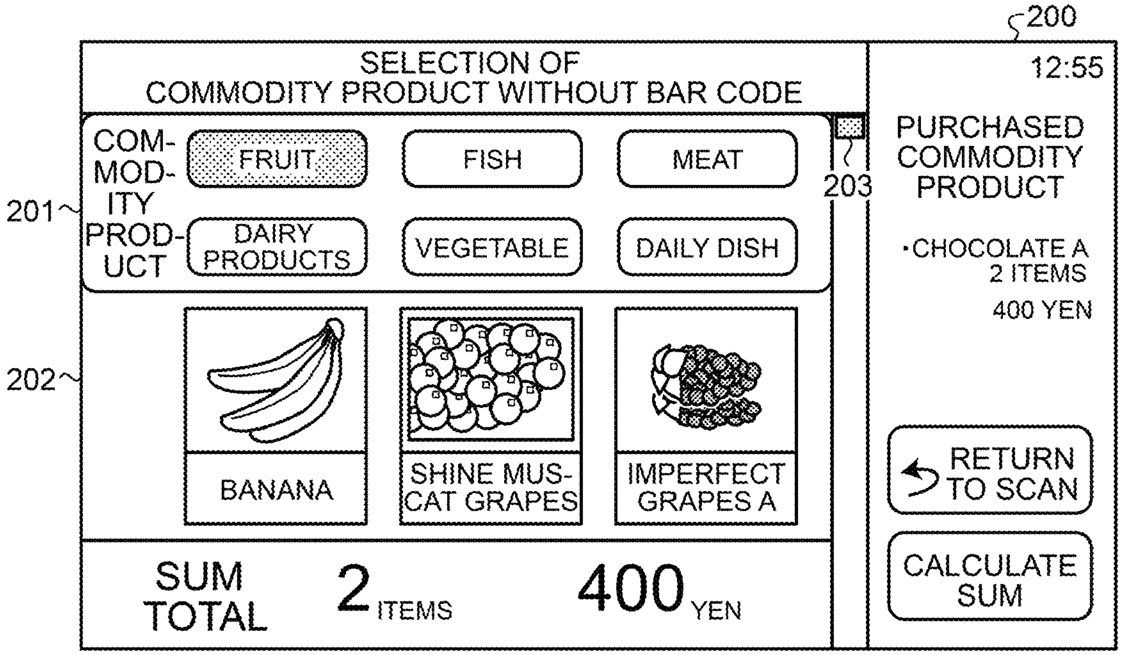
FIG. 13 is a diagram (1) illustrating a display example of a self-service checkout register.

As merely one example, the self-service checkout register 50 sometimes receives an operation of registering a commodity product without label at a checkout register by way of an operation performed on the selection screen of a commodity product without a code illustrated in FIG. 13.

FIG. 13 is a diagram (1) illustrating a display example of the self-service checkout register 50. As illustrated in FIG. 13, on a selection screen 200 of the commodity product without a code, a display area 201 of a category of each of the commodity products, and a display area 202 of the commodity product items belonging to the category that is being selected may be included. For example, on the selection screen 200 of the commodity product without a code illustrated in FIG. 13, an example in which the category of the commodity product of "fruit" is being selected from among the categories of the commodity products of "fruit", "fish", "meat", "dairy products", "vegetable", and "daily dish" that are included in the display area 201 is illustrated. In this case, in the display area 202, the commodity product items of "banana", "Shine Muscat grapes", "imperfect grapes A", and the like that belong to the category "fruit" of the commodity product are displayed. If there is no space to arrange all of the commodity product items that belong to the category "fruit" of the commodity product in the display area 202, it is possible to increase the range in which the commodity product items are arranged by scrolling the display range of the display area 202 by using a scroll bar 203. By receiving a selection operation from among the commodity product items that are displayed on the display area 202 in this way, it is possible to receive an operation of registering a commodity product without a label at a checkout register.

Figure 14:
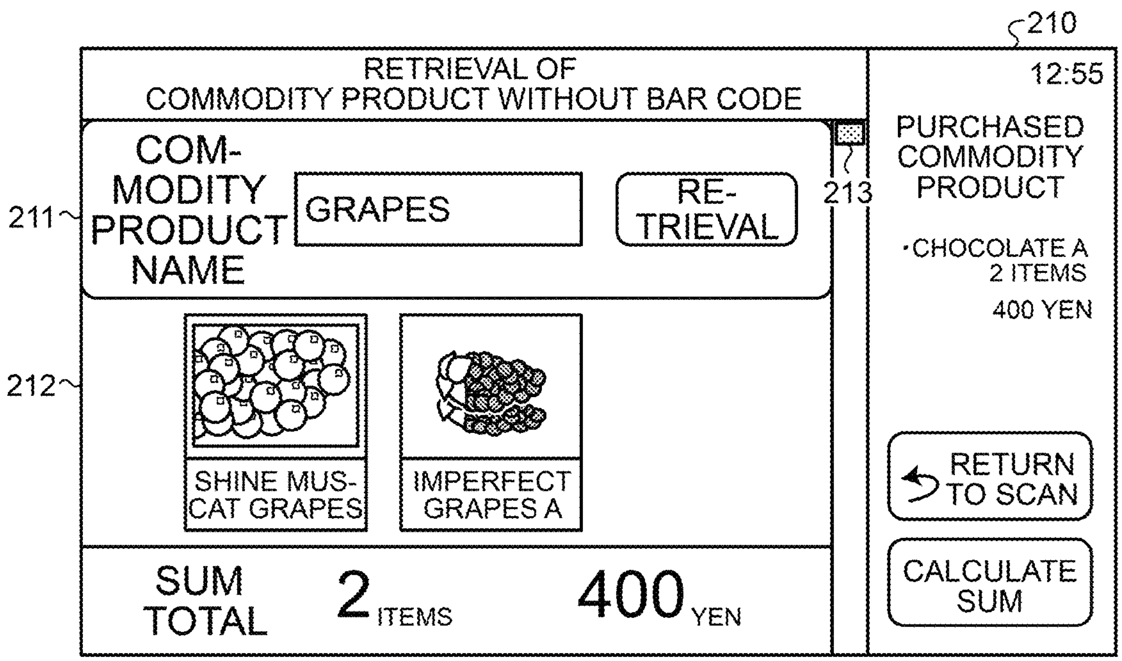
FIG. 14 is a diagram (2) illustrating a display example of the self-service checkout register.

As another example, the self-service checkout register 50 sometimes receives an operation of registering a commodity product without a label at a checkout register by way of an operation performed on a retrieval screen for the commodity product without a code illustrated in FIG. 14.

FIG. 14 is a diagram (2) illustrating a display example of the self-service checkout register 50. As illustrated in FIG. 14, in a retrieval screen 210 for retrieving the commodity product without a code, a retrieval area 211 in which a commodity product is retrieved and a display area 212 in which a list of the retrieval result is displayed may be included. For example, on the retrieval screen 210 for the commodity product without a code illustrated in FIG. 14, a case example in which "grapes" is assigned as a retrieval keyword is illustrated. In this case, in the display area 212, as the retrieval result of the retrieval keyword "grapes", the commodity product items of "Shine Muscat grapes", "imperfect grapes A", and the like are displayed. If there is no space for arranging all of the commodity product items obtained from the retrieval result in the display area 212, it is possible to increase the range in which the commodity product items are arranged by scrolling the display range of the display area 212 by using a scroll bar 213. By receiving a selection operation from among the commodity product items that are displayed on the display area 212 in this way, it is possible to receive an operation of registering a commodity product without a label at a checkout register.

In the case where a manual input of a commodity product without a label is received by way of the selection screen 200 for a commodity product without a code or the retrieval screen 210 for a commodity product without a code, there may be a case in which the manual input is not always performed on the self-service checkout register 50 while the user 2 gripping the commodity product.

From this point of view, the second detection unit 117 starts up the following process in the case where a new commodity product code has been acquired by way of a manual input performed on the self-service checkout register 50. As merely one example, the second detection unit 117 retrieves a frame in which a grip class has been detected by the latest HOID as far back to the time at which a manual input is performed on the commodity product code from among the frames that are stored in the video image data DB 106. Then, the second detection unit 117 generates a gripped commodity product image related to the commodity product without a label on the basis of the output result obtained from the HOID corresponding to the frame in which a hit occurs in the retrieval.

Figure 15:
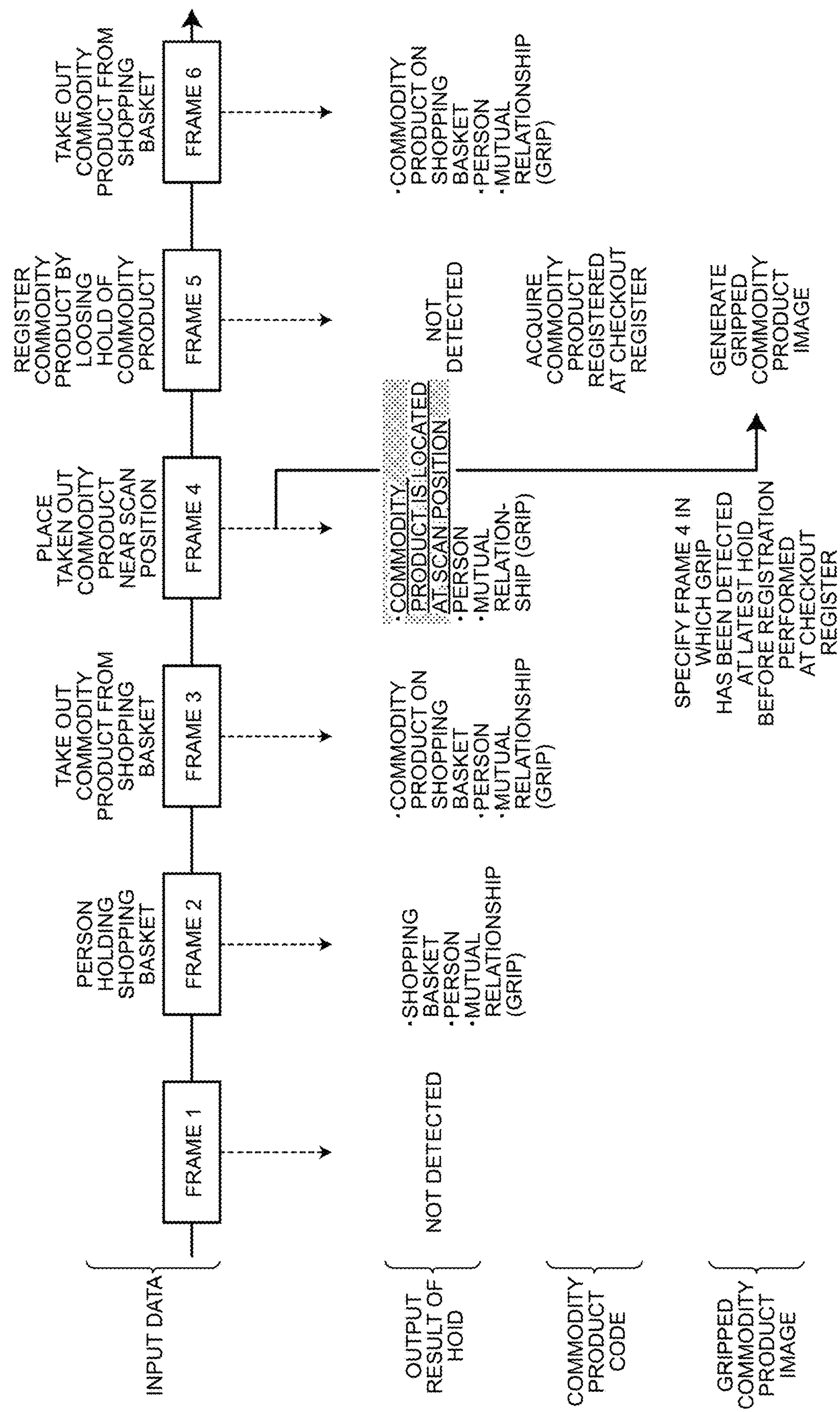
FIG. 15 is a diagram (3) explaining generation of a gripped commodity product image.

FIG. 15 is a diagram (3) explaining generation of a gripped commodity product image. FIG. 15 illustrates the image data that is the input data with respect to the HOID model and illustrates the output result that is obtained from the HOID in time series of the frame with the frame numbers "1" to "6" acquired from the camera 30. For example, as for the example illustrated in FIG. 15, a frame is retrieved on the basis of time that corresponds to the frame number "5" and at which the commodity product code that has been registered at a checkout register of the self-service checkout register 50 is manually input, by retrieving the frame that is the closest to that time as far back to the time, and in which the degree of overlap between a Bbox of an object and a scan position is equal to or larger than the threshold and an interaction is a grip class. As a result, a gripped commodity product image is generated by using the output result obtained from the HOID in the frame with the frame number "4" and in which a hit occurs in the retrieval. Consequently, it is possible to specify the image in which the user 2 is gripping the commodity product without a label.

Figure 16:
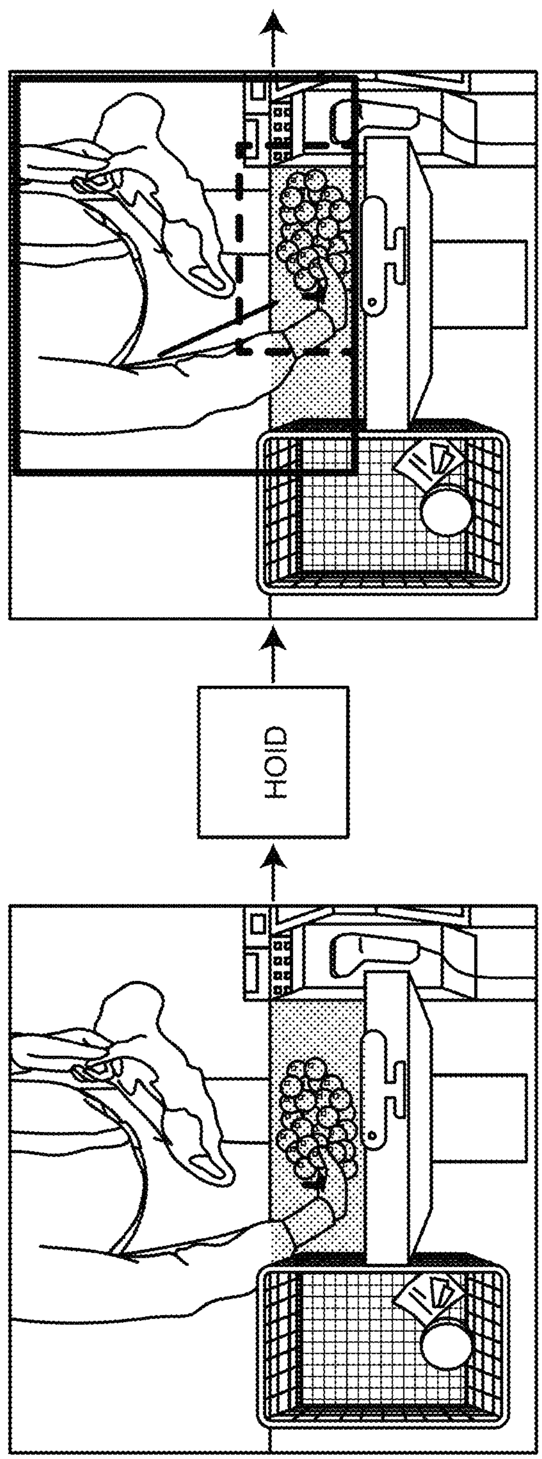
FIG. 16 is a diagram (4) explaining generation of a gripped commodity product image.

FIG. 16 is a diagram (4) illustrating generation of a gripped commodity product image. FIG. 16 illustrates the image data corresponding to the frame number "4" illustrated in FIG. 15 and the output result that is obtained from the HOID in the case where the image data is input to the HOID model. Furthermore, FIG. 16 illustrates a Bbox of the person indicated by a frame border drawn by using the solid line, and a Bbox of the object indicated by a frame border drawn by using the broken line. As illustrated in FIG. 16, in the output result obtained from the HOID, the Bbox of the person, the Bbox of the object, a probability value of the interaction between the person and the object, a class name, and the like are included. the second detection unit 117 refers to the Bbox of the object from among these items and generates a gripped commodity product image related to the commodity product without a label by cutting out, from the image data included in the frame with the frame number "4", the Bbox of the object, that is, a partial image corresponding to the frame border drawn by using the broken line illustrated in FIG. 15.

After the gripped commodity product image has been generated in this way, the second detection unit 117 inputs the generated gripped commodity product image to the zero-shot image classifier that is one example of the second machine learning model 104B. Furthermore, the second detection unit 117 inputs, to the zero-shot image classifier in accordance with the hierarchical structure stored in the hierarchical structure DB 105, a list of the texts corresponding to the attributes of the commodity products belonging to the same hierarchy in the order of the upper level hierarchy. Consequently, the candidates for the commodity product items are narrowed down as the depth of the hierarchy of the text that is input to the zero-shot image classifier is deeper. After that, the second detection unit 117 determines whether or not the commodity product item that has been registered at a checkout register by way of the manual input matches the commodity product item that has been specified by the zero-shot image classifier or a commodity product item group that is included in the attribute of upper level thereof. At this time, if both of the commodity product items do not match, it is possible to detect that a banana trick has been performed.

(1) Case Example 1 of Specifying Commodity Product Item

Figure 17:
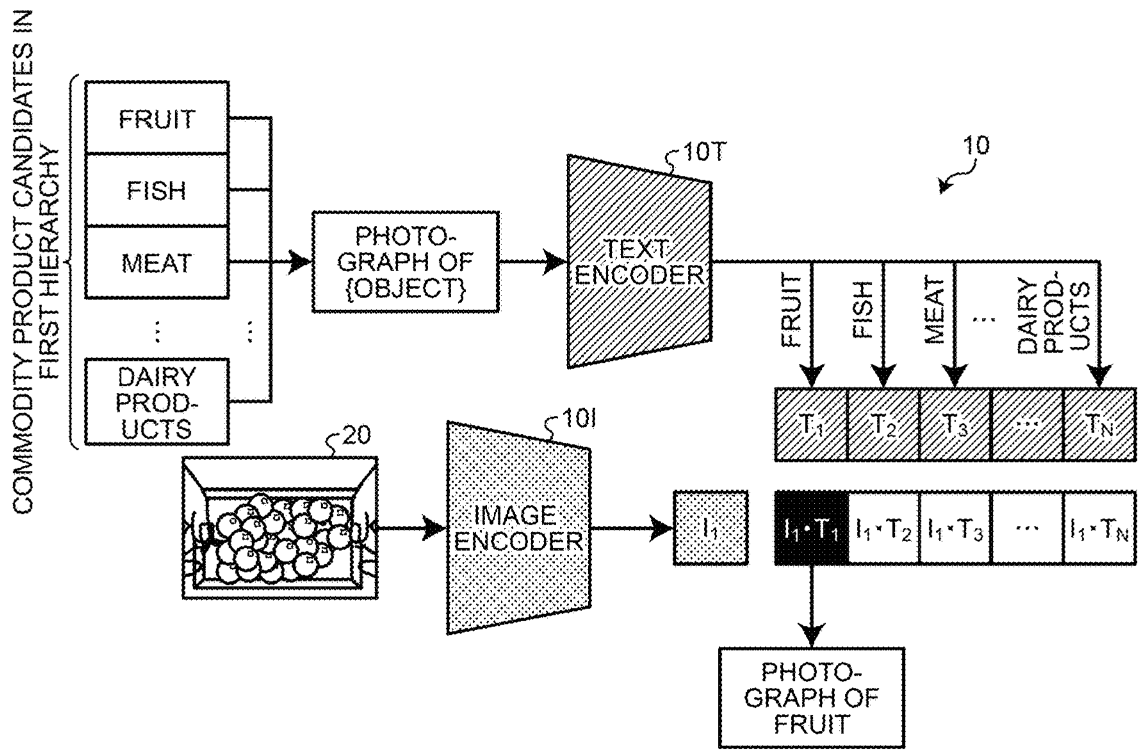
FIG. 17 is a schematic diagram (1) illustrating a case example 1 in which a commodity product item is specified.
Figure 18:
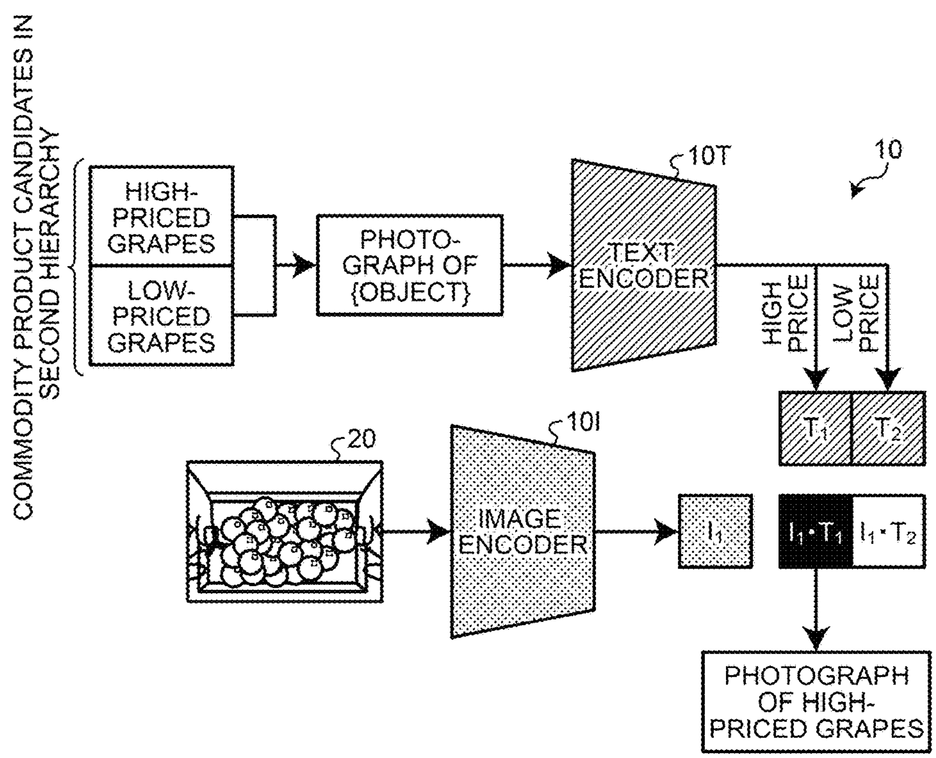
FIG. 18 is a schematic diagram (2) illustrating the case example 1 in which a commodity product item is specified.
Figure 19:
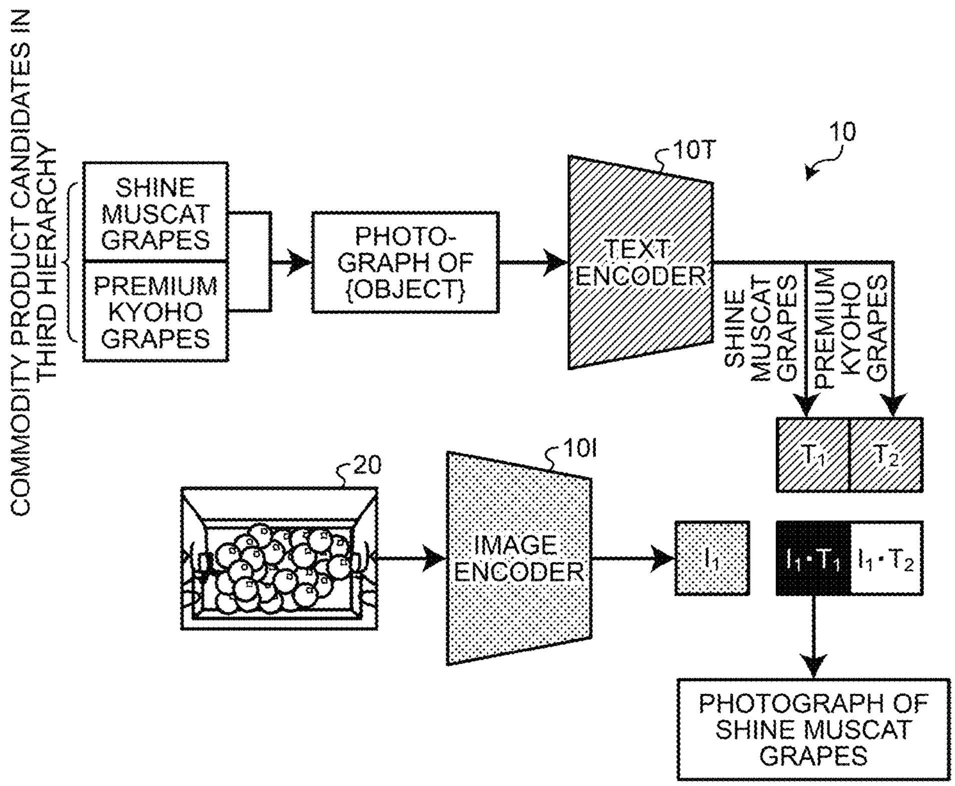
FIG. 19 is a schematic diagram (3) illustrating the case example 1 in which a commodity product item is specified.

In the following, a process of specifying a commodity product item by using the zero-shot image classifier will be described by giving a case example. FIG. 17 to FIG. 19 are schematic diagrams (1) to (3), respectively, illustrating a case example 1 of specifying a commodity product item. In each of FIG. 17 to FIG. 19, an example in which, as merely one example of a gripped commodity product image 20, a partial image of a Bbox that corresponds to the commodity product item "Shine Muscat grapes" that has been gripped by the user 2 is generated.

As illustrated in FIG. 17, the image encoder 10I included in the CLIP model 10 receives an input of the gripped commodity product image 20. As a result, the image encoder 10I outputs an embedded vector $I_1$ of the gripped commodity product image 20.

In contrast, the text encoder 10T included in the CLIP model 10 receives an input of texts of "fruit", "fish", "meat", and "dairy products", as a list of the class captions, that corresponds to the elements that are included in the first hierarchy in accordance with the hierarchical structure illustrated in FIG. 10.

At this time, it is possible to input these texts of "fruit", "fish", "meat", and "dairy products" to the text encoder 10T without any change, but it is possible to indirectly perform "Prompt Engineering" by converting the form of a class caption at the time of an inference to the form of a class caption at the time of a training. For example, regarding a text of "a photograph of an {object}", it may be possible to input a text of "a photograph of fruit" by inserting a text of, for example, "fruit" that corresponds to the attribute of a commodity product to a portion of the {object}.

As a result, the text encoder 10T outputs an embedded vector $T_1$ of the text "fruit", an embedded vector $T_2$ of the text "fish", an embedded vector $T_3$ of the text "meat", . . . , and an embedded vector $T_N$ of the text "dairy products".

Then, the degree of similarity between the embedded vector $I_1$ of the gripped commodity product image 20 and each of the embedded vector $T_1$ of the text "fruit", the embedded vector $T_2$ of the text "fish", the embedded vector $T_3$ of the text "meat", and the embedded vector $T_N$ of the text "dairy products" is calculated.

As indicated by the invert display of black and white illustrated in FIG. 17, in this example, the degree of similarity between the embedded vector $I_1$ of the gripped commodity product image 20 and the embedded vector $T_1$ of the text "fruit" is the maximum. Accordingly, the CLIP model 10 outputs "fruit" as a prediction result of the class of the gripped commodity product image 20.

The prediction result of "fruit" in the first hierarchy obtained in this way is not the terminal node in the hierarchical structure illustrated in FIG. 10, so that the inference of the CLIP model 10 is continued. In other words, as illustrated in FIG. 18, in accordance with the hierarchical structure illustrated in FIG. 10, texts of "high-priced grapes" and "low-priced grapes" that correspond to the elements that belong to the second hierarchy that is ranked lower than the first hierarchy in which the prediction result of "fruit" belongs are input as the list of the class captions. In addition, at the time of an input of the text, similarly to the example illustrated in FIG. 17, "Prompt Engineering" is, of course, able to be performed.

As a result, the text encoder 10T outputs the embedded vector $T_1$ of the text "high-priced grapes" and the embedded vector $T_2$ of the text "high-priced grapes". Then, the degree of similarity between the embedded vector $I_1$ of the gripped commodity product image 20 and each of the embedded vector $T_1$ of the text "high-priced grapes" and the embedded vector $T_2$ of the text "low-priced grapes" is calculated.

As indicated by the invert display of black and white illustrated in FIG. 18, in this example, the degree of similarity between the embedded vector $I_1$ of the gripped commodity product image 20 and the embedded vector $T_1$ of the text "high-priced grapes" is the maximum. Consequently, the CLIP model 10 outputs "high-priced grapes" as the prediction result of the class of the gripped commodity product image 20.

The prediction result of "high-priced grapes" included in the second hierarchy obtained in this way is not the terminal node in the hierarchical structure illustrated in FIG. 10, so that the inference of the CLIP model 10 is continued. In other words, as illustrated in FIG. 19, in accordance with the hierarchical structure illustrated in FIG. 10, the texts of "Shine Muscat grapes" and "premium Kyoho grapes" that correspond to the elements that belongs to the third hierarchy that is ranked lower than the second hierarchy in which the prediction result of "high-priced grapes" belongs are input as the list of the class captions.

As a result, the text encoder 10T outputs the embedded vector $T_1$ of the text "Shine Muscat grapes" and the embedded vector $T_2$ of the text "premium Kyoho grapes". Then, the degree of similarity between the embedded vector $I_1$ of the gripped commodity product image 20 and each of the embedded vector $T_1$ of the text "Shine Muscat grapes" and the embedded vector $T_2$ of the text "premium Kyoho grapes" is calculated.

As indicated by the invert display of black and white illustrated in FIG. 19, in this example, the degree of similarity between the embedded vector $I_1$ of the gripped commodity product image 20 and the embedded vector $T_1$ of the text "Shine Muscat grapes" is the maximum. Consequently, the CLIP model 10 outputs "Shine Muscat grapes" as the prediction result of the class of the gripped commodity product image 20.

As described above, in the case example 1, the commodity product candidates are narrowed down to "fruit" by inputting the list of the attributes of the commodity products that correspond to the elements that are included in the first hierarchy as the class caption to the text encoder 10T. Then, the commodity product candidates are narrowed down to "high-priced grapes" by inputting the list of the attributes of the commodity products, from among the elements included in the second hierarchy, that belong to the hierarchy that is ranked lower than the hierarchy in which the element "fruit" that corresponds to the prediction result obtained in the first hierarchy belongs as the class captions to the text encoder 10T. Furthermore, the commodity product candidates are narrowed down to "Shine Muscat grapes" by inputting the list of the attributes of the commodity products, from among the elements included in the third hierarchy, that belong to the hierarchy that is ranked lower than the hierarchy in which the element "high-priced grapes" that corresponds to the prediction result obtained in the second hierarchy belongs as the class captions to the text encoder 10T. By performing this kind of narrowing process, as compared to a case in which the text corresponding to all of the commodity product items in the store are input to the text encoder 10T, it is possible to specify that the commodity product item included in the gripped commodity product image 20 is "Shine Muscat grapes" while reducing the processing cost of task implementation.

As merely one example, in the case where a commodity product item that has been registered at a checkout register by way of a manual input is "imperfect grapes A", the commodity product item does not match the commodity product item "Shine Muscat grapes" that has been specified by the zero-shot image classifier. In this case, it is possible to detect that a banana trick is performed.

(2) Case Example 2 of Specifying Commodity Product Item

Figure 20:
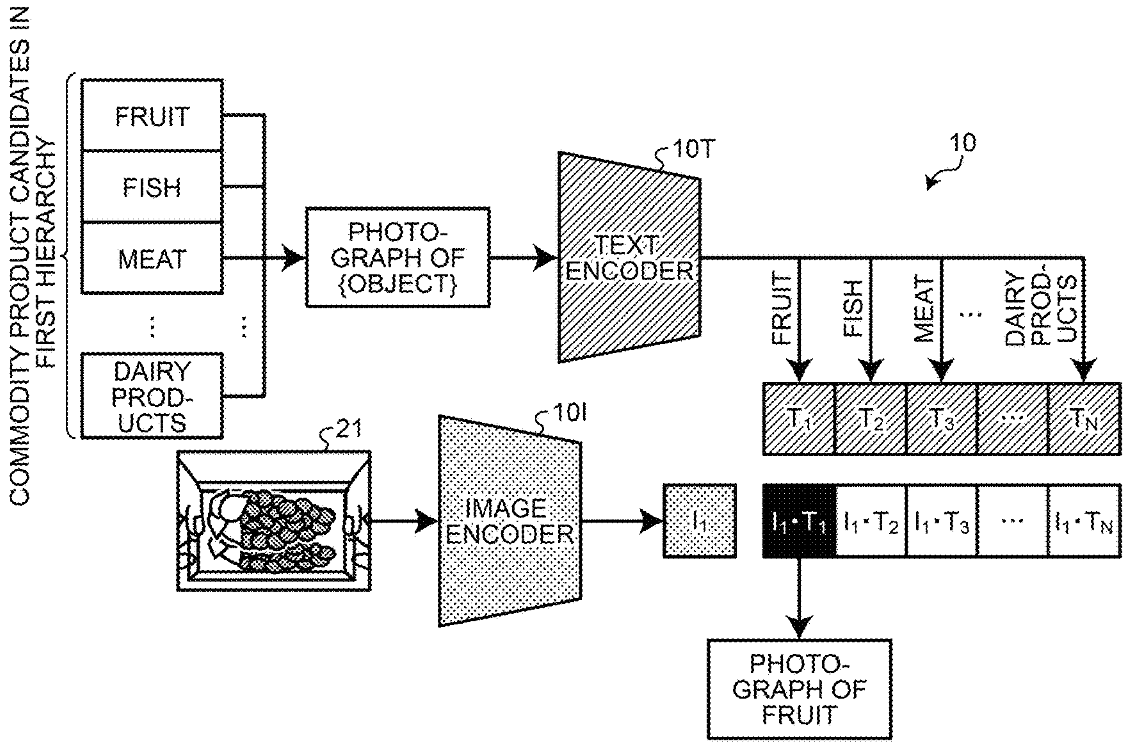
FIG. 20 is a schematic diagram (1) illustrating a case example 2 in which a commodity product item is specified.
Figure 21:
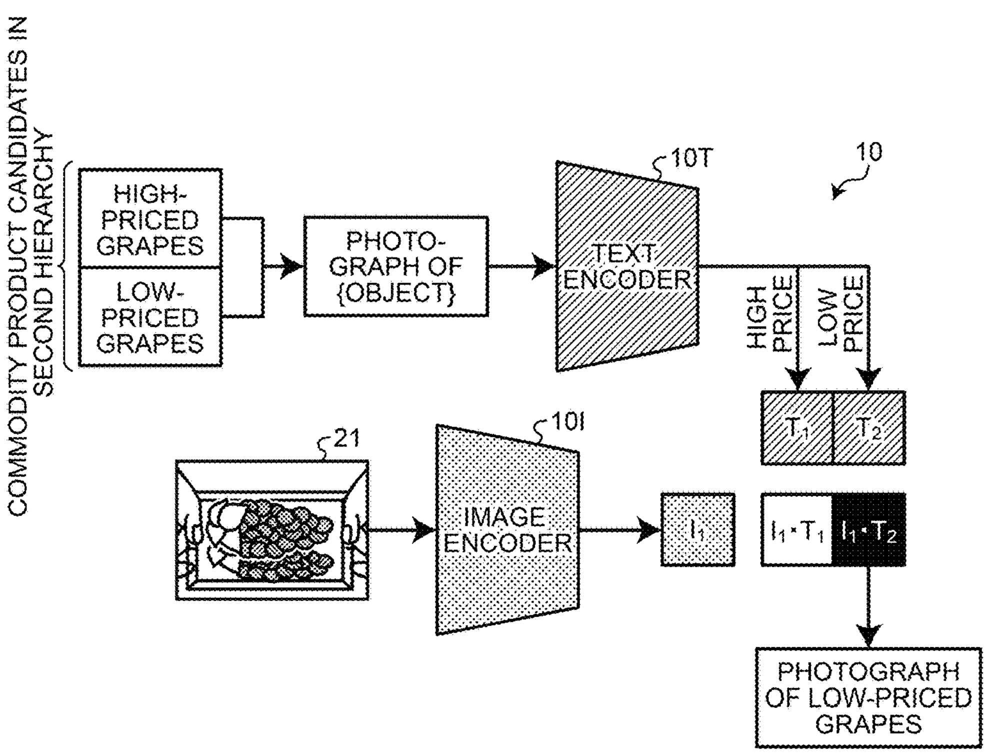
FIG. 21 is a schematic diagram (2) illustrating the case example 2 in which a commodity product item is specified.

FIG. 20 and FIG. 21 are schematic diagrams (1) and (2), respectively, each illustrating a case example 2 of specifying a commodity product item. In each of FIG. 20 and FIG. 21, an example in which, as another example of a gripped commodity product image 21, a partial image of a Bbox that corresponds to a commodity product item "imperfect grapes A" that is gripped by the user 2 has been generated is illustrated.

As illustrated in FIG. 20, the image encoder 10I included in the CLIP model 10 receives an input of the gripped commodity product image 21. As a result, the image encoder 10I outputs the embedded vector $I_1$ of the gripped commodity product image 21.

In contrast, in accordance with the hierarchical structure illustrated in FIG. 10, the text encoder 10T included in the CLIP model 10 receives an input of the texts of "fruit", "fish", "meat", and "dairy products" that correspond to the elements included in the first hierarchy as the list of the class captions. In addition, at the time of an input of the text, similarly to the example illustrated in FIG. 17, "Prompt Engineering" is, of course, able to be performed.

As a result, the text encoder 10T outputs the embedded vector $T_1$ of the text "fruit", the embedded vector $T_2$ of the text "fish", the embedded vector $T_3$ of the text "meat", . . . , the embedded vector $T_N$ of the text "dairy products".

Then, the degree of similarity between the embedded vector $I_1$ of the gripped commodity product image 21 and each of the embedded vector $T_1$ of the text "fruit", the embedded vector $T_2$ of the text "fish", the embedded vector $T_3$ of the text "meat", and the embedded vector $T_N$ of the text "dairy products" is calculated.

As indicated by the invert display of black and white illustrated in FIG. 20, in this example, the degree of similarity between the embedded vector $I_1$ of the gripped commodity product image 21 and the embedded vector $T_1$ of the text "fruit" is the maximum. Consequently, the CLIP model 10 outputs "fruit" as the prediction result of the class of the gripped commodity product image 21.

The prediction result of "fruit" included in the first hierarchy obtained in this way is not the terminal node in the hierarchical structure illustrated in FIG. 10, so that the inference of the CLIP model 10 is continued. In other words, as illustrated in FIG. 21, the texts of "high-priced grapes" and "low-priced grapes" that correspond to the elements belonging to the second hierarchy that is ranked lower than the first hierarchy in which the prediction result of "fruit" belongs are input as the list of the class captions in accordance with the hierarchical structure illustrated in FIG. 10.

As a result, the text encoder 10T outputs the embedded vector $T_1$ of the text "high-priced grapes" and the embedded vector $T_2$ of the text "high-priced grapes". Then, the degree of similarity between the embedded vector $I_1$ of the gripped commodity product image 21 and each of the embedded vector $T_1$ of the text "high-priced grapes" and the embedded vector $T_2$ of the text "low-priced grapes" is calculated.

As indicated by the invert display of black and white illustrated in FIG. 21, in this example, the degree of similarity between the embedded vector $I_1$ of the gripped commodity product image 21 and the embedded vector $T_2$ pf the text "low-priced grapes" is the maximum. Consequently, the CLIP model 10 outputs "low-priced grapes" as the prediction result of the class of the gripped commodity product image 21.

The prediction result of "low-priced grapes" that is included in the second hierarchy obtained in this way is the terminal node in the hierarchical structure illustrated in FIG. 10, so that the inference of the CLIP model 10 is ended. As a result, the prediction result of the class of the gripped commodity product image 21 is defined as "low-priced grapes".

As described above, in the case example 2, as compared to the case example 1 described above, it is possible to omit a process of inputting, as the class captions, the three elements of "inexpensive grapes A", "inexpensive grapes B", and "imperfect grapes A" that are included in the third hierarchy and in which the variation in prices of the commodity product items is equal to or less than the threshold th2. Therefore, according to the case example 2, it is possible to implement a further reduction in the processing cost for the task implementation.

For example, in the case where the commodity product item that has been registered at a checkout register by way of a manual input is "imperfect grapes A", the registered commodity product item matches the commodity product item "imperfect grapes A" that is included in the attribute of the commodity product "low-priced grapes" that has been specified by the zero-shot image classifier. In this case, it is possible to determine that a banana trick is not performed.

2-3-6. Alert Generation Unit

A description will be given here by referring back to FIG. 2. The alert generation unit 118 is a processing unit that generates an alert related to a fraud that has been detected by the fraud detection unit 115.

As one aspect, in the case where a fraud has been detected by the fraud detection unit 115, the alert generation unit 118 is able to generate an alert addressed to the user 2. As this type of alert addressed to the user 2, it is possible to include the commodity product item that has been registered at a checkout register and the commodity product item that has been specified by the zero-shot image classifier.

Figure 22:
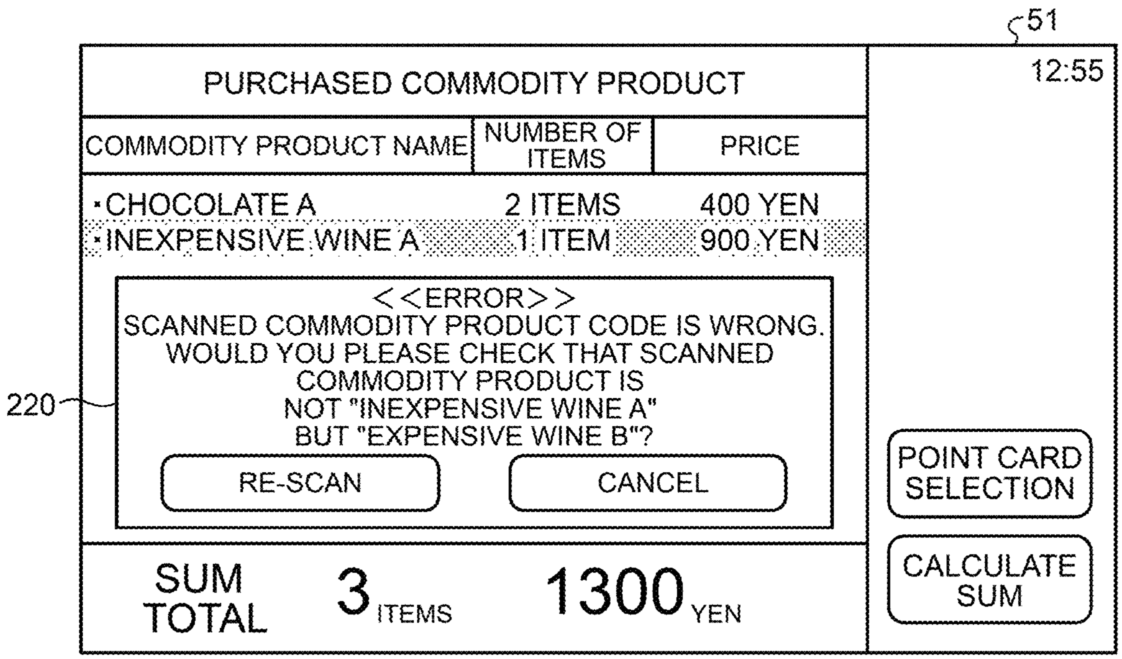
FIG. 22 is a diagram (1) illustrating a display example of an alert.

FIG. 22 is a diagram (1) illustrating a display example of an alert. FIG. 22 illustrates the alert that is displayed on the self-service checkout register 50 at the time of detection of a label switch obtained by the first detection unit 116. As illustrated in FIG. 22, an alert window 220 is displayed on a touch panel 51 of the self-service checkout register 50. On the alert window 220, the commodity product item "inexpensive wine A" that has been registered at a checkout register by way of a scan and a commodity product item "expensive wine B" that has been specified on the basis of image analysis obtained from the zero-shot image classifier are displayed in a state in which both of the commodity product items are able to be compared. In addition to this, it is possible to include a notification to prompt to perform a scan again in the alert window 220. According to this kind of display on the alert window 220, it is possible to warn a user of detection of a label switch conducted by re-labelling a label attached on the "expensive wine B" to a label attached on the "inexpensive wine A" and scanning the label attached on the "inexpensive wine A". Consequently, it is possible to prompt to stop calculation of a payment amount caused by a label switch, and as a result, it is possible to suppress a damage to the store caused by the label switch.

Figure 23:
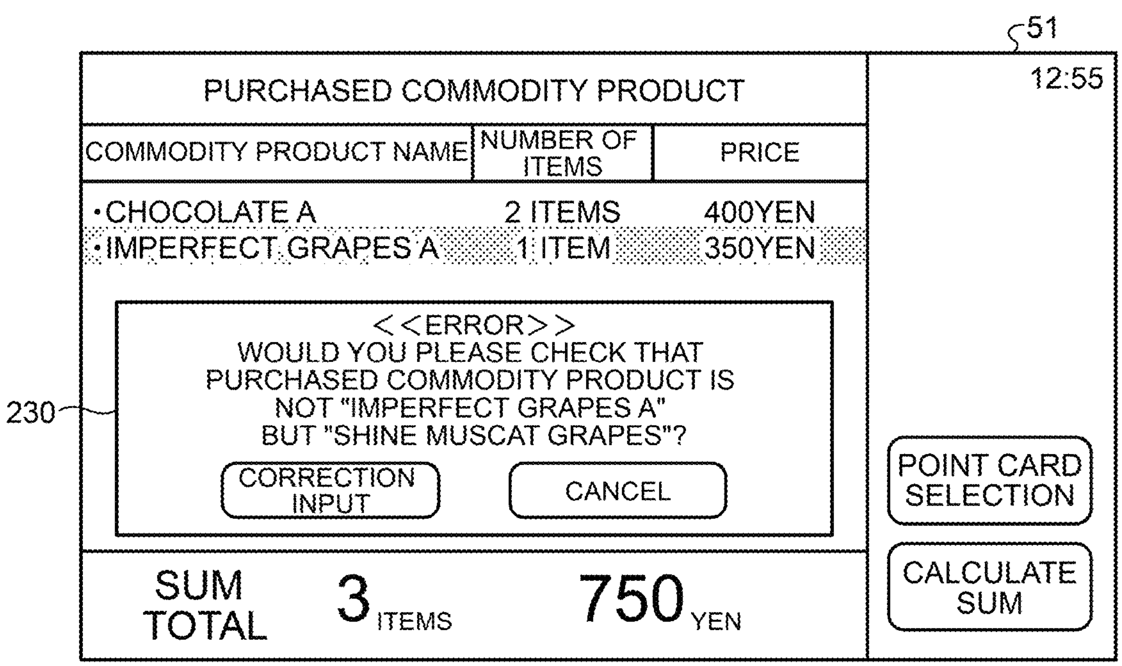
FIG. 23 is a diagram (2) illustrating a display example of an alert.

FIG. 23 is a diagram (2) illustrating a display example of an alert. FIG. 23 illustrates an alert that is displayed on the self-service checkout register 50 at the time of detection of a banana trick obtained by the second detection unit 117. As illustrated in FIG. 23, an alert window 230 is displayed on the touch panel 51 of the self-service checkout register 50. On the alert window 230, the commodity product item "imperfect grapes A" that has been registered at a checkout register by way of a manual input and the commodity product item "Shine Muscat grapes" that has been specified on the basis of image analysis obtained from the zero-shot image classifier are displayed in a state in which both of the commodity product items are able to be compared. In addition to this, it is possible to include a notification to prompt to perform a correction input again in the alert window 230. According to this kind of display on the alert window 230, it is possible to warn a user of detection of a banana trick conducted by performing a registration operation of "imperfect grapes A" at a checkout register by a manual input instead of performing a registration operation of "Shine Muscat grapes" that is to be manually input at the checkout register. Consequently, it is possible to prompt to stop calculation of a payment amount caused by the banana trick, and as a result, it is possible to suppress a damage to the store caused by the banana trick.

As another aspect, in the case where a fraud has been detected by the fraud detection unit 115, the alert generation unit 118 is able to generate an alert addressed to the persons who are involved in the store, for example, addressed to an administrator. As this sort of alert addressed to the administrator of the store, it is possible to include identification information on a category of a fraud and the self-service checkout register 50 in which the fraud has been detected, an estimated amount of damage caused by a fraudulent act, and the like.

Figure 24:
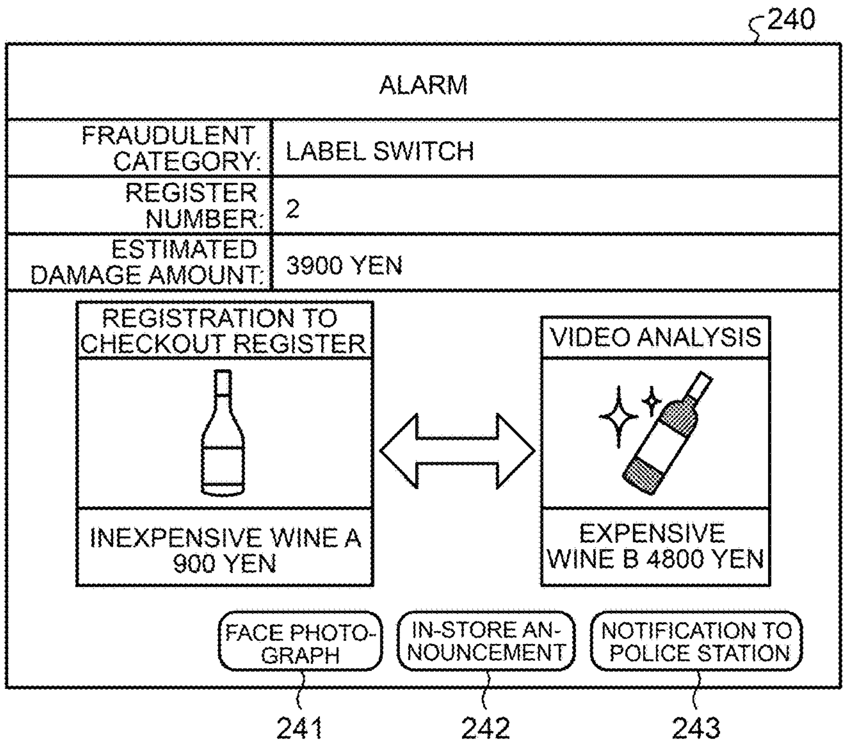
FIG. 24 is a diagram (3) illustrating a display example of an alert.

FIG. 24 is a diagram (3) illustrating a display example of an alert. FIG. 24 illustrates an alert that is displayed on the display unit of the administrator terminal 60 at the time of detection of a label switch obtained by the first detection unit 116. As illustrated in FIG. 24, an alert window 240 is displayed on the display unit of the administrator terminal 60. On the alert window 240, a set of the commodity product item "inexpensive wine A" that has been registered at a checkout register by way of a scan and a price "900 yen" and a set of the commodity product item "expensive wine B" that has been specified by image analysis and a price "4800 yen" are displayed in a state in which both of the commodity product items are able to be compared. Furthermore, on the alert window 240, a fraud category "label switch", a checkout register number "2" in which a label switch is occurring, and an estimated amount of damage "3900 yen (=4800 yen−900 yen)" occurring at the time of calculation of a payment amount caused by the label switch are displayed. In addition to this, on the alert window 240, GUI parts 241 to 243 that receive a request to display a face photograph containing a captured face or the like of the user 2 who uses the self-service checkout register 50 in which a checkout register number "2" has been assigned, a request to make an announcement in the store, and a request to send a notification to a police station or the like, respectively, are displayed. According to this sort of display on the alert window 240, it is possible to implement a report about an occurrence of a damage of the label switch, the grasping of the degree of the damage, and, furthermore, presentation of various countermeasures against the damage. Consequently, it is possible to prompt the user 2 to cope with the label switch, and as a result, it is possible to suppress a damage to the store caused by the label switch.

Figure 25:
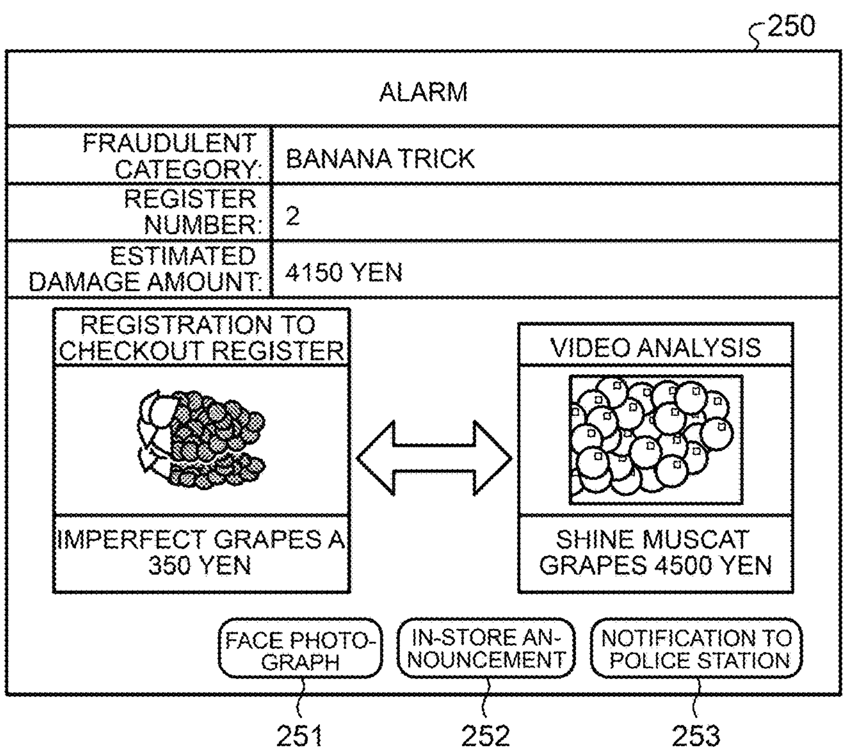
FIG. 25 is a diagram (4) illustrating a display example of an alert.

FIG. 25 is a diagram (4) illustrating a display example of an alert. FIG. 25 illustrates an alert that is displayed on the display unit of the administrator terminal 60 at the time of detection of a banana trick obtained by the second detection unit 117. As illustrated in FIG. 25, an alert window 250 is displayed on the display unit of the administrator terminal 60. On the alert window 250, a set of the commodity product item "imperfect grapes A" that has been registered at a checkout register by way of a manual input and a price "350 yen" and a set of the commodity product item "Shine Muscat grapes" that has been specified by image analysis and a price "4500 yen" are displayed in a state in which both of the commodity product items are able to be compared. Furthermore, on the alert window 250, a fraud category "banana trick", the checkout register number "2" in which a banana trick is occurring, and an estimated amount of damage "4150 yen (=4500 yen −350 yen)" occurring at the time of calculation of a payment amount caused by the banana trick are displayed. In addition to this, on the alert window 250, GUI parts 251 to 253 that receive a request to display a face photograph containing a captured face or the like of the user 2 who uses the self-service checkout register 50 in which a checkout register number "2" has been assigned, a request to make an announcement in the store, and a request to send a notification to a police station or the like, respectively, are displayed. According to this sort of display on the alert window 250, it is possible to implement a report about an occurrence of a damage of the banana trick, the grasping of the degree of the damage, and, furthermore, presentation of various countermeasures against the damage. Consequently, it is possible to prompt the user 2 to cope with the banana trick, and as a result, it is possible to suppress a damage to the store caused by the banana trick.

3. Flow of Process

In the following, the flow of a process performed by the information processing apparatus 100 according to the present embodiment. Here, (1) a data generation process, (2) a video image acquisition process, (3) a first detection process, (4) a second detection process, and (5) a specifying process that are performed by the information processing apparatus 100 will be described in this order.

(1) Data Generation Process

Figure 26:
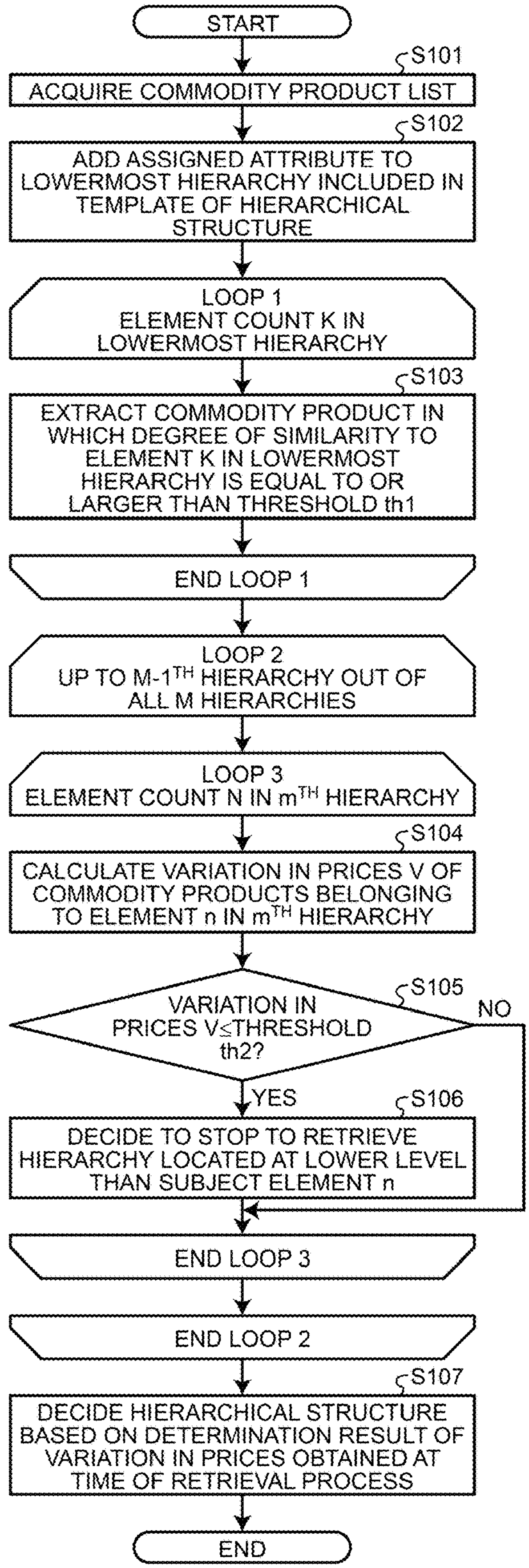
FIG. 26 is a flowchart illustrating the flow of a data generation process according to the first embodiment.

FIG. 26 is a flowchart illustrating the flow of the data generation process according to the first embodiment. This process is able to be started in the case where, as merely one example, a request has been received from the administrator terminal 60, or the like.

As illustrated in FIG. 26, the data generation unit 112 acquires a list of commodity products provided in the stores, such as supermarkets and convenience stores (Step S101). Subsequently, the data generation unit 112 adds, for each element in the lowermost hierarchy included in the template of the hierarchical structure, the attribute that has been assigned by the system definition or the user definition, such as the attribute related to, for example a "price", and the like (Step S102).

Then, the data generation unit 112 performs a loop process 1 that iterates the process at Step S103 described below by the number of times corresponding to an element count K of the elements that are included in the lowermost hierarchy in the hierarchical structure and in which the respective attributes have been added in the template at Step S102. In addition, here, an example in which the process at Step S103 is iterated; however, the process at Step S103 may be performed in parallel.

In other words, the data generation unit 112 extracts, from the commodity product list that has been acquired at Step S101, the commodity product item in which the degree of similarity to the element included in the lowermost hierarchy in the hierarchical structure, that is, the element k related to the price attribute, is equal to or larger than the threshold th1 (Step S103).

As a result obtained from the loop process 1 performed in this way, the commodity product items belonging to the element k are accordingly clustered for each element k related to the price attribute.

After that, the data generation unit 112 performs a loop process 2 that iterates the processes starting from the process at Step S104 described below to the process at Step S106 described below performed on the hierarchies from the first hierarchy to the $M-1^{th}$ hierarchy except for the $M^{th}$ hierarchy that is the lowermost hierarchy from among all of the M hierarchies in the hierarchical structure after the clustering process performed at Step S103. Furthermore, the data generation unit 112 performs a loop process 3 that iterates the processes starting from the process at Step S104 described below to the process at Step S106 described below by the number of times corresponding to an element count N of the elements that are included in the $m^{th}$ hierarchy. In addition, here, an example in which the processes at Step S104 to Step S106 are iterated; however, the processes at Step S104 to Step S106 may be performed in parallel.

In other words, the data generation unit 112 calculates a variation in prices V of the commodity product items belonging to the element n in the $m^{th}$ hierarchy (Step S104). After that, the data generation unit 112 determines whether or not the variation in prices V is equal to or less than the threshold th2 (Step S105).

At this time, if the variation in prices V is equal to or less than the threshold th2 (Yes at Step S105), the data generation unit 112 decides to abort retrieval of the hierarchy that is ranked lower than the hierarchy in which the element n belongs (Step S106). In contrast, if the variation in prices V is not equal to or less than the threshold th2 (No at Step S105), the retrieval of the hierarchy that is ranked lower than the hierarchy in which the element n belongs is continued, so that the process at Step S106 is skipped.

By performing the loop process 2 and the loop process 3 in this way, the retrieval is iterated until it is decided to abort the retrieval process that is started for each element included in the first hierarchy, or until all of the elements included in the $M-1^{th}$ hierarchy has been retrieved.

After that, the data generation unit 112 decides the depth of each of the routes in the hierarchical structure on the basis of the determination result of the variation in prices obtained at the time of retrieval process performed at Step S104 to Step S106 (Step S107).

As a result of the depth of each of the routes in the M hierarchies in the hierarchical structure being decided in this way, the hierarchical structure is determined. The hierarchical structure that has been generated in this way is stored in the hierarchical structure DB 105 included in the storage unit 102.

(2) Video Image Acquisition Process

Figure 27:
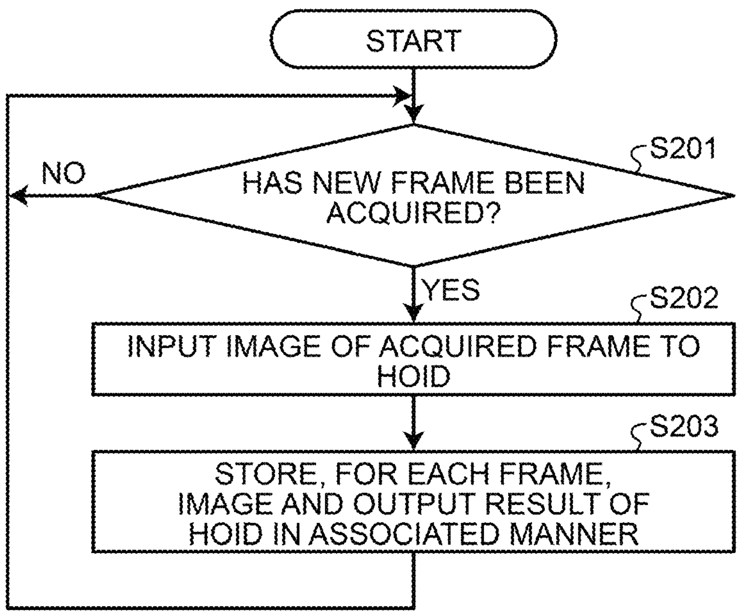
FIG. 27 is a flowchart illustrating the flow of a video image acquisition process according to the first embodiment.

FIG. 27 is a flowchart illustrating the flow of the video image acquisition process according to the first embodiment. As illustrated in FIG. 27, if the image data included in a new frame has been acquired (Yes at Step S201), the video image acquisition unit 113 inputs the acquired image data to the first machine learning model 104A, for example, to the HOID model, and acquires the output result of the HOID (Step S202).

After that, the video image acquisition unit 113 associates, for each frame, the image data in the frame with the output result of the HOID related to the frame, stores the associated data in the video image data DB 106 (Step S203), and returns to the process at Step S201.

(3) First Detection Process

Figure 28:
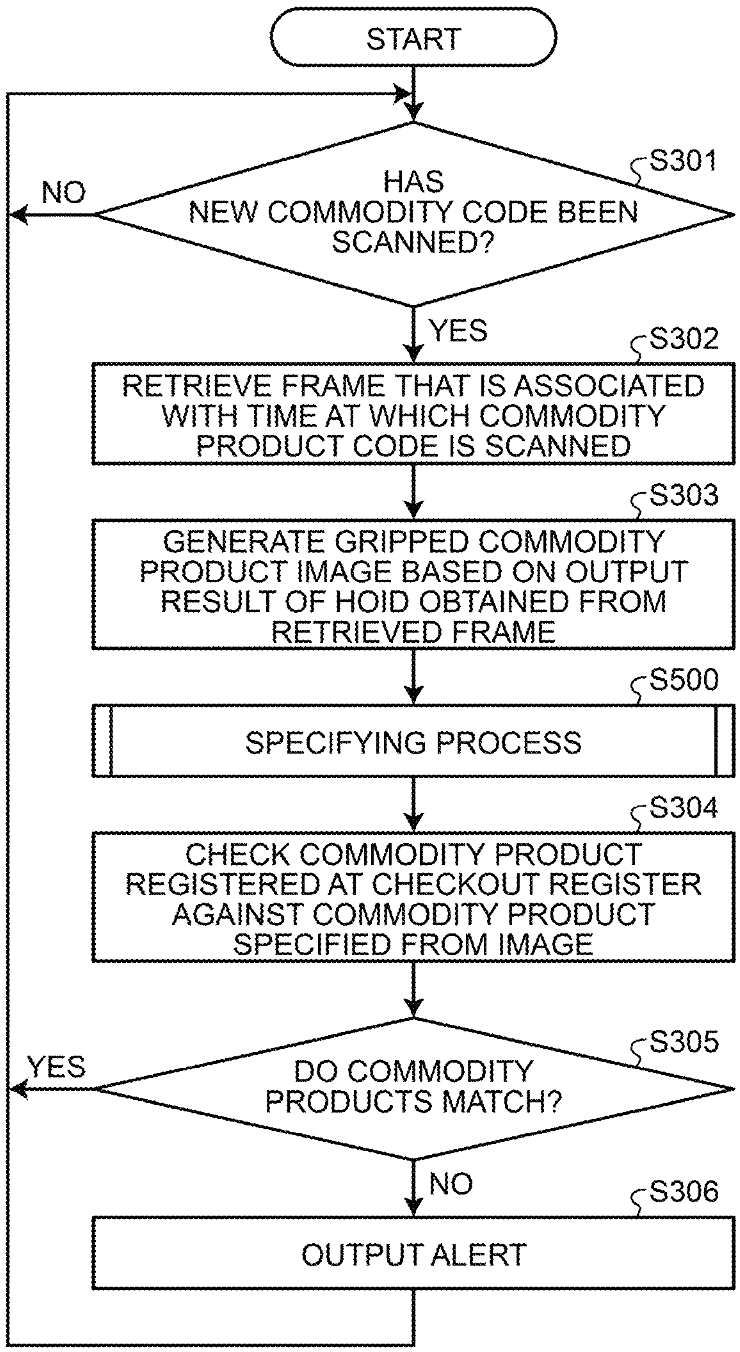
FIG. 28 is a flowchart illustrating the flow of a first detection process according to the first embodiment.

FIG. 28 is a flowchart illustrating the flow of the first detection process according to the first embodiment. As illustrated in FIG. 28, if a new commodity product code has been acquired by way of a scan performed in the self-service checkout register 50 (Yes at Step S301), the first detection unit 116 performs the following process. That is, the first detection unit 116 retrieves, from among the frames stored in the video image data DB 106, the frame that corresponds to the time at which the commodity product code is scanned (Step S302).

Then, the first detection unit 116 generates the gripped commodity product image of the commodity product that is gripped by the user 2 on the basis of the output result obtained from the HOID that corresponds to the frame in which a hit occurs in the retrieval at Step S302 (Step S303).

Then, the first detection unit 116 performs a "specifying process" for specifying a commodity product item by inputting the gripped commodity product image to the zero-shot image classifier, and inputting the list of the texts corresponding to the attributes of the commodity products included in each of the plurality of hierarchies to the zero-shot image classifier (Step S500).

After that, the first detection unit 116 determines whether or not the commodity product item that has been registered at a checkout register by way of a scan matches the commodity product item group that is included in the attribute of the commodity product item that has been specified at Step S500 or the attribute of the commodity product located at the upper level of the level of the specified commodity product item (Step S304).

At this time, if both of the commodity product items do not match (No at Step S305), it is possible to detect that a label switch has been performed. In this case, the alert generation unit 118 generates and outputs an alert of the label switch that has been detected by the first detection unit 116 and outputs the alert (Step S306), and then, returns to the process at Step S301. In addition, if both of the commodity product items match (Yes at Step S305), the alert generation unit 118 skips the process at Step S306 and returns to the process at Step S301.

(4) Second Detection Process

Figure 29:
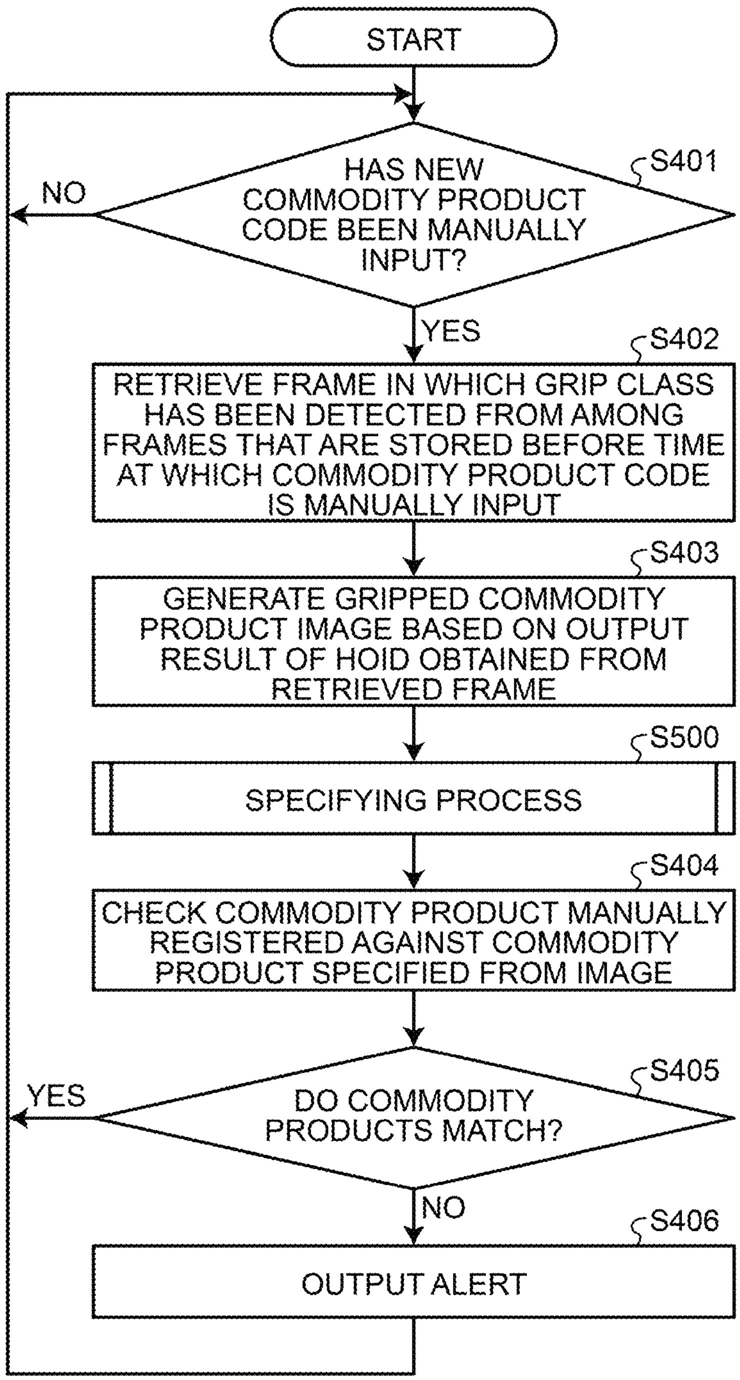
FIG. 29 is a flowchart illustrating the flow of a second detection process according to the first embodiment.

FIG. 29 is a flowchart illustrating the flow of the second detection process according to the first embodiment. As illustrated in FIG. 28, if a new commodity product code has been acquired by way of a manual input performed in the self-service checkout register 50 (Yes at Step S401), the second detection unit 117 performs the following process. That is, the second detection unit 117 retrieves the frame in which a grip class has been detected at the latest HOID as far back to the time at which a manual input is performed on the commodity product code from among the frames that are stored in the video image data DB 106 (Step S402).

Then, the second detection unit 117 generates a gripped commodity product image related to the commodity product without a label on the basis of the output result obtained from the HOID that corresponds to the frame in which a hit occurs in the retrieval specified at Step S402 (Step S403).

Then, the second detection unit 117 performs the "specifying process" for specifying the commodity product item by inputting the gripped commodity product image to the zero-shot image classifier, and inputting the list of the texts corresponding to the attributes of the commodity products included in each of the plurality of hierarchies to the zero-shot image classifier (Step S500).

After that, the second detection unit 117 determines whether or not the commodity product item that has been registered at a checkout register by way of a manual input matches the commodity product item that is included in the attribute of the commodity product item that has been specified at Step S500 or the commodity product item group that is included in the upper level of the specified commodity product item (Step S404).

At this time, if both of the commodity product items do not match (No at Step S405), it is possible to detect that a banana trick has been performed. In this case, the alert generation unit 118 generates an alert of the banana trick that has been detected by the second detection unit 117, and outputs the generated alert (Step S406), and then, returns to Step S401. In addition, if both of the commodity product items match (Yes at Step S405), the alert generation unit 118 skips the process at Step S406 and returns to Step S401.

(5) Specifying Process

Figure 30:
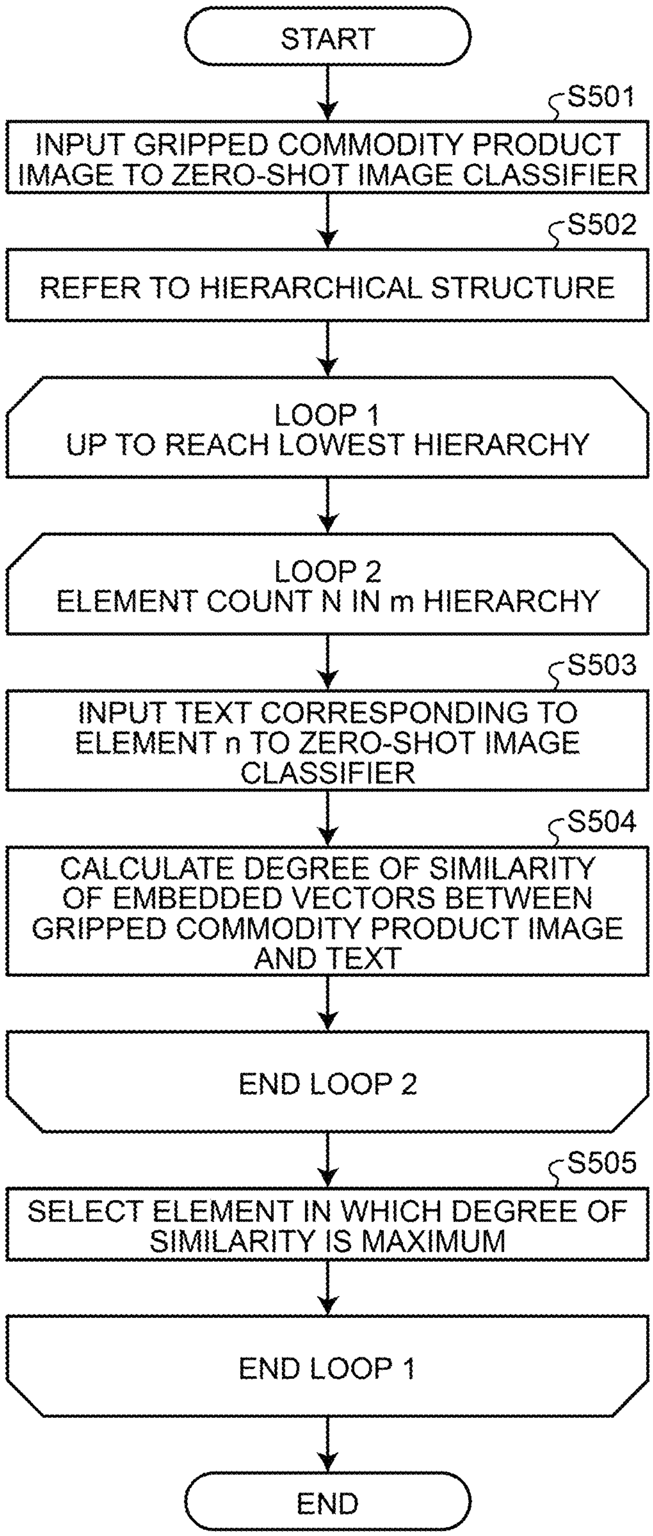
FIG. 30 is a flowchart illustrating the flow of a specifying process according to the first embodiment.

FIG. 30 is a flowchart illustrating the flow of the specifying process according to the first embodiment. This process corresponds to the process performed at Step S500 illustrated in FIG. 28 the process performed at Step S500 illustrated in FIG. 29. As illustrated in FIG. 30, the fraud detection unit 115 inputs the gripped commodity product image that has been generated at Step S303 or Step S403 to the image encoder 10I included in the zero-shot image classifier (Step S501). After that, the fraud detection unit 115 refers to the hierarchical structure that is stored in the hierarchical structure DB 105 (Step S502).

Then, the fraud detection unit 115 performs the loop process 1 that iterates the processes to be performed at Step S503 to Step S505 that will be described below in the range between the uppermost hierarchy and the lowermost hierarchy that are constituted in the hierarchical structure that are referred to at Step S502. In addition, here, an example in which the processes performed at Step S503 to Step S505 are distributed, but the processes performed at Step S503 to Step S505 may be performed in parallel.

Furthermore, the fraud detection unit 115 performs the loop process 2 that iterates the process to be performed at Step S503 that will be described below and the process to be performed at Step S504 that will be described below by the number of timed corresponding to the element count N of the elements that are included in the m hierarchies. In addition, here, an example in which the processes performed at Step S503 and Step S504 are distributed; however, the processes at Step S503 and Step S504 may be performed in parallel.

That is, the fraud detection unit 115 inputs the text corresponding to the element n included in the $m^{th}$ hierarchy to the text encoder 10T included in the zero-shot image classifier (Step S503). Then, the fraud detection unit 115 calculates the degree of similarity between the vector that is output by the image encoder 10I in which the gripped commodity product image has been input at Step S501 and the vector that is output by the text encoder 10T in which the text has been output at Step S503 (Step S504).

As a result obtained from the loop process 2, the similarity matrix of N elements that are included in the $m^{th}$ hierarchy and the gripped commodity product image is generated. After that, the fraud detection unit 115 selects the element that has the maximum similarity included in the similarity matrix and in which the degree of similarity between the N elements that are included in the $m^{th}$ hierarchy and the gripped commodity product image is the maximum (Step S505).

After that, the fraud detection unit 115 iterates the loop process 1 on the N elements that belong to the hierarchy that is ranked lower than the hierarchy, in which the element selected at Step S505 belongs, in the hierarchy that is ranked at one level lower than the hierarchy in which the loop counter m of the hierarchy is incremented by one.

As a result obtained from the loop process 1, the text that is output by the zero-shot image classifier at the time of an input of the text that corresponds to the element included in the lowermost hierarchy of the hierarchical structure is obtained as the specific result of the commodity product item.

4. One Aspect of Effects

As described above, the information processing apparatus 100 acquires the video image that includes an object. Then, the information processing apparatus 100 inputs the acquired video image to the machine learning model (zero-shot image classifier) that refers to the reference source data in which an attribute of an object is associated with each of the plurality of hierarchies. Accordingly, the information processing apparatus 100 specifies the attribute of the object that is included in the video image from among the attributes of the objects that are included in the first hierarchy (melon and apple). After that, the information processing apparatus 100 specifies, by using the specified attribute of the object, the attribute of the object that is included in the second hierarchy (expensive melon and inexpensive melon) that is located below the first hierarchy. After that, the information processing apparatus 100 specifies, by inputting the acquired video image to the machine learning model (zero-shot image classifier), the attribute of the object that is included in the video image from among the attributes of the objects that are included in the second hierarchy.

Therefore, with the information processing apparatus 100, it is possible to implement detection of a fraudulent act conducted at a self-service checkout register by using the machine learning model (zero-shot image classifier) in which a preparation of a large amount of training data is not needed and re-tuning in accordance with the life cycle of each of the commodity products is not also needed.

In addition, the information processing apparatus 100 acquires the video image on the person who is scanning a code of a commodity product to the self-service checkout register 50. Then, the information processing apparatus 100 specifies, by inputting the acquired video image to the machine learning model (zero-shot image classifier), the commodity product candidate that corresponds to the commodity product that that is included in the video image from among the plurality of commodity product candidates (texts) that are set in advance. After that, the information processing apparatus 100 acquires, by scanning the code of the commodity product to the self-service checkout register 50, the item of the commodity product that has been identified by the self-service checkout register 50. After that, the information processing apparatus 100 generates an alert that indicates an abnormality of the commodity product that has been registered to the self-service checkout register 50 on the basis of the item of the specified commodity product candidate and the item of the commodity product that has been acquired from the self-service checkout register 50.

Therefore, with the information processing apparatus 100, as one aspect, it is possible to output an alert at the time of detection of a label switch conducted at the self-service checkout register 50, so that it is possible to suppress the label switch conducted at the self-service checkout register 50.

In addition, the information processing apparatus 100 acquires the video image on the person who grips the commodity product to be registered to the self-service checkout register 50. Then, the information processing apparatus 100 specifies, by inputting the acquired video image to the machine learning model (zero-shot image classifier), from among the plurality of commodity product candidates (texts) that have been set in advance, the commodity product candidate that corresponds to the commodity product included in the video image. After that, from among the plurality of commodity product candidates that are output by the self-service checkout register 50, the information processing apparatus 100 acquires the item of the commodity product that has been input by the person. After that, on the basis of the item of the acquired commodity product and the specified commodity product candidate, the information processing apparatus 100 generates an alert indicating an abnormality of the commodity product that has been registered to the self-service checkout register 50.

Therefore, according to the information processing apparatus 100, as one aspect, it is possible to output an alert at the time of detection of a banana trick performed in the self-service checkout register 50, so that it is possible to suppress a banana trick performed in the self-service checkout register 50.

In addition, the information processing apparatus 100 acquires the commodity product data and generates the reference source data in which an attribute of a commodity product is associated with each of the plurality of hierarchies on the basis of a variation relationship among the attributes of the commodity products that are included in the acquired commodity product data. After that, the information processing apparatus 100 sets the generated reference source data as the reference source data that is referred to by the zero-shot image classifier.

Therefore, according to the information processing apparatus 100, it is possible to implement a reduction in the number of pieces of data that are referred to by the zero-shot image classifier that is used to detect a fraudulent act conducted in the self-service checkout register 50.

Second Embodiment

5. Application Example

In the above explanation, a description has been given of the embodiment of the device disclosed in the present invention; however, the present invention may also be implemented with various kinds of embodiments other than the embodiments described above.

5-1. Application Example 1

Figure 31:
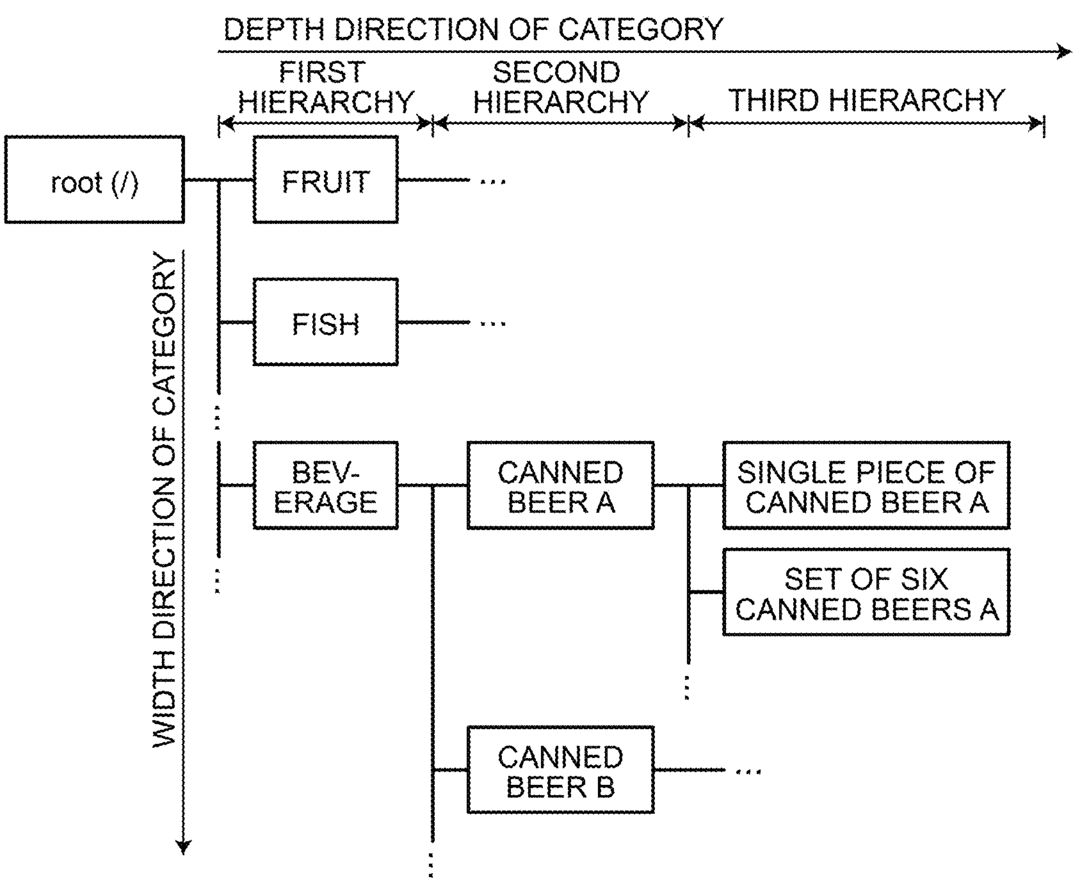
FIG. 31 is a diagram illustrating an application example 1 of a hierarchical structure.

First, an application example 1 of the hierarchical structure that has been described above in the first embodiment. For example, in the hierarchical structure, in addition to the attributes of the commodity products, a label that indicates the number of commodity products and a label that indicates a unit of the number of items may be included. FIG. 31 is a diagram illustrating the application example 1 of the hierarchical structure. FIG. 31 illustrates, for convenience of description, regarding the second hierarchy and the subsequent hierarchies, elements that belongs to the hierarchy lower than the hierarchy in which a large classification of the commodity product indicated by "beverage" belongs are extracted, and, regarding the third hierarchy and the subsequent hierarchies, elements that belongs to the hierarchy lower than the hierarchy in which a small classification of the commodity product indicated by "canned beer A" belongs are extracted.

As illustrated in FIG. 31, in the hierarchical structure according to the application example 1, the first hierarchy, the second hierarchy, and the third hierarchy are included. Among these, in the first hierarchy, as one example of the large classification of the commodity products, the elements of "fruit", "fish", "beverage", and the like are included. Furthermore, in the second hierarchy, as another example of the small classification of the commodity products, the elements of "canned beer A", "canned beer B", and the like are included. Furthermore, in the third hierarchy, as an example of a label that includes the number of commodity products and a unit of the commodity products, the elements of "a single piece of canned beer A", "a set of six canned beers A", and the like are included.

In this way, if the label that indicates the number of commodity products and the label that indicates a unit of the commodity products are included in the hierarchical structure, in addition to the label switch described above, it is possible to implement detection of a fraud conducted by scanning the number of commodity products that is less than the actual number of purchased commodity products caused by the label switch. Hereinafter, a fraud conducted by scanning the number of commodity products that is less than the actual number of purchased commodity products caused by the label switch is sometimes referred to as a "label switch (the number of items)".

Figure 32:
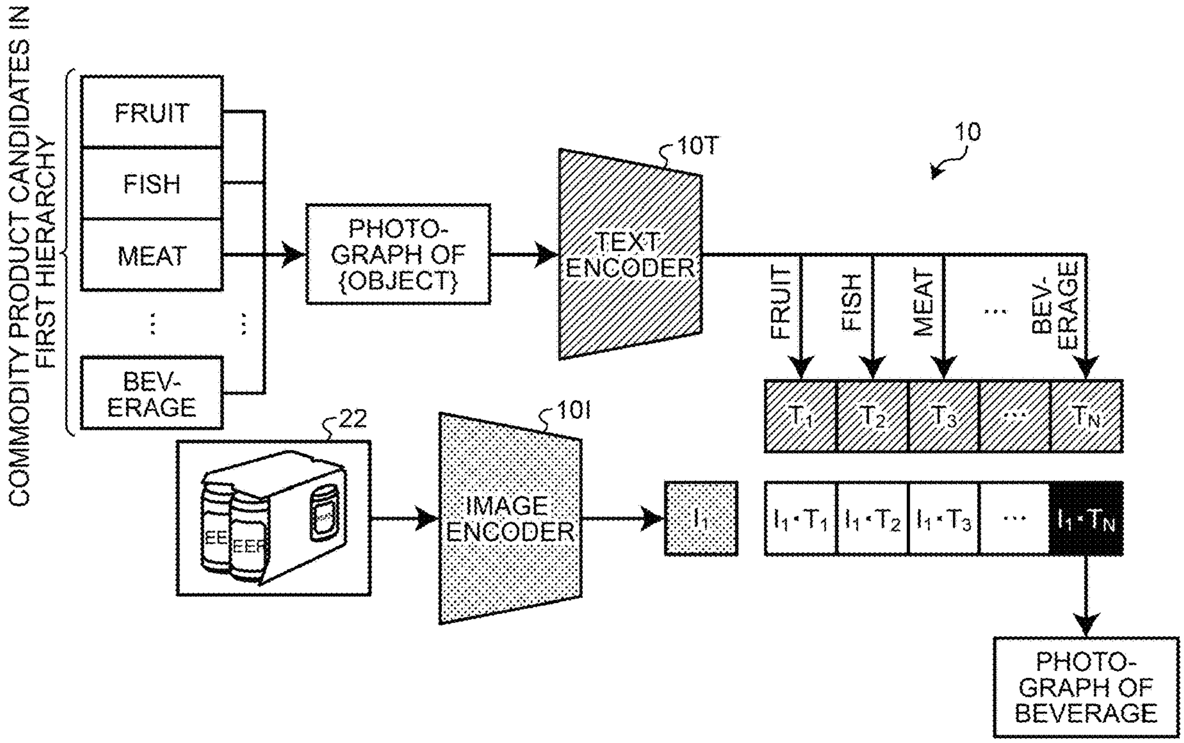
FIG. 32 is a schematic diagram (1) illustrating a case example 3 in which a commodity product item is specified.
Figure 33:
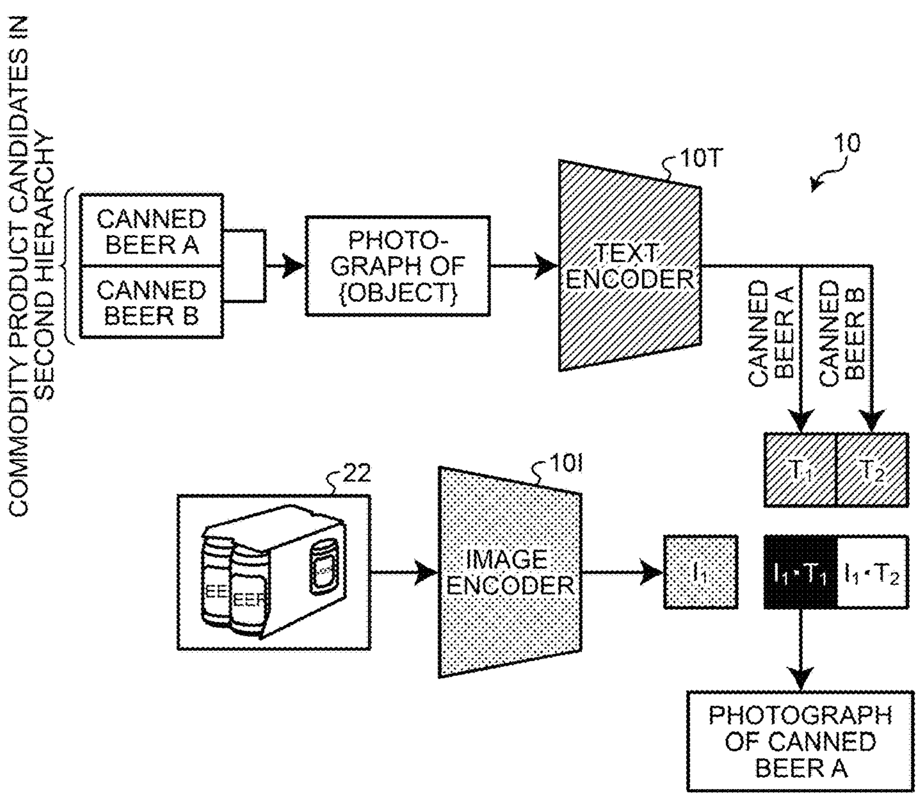
FIG. 33 is a schematic diagram (2) illustrating the case example 3 in which a commodity product item is specified.
Figure 34:
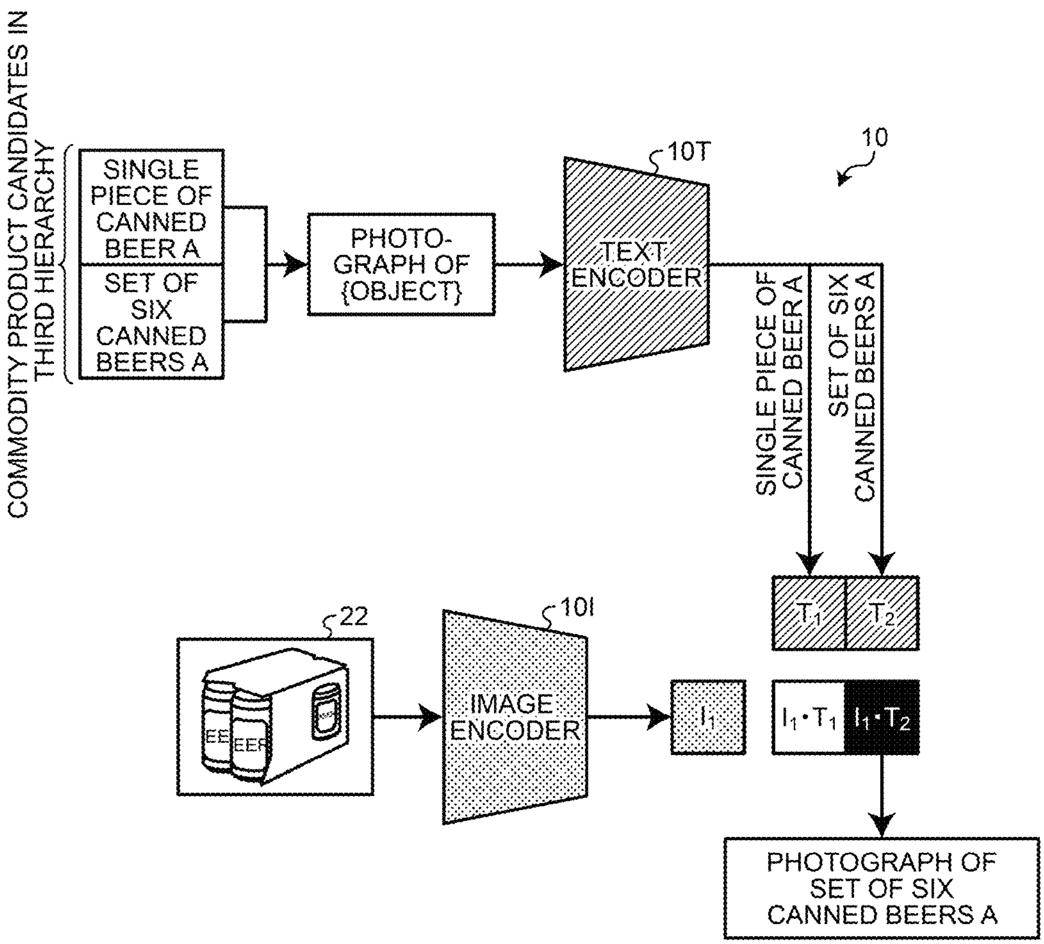
FIG. 34 is a schematic diagram (3) illustrating the case example 3 in which a commodity product item is specified.

A process of specifying the commodity product item performed at the time of detection of this type of label switch (the number of items) will be described by giving a case example. FIG. 32 to FIG. 34 are schematic diagrams (1) to (3), respectively, each illustrating a case example 3 in which a commodity product item is specified. Each of FIG. 32 to FIG. 34 illustrates an example in which, as merely one example of a gripped commodity product image 22, a partial image of the Bbox corresponding to the commodity product item "a set of six canned beers A" that has been gripped by the user 2 is generated.

As illustrated in FIG. 32, the gripped commodity product image 22 is input to the image encoder 10I included in the CLIP model 10. As a result, the image encoder 10I outputs the embedded vector $I_1$ of the gripped commodity product image 22.

In contrast, in the text encoder 10T included in the CLIP model 10, texts of "fruit", "fish", "meat", and "beverage" that correspond to the elements that are included in the first hierarchy are input as the list of the class captions in accordance with the hierarchical structure illustrated in FIG. 31. In addition, at the time of an input of the text, similarly to the example illustrated in FIG. 17, "Prompt Engineering" is, of course, able to be performed.

As a result, the text encoder 10T outputs the embedded vector $T_1$ of the text "fruit", the embedded vector $T_2$ of the text "fish", the embedded vector $T_3$ of the text "meat", . . . , and the embedded vector $T_N$ of the text "beverage".

Then, the degree of similarity between the embedded vector $I_1$ of the gripped commodity product image 22 and each of the embedded vector $T_1$ of the text "fruit", the embedded vector $T_2$ of the text "fish", the embedded vector $T_3$ of the text "meat", and the embedded vector $T_N$ of the text "beverage" is calculated.

As indicated by the invert display of black and white illustrated in FIG. 32, in this example, the degree of similarity between the embedded vector $I_1$ of the gripped commodity product image 22 and the embedded vector $T_N$ of the text "beverage" is the maximum. Consequently, the CLIP model 10 outputs the "beverage" as the prediction result of the class of the gripped commodity product image 22.

The prediction result "beverage" included in the first hierarchy obtained in this way is not the terminal node in the hierarchical structure that is illustrated in FIG. 31, so that the inference of the CLIP model 10 is continued. In other words, as illustrated in FIG. 33, the texts of "canned beer A" and the "canned beer B" that correspond to the elements belonging to the second hierarchy that is ranked lower than the first hierarchy in which the prediction result of "beverage" belongs is input as the list of the class captions in accordance with the hierarchical structure illustrated in FIG. 31. In addition, at the time of an input of the text, similarly to the example illustrated in FIG. 17, "Prompt Engineering" is, of course, able to be performed.

As a result, the text encoder 10T outputs the embedded vector $T_1$ of the text "canned beer A" and the embedded vector $T_2$ of the text "canned beer B". Then, the degree of similarity between the embedded vector $I_1$ of the gripped commodity product image 22 and each of the embedded vector $T_1$ of the text "canned beer A" and the embedded vector $T_2$ of the text "canned beer B" is calculated.

As indicated by the invert display of black and white illustrated in FIG. 33, in this example, the degree of similarity between the embedded vector $I_1$ of the gripped commodity product image 22 and the embedded vector $T_1$ of the text "canned beer A" is the maximum. Consequently, the CLIP model 10 outputs the "canned beer A" as the prediction result of the class of the gripped commodity product image 22.

The prediction result "canned beer A" in the second hierarchy obtained in this way is not the terminal node in the hierarchical structure illustrated in FIG. 31, so that the inference of the CLIP model 10 is continued. In other words, as illustrated in FIG. 34, in accordance with the hierarchical structure illustrated in FIG. 31, the texts of "a single piece of canned beer A" and "a set of six canned beers A" that correspond to the elements belonging to the third hierarchy that that is ranked lower than the second hierarchy in which the prediction result "canned beer A" belongs is input as the list of the class captions.

As a result, the text encoder 10T outputs the embedded vector $T_1$ of the text "a single piece of canned beer A" and the embedded vector $T_2$ of the text "a set of six canned beers A". Then, the degree of similarity between the embedded vector $I_1$ of the gripped commodity product image 22 and each of the embedded vector $T_1$ of the text "a single piece of canned beer A" and the embedded vector $T_2$ of the text "a set of six canned beers A".

As indicated by the invert display of black and white illustrated in FIG. 34, in this example, the degree of similarity between the embedded vector $I_1$ of the gripped commodity product image 22 and the embedded vector $T_1$ of the text of "a set of six canned beers A" is the maximum. Consequently, the CLIP model 10 outputs "a set of six canned beers A" as the prediction result of the class of the gripped commodity product image 22.

As a result of the narrowing down process performed as described above, it is possible to specify that the commodity product items included in the gripped commodity product image 22 is "canned beer A", and also, it is possible to specify that the number of gripped commodity products is "6 pieces". From the aspect of a practical use, the first detection unit 116 performs the following determination, in addition to the determination of the label switch described above. That is, the first detection unit 116 determines whether or not the number of commodity product items that has been registered at a checkout register by way of a scan is less than the number of commodity product items that has been specified by the image analysis obtained by the zero-shot image classifier. At this time, if the number of commodity product items registered at a checkout register by way of a scan is less than the number of commodity product items specified by the image analysis, it is possible to detect a fraud that is conducted by scanning the number of commodity product items that is less than the actual number of purchased commodity product items and that is caused by a label switch.

In the case where a fraud conducted by cheating the number of commodity product items to be purchased in this way has been detected, if the label switch (the number of items) has been detected by the first detection unit 116, the alert generation unit 118 is able to generate an alert addressed to the user 2. As this type of alert addressed to the user 2, it is possible to include the number of commodity product items that has been registered at a checkout register and the number of commodity product items that has been specified by image analysis obtained from the zero-shot image classifier.

Figure 35:
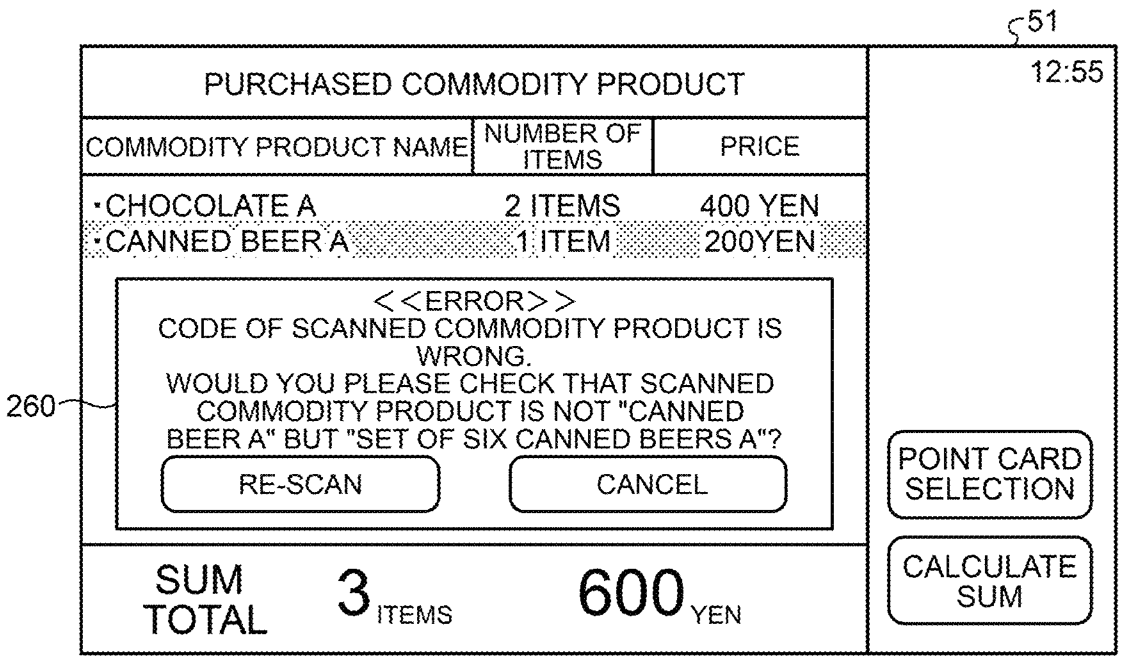
FIG. 35 is a diagram (5) illustrating a display example of an alert.

FIG. 35 is a diagram (5) illustrating a display example of an alert. FIG. 22 illustrates the alert that is displayed on the self-service checkout register 50 at the time of detection of the fraud conducted by cheating the number of commodity product items to be purchased conducted in the first detection unit 116. As illustrated in FIG. 35, an alert window 260 is displayed on the touch panel 51 of the self-service checkout register 50. On the alert window 260, the number of commodity product items of "canned beer A" that has been registered at a checkout register by way of a scan and the number of commodity product items of "a set of six canned beers A" that has been specified on the basis of image analysis performed by using the zero-shot image classifier are displayed in a state in which both of the commodity product items are able to be compared. In addition to this, it is possible to include a notification to prompt to perform a scan again in the alert window 260. According to this kind of display on the alert window 260, it is possible to warn a user of detection of a label switch (the number of items) conducted by re-labelling a label attached on the "a set of six canned beers A" to a label attached on the "canned beer A", scanning the label attached on the "canned beer A", and cheating the number of commodity product items to be purchased. Consequently, it is possible to prompt to stop calculation of a payment amount remaining in an erroneous state of the number of commodity product items to be purchased, and as a result, it is possible to suppress a damage to the store caused by the label switch (the number of items).

As another aspect, if a label switch (the number of items) has been detected by the first detection unit 116, the alert generation unit 118 is able to generate an alert addressed to the persons who are involved in the store, for example, addressed to an administrator. As this sort of alert addressed to the administrator of the store, it is possible to include identification information on a category of a fraud and the self-service checkout register 50 in which the fraud has been detected, an estimated amount of damage caused by a fraudulent act, and the like.

Figure 36:
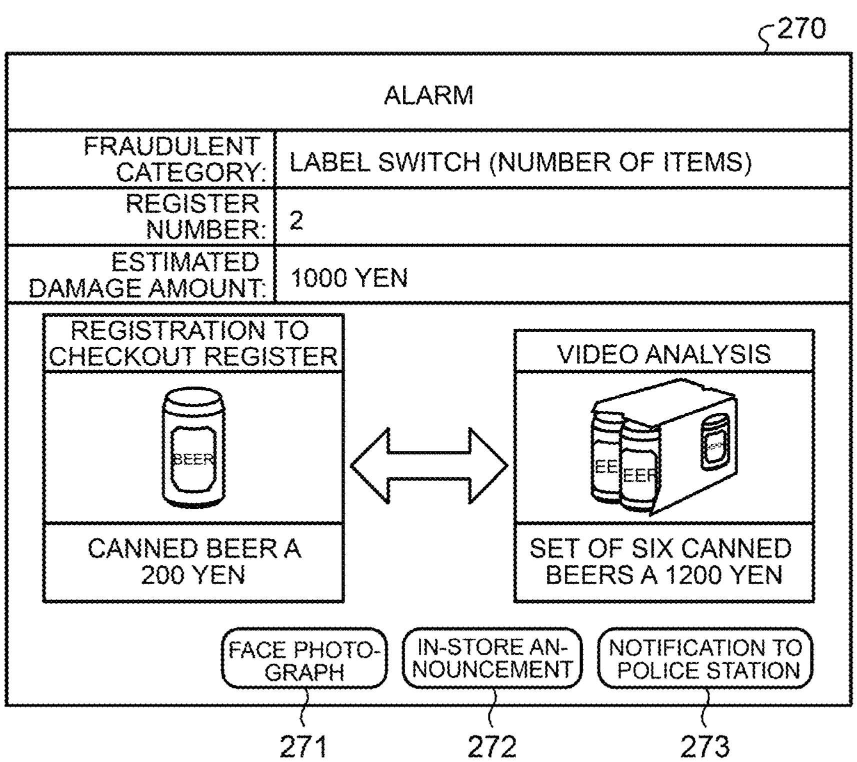
FIG. 36 is a diagram (6) illustrating a display example of an alert.

FIG. 36 is a diagram (6) illustrating a display example of an alert. FIG. 36 illustrates an alert that is displayed on the display unit of the administrator terminal 60 at the time of detection of a fraud conducted by cheating the number of commodity product items to be purchased conducted in the first detection unit 116. As illustrated in FIG. 36, an alert window 270 is displayed on the display unit of the administrator terminal 60. On the alert window 270, a set of the number of commodity product items of "canned beer A" that has been registered at a checkout register by way of a scan and a price"200 yen" and a set of the number of commodity product items of "a set of six canned beers A" that has been specified by image analysis and a price "1200 yen" are displayed in a state in which both of the commodity product items are able to be compared. Furthermore, on the alert window 270, a fraud category "label switch (the number of items)" related to a fraud conducted by switching the label of "a set of six canned beers A" to a label of the "canned beer A" and cheating the number of commodity product items to be purchased, the checkout register number "2" in which the label switch (the number of items) is occurring, and an estimated amount of damage "1000 yen (=1200 yen−200 yen)" occurring at the time of calculation of a payment amount caused by the label switch (the number of items) are displayed. In addition to this, on the alert window 270, GUI parts 271 to 273 and the like that receive a request to display a face photograph containing a captured face or the like of the user 2 who uses the self-service checkout register 50 in which a checkout register number "2" has been assigned, a request to make an announcement in the store, and a request to send a notification to a police station or the like, respectively, are displayed. According to this sort of display on the alert window 270, it is possible to implement a report about an occurrence of a damage of the label switch (the number of items), the grasping of the degree of the damage, and, furthermore, presentation of various countermeasures against the damage. Consequently, it is possible to prompt the user 2 to cope with the label switch (the number of items), and as a result, it is possible to suppress a damage to the store caused by the label switch (the number of items).

Figure 37:
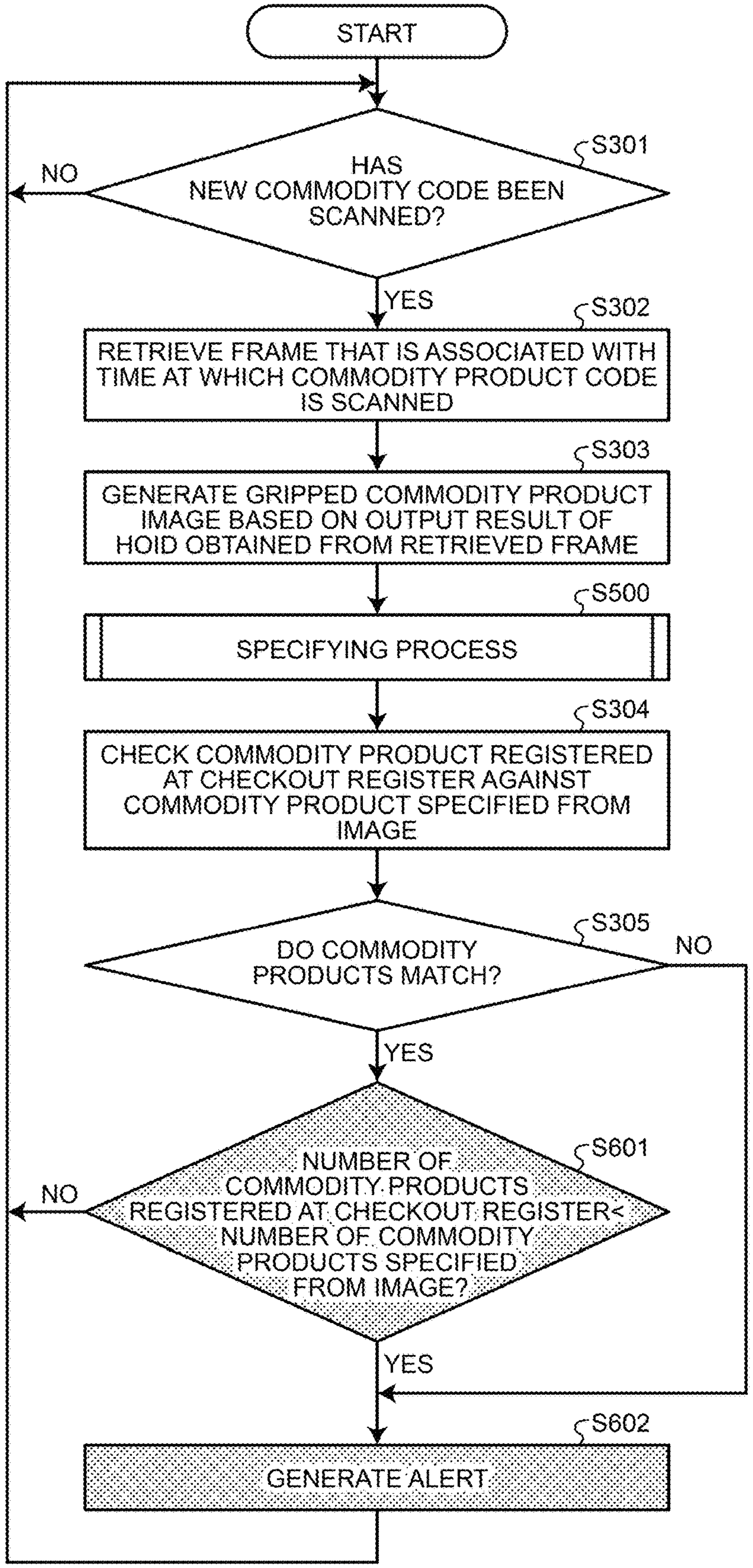
FIG. 37 is a flowchart illustrating the flow of a first detection process according to the application example 1.

In the following, a process of detecting the label switch (the number of items) described above will be described. FIG. 37 is a flowchart illustrating the flow of the first detection process according to the application example 1. In FIG. 37, the same step number is assigned to the step in which the same process as that performed in the flowchart illustrated in FIG. 28 is performed, but, in contrast, a different step number is assigned to the step in which a process that is changed in the application example 1 is performed.

As illustrated in FIG. 37, regarding the processes performed at Step S301 to Step S305, the same processes as those performed in the flowchart illustrated in FIG. 28 are performed, but, in contrast, the process performed at a branch indicated at No at Step S305 and the subsequent process are different from the processes performed in the flowchart illustrated in FIG. 28.

Namely, if the commodity product items match (Yes at Step S305), the first detection unit 116 determines whether or not the number of commodity product items that has been registered at a checkout register by way of a scan is less than the number of commodity product items that has been specified by image analysis (Step S601).

Here, if the number of commodity product items that has been registered at a checkout register by way of a scan is less than the number of commodity product items that has been specified by image analysis (Yes at Step S601), it is possible to detect a label switch (the number of items) conducted by scanning the number of commodity product items that is less than the actual number of purchased commodity product items caused by the label switch. In this case, the alert generation unit 118 generates an alert of the label switch (the number of items) that has been detected by the first detection unit 116, and outputs the generated alert (Step S602), and then, returns to the process at Step S301.

As described above, it is possible to implement detection of the label switch (the number of items) by performing the first detection process in accordance with the hierarchical structure according to the application example 1.

5-2. Application Example 2

Figure 38:
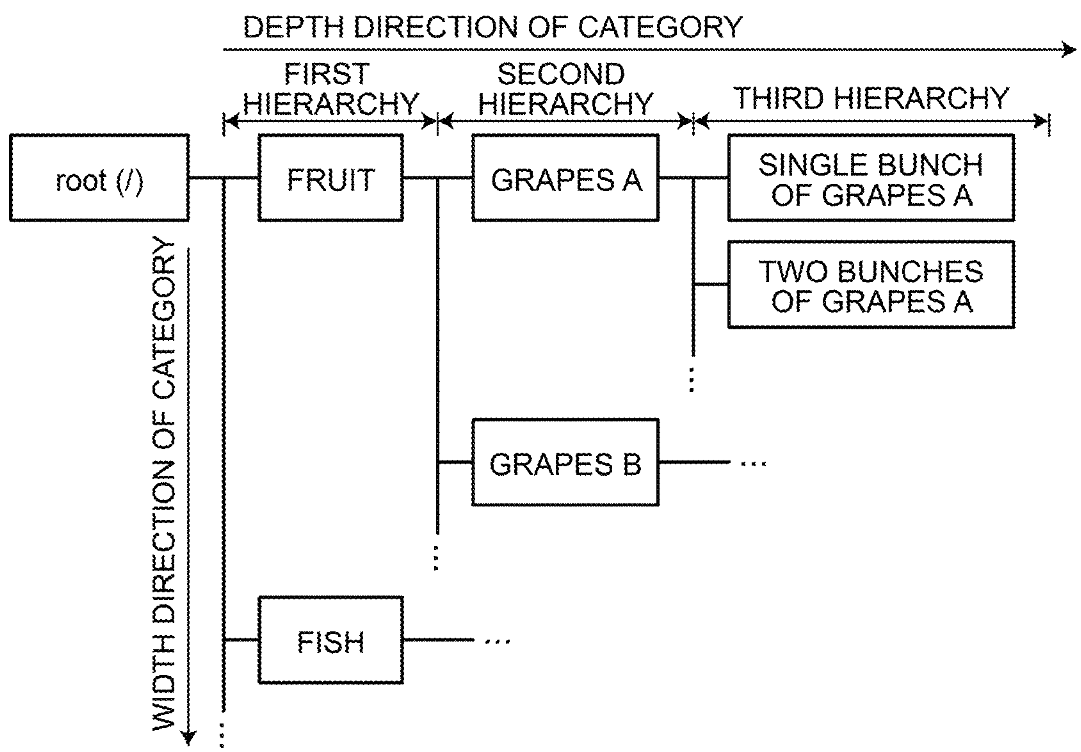
FIG. 38 is a diagram illustrating an application example 2 of a hierarchical structure.

In addition to the application example 1 described above, as another example of the hierarchical structure in which the element of the label that indicates the number of commodity products and the element of the label that indicates a unit of the number of commodity products are included, the hierarchical structure according to the application example 2 will be described as an example. FIG. 38 is a diagram illustrating an application example 2 of the hierarchical structure. FIG. 38 illustrates, for convenience of description, regarding the second hierarchy and the subsequent hierarchies, the elements that belongs to the hierarchy that is ranked lower than the hierarchy in which the large classification of the commodity product indicated by "fruit" belongs are extracted, and, regarding the third hierarchy and the subsequent hierarchies, the elements belongs to the hierarchy that is ranked lower than the hierarchy in which the small classification of the commodity product indicated by "grapes A" belongs are extracted.

As illustrated in FIG. 38, in the hierarchical structure according to the application example 2, the first hierarchy, the second hierarchy, and the third hierarchy are included. Among these, in the first hierarchy, as one example of the large classification of the commodity products, the elements of "fruit", "fish", and the like are included. Furthermore, in the second hierarchy, as another example of the small classification of the commodity products, the elements of "grapes A", "grapes B", and the like are included. Furthermore, in the third hierarchy, as an example of a label that includes the number of commodity products and a unit of the commodity products, the elements of "single bunch of grapes A", "two bunches of grapes A", and the like are included.

In this way, if the label that indicates the number of commodity products and the label that indicates a unit of the commodity products are included in the hierarchical structure, in addition to the banana trick described above, it is possible to implement detection of a fraud conducted by manually inputting the number of commodity products that is less than the actual number of commodity products to be purchased caused by the banana trick. Hereinafter, a fraud conducted by manually inputting the number of commodity products that is less than the actual number of commodity products to be purchased caused by the banana trick is sometimes referred to as a "banana trick (the number of items)".

In this way, registration of a commodity product without a label performed at a checkout register is performed by a manual input by the user 2. As merely one example, the self-service checkout register 50 sometimes receive registration of a commodity product without a label by way of an operation performed on the selection screen of the commodity product without a code illustrated in FIG. 39.

Figure 39:
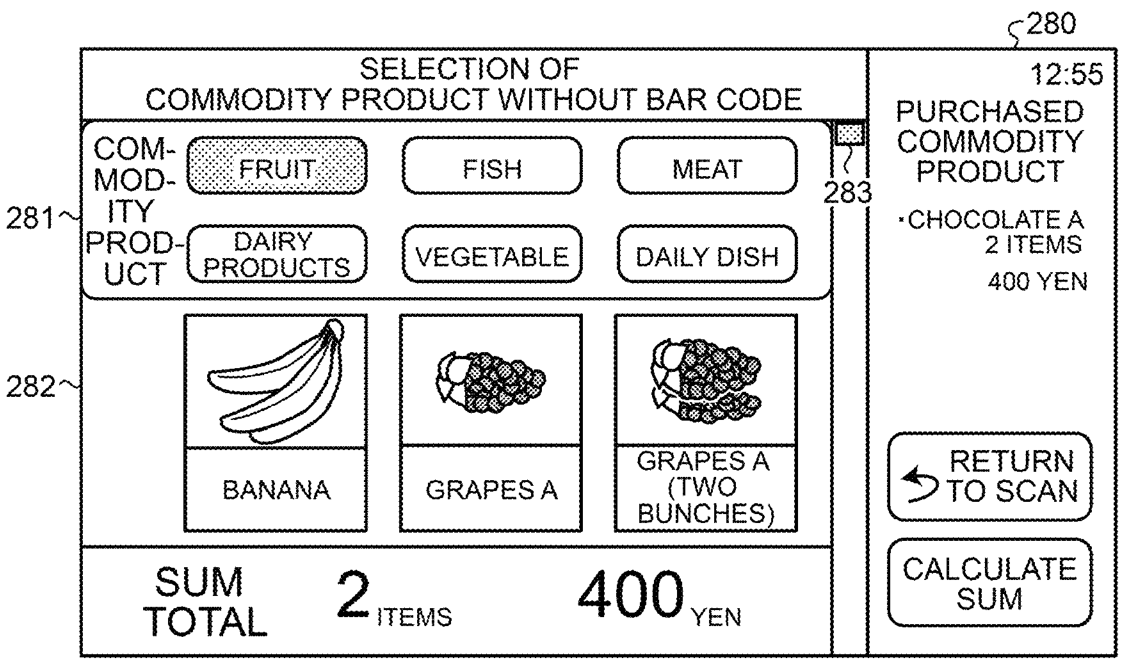
FIG. 39 is a diagram (3) illustrating a display example of a self-service checkout register.

FIG. 39 is a diagram (3) illustrating a display example of the self-service checkout register 50. As illustrated in FIG. 39, a selection screen 280 related to the commodity product without a code includes a display area 281 of the category of the commodity products, and a display area 282 of the commodity product item belonging to the category that is being selected. For example, an example in which, on the selection screen 280 related to the commodity product without a code illustrated in FIG. 39, the category of the commodity product of "fruit" is being selected from among the categories of the commodity products of "fruit", "fish", "meat", "dairy products", "vegetable", and "daily dish" that are included in the display area 281. In this case, in the display area 282, commodity product items of "banana", "grapes A", "grapes A (two bunches)", and the like that belong to the category of the commodity product indicated by "fruit" are displayed. If there is no space for arranging all of the commodity product items belonging to the category of the commodity products indicated by "fruit" in the display area 282, it is possible to increase the range in which the commodity product items are arranged by scrolling the display range of the display area 282 by using a scroll bar 283. By receiving a selection operation from among the commodity product items that are displayed on the display area 282 in this way, it is possible to receive an operation of registering a commodity product without a label at a checkout register.

Figure 40:
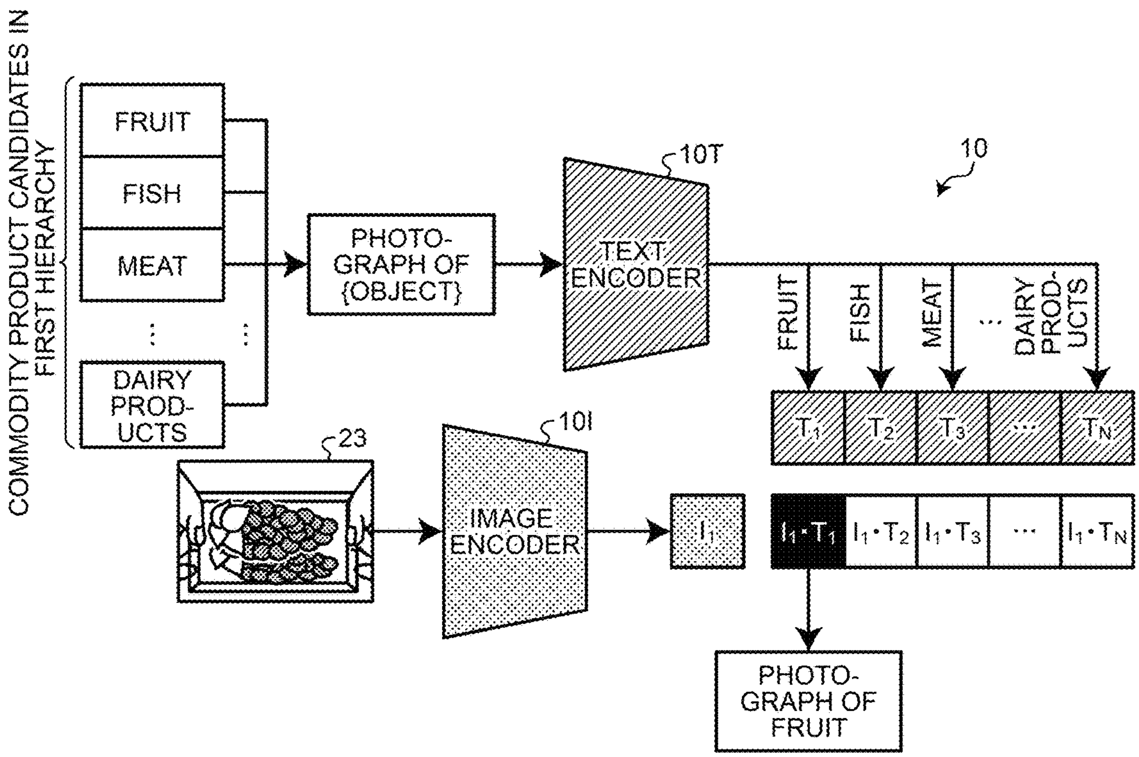
FIG. 40 is a schematic diagram (1) illustrating a case example 4 in which a commodity product item is specified.
Figure 41:
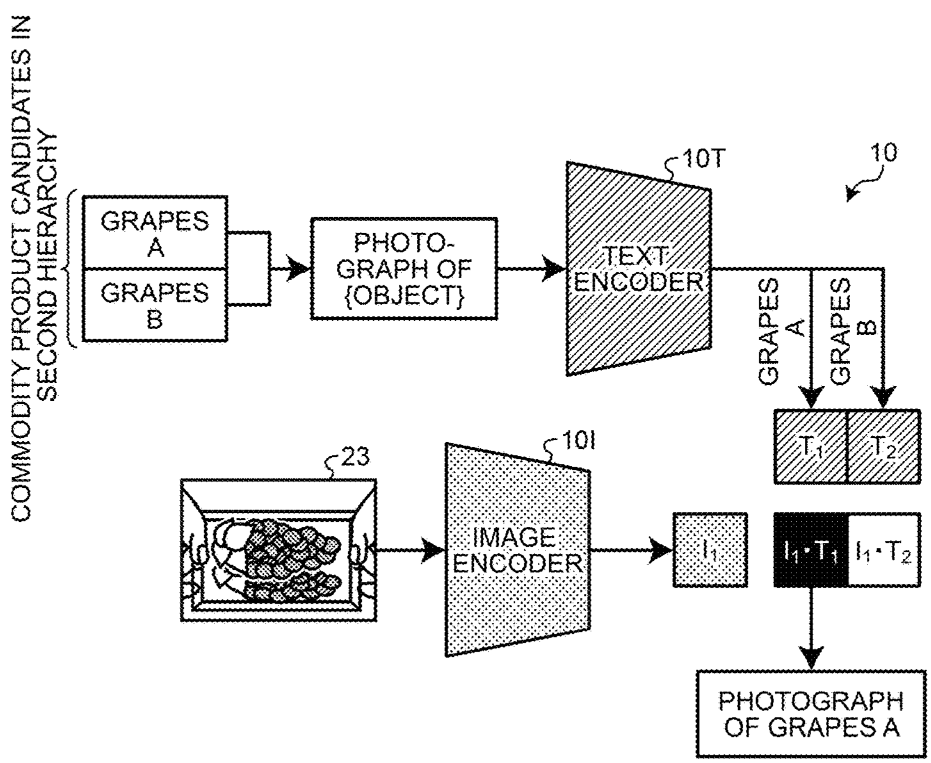
FIG. 41 is a schematic diagram (2) illustrating the case example 4 in which a commodity product item is specified.
Figure 42:
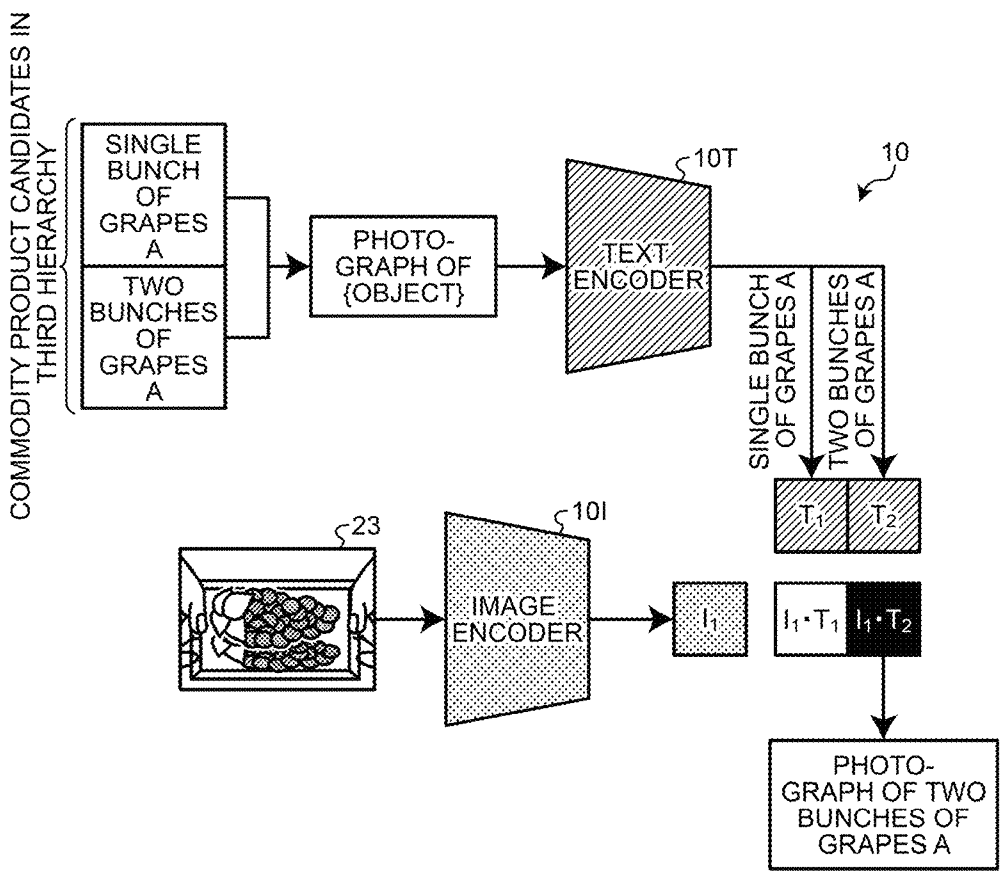
FIG. 42 is a schematic diagram (3) illustrating the case example 4 in which a commodity product item is specified.

A process of specifying a commodity product item performed at the time of detection of the banana trick (the number of items) in this way will be described by giving a case example. FIG. 40 to FIG. 42 are schematic diagrams (1) to (3), respectively, each illustrating the case example 4 of specifying the commodity product item. FIG. 40 to FIG. 42 illustrate an example in which, as merely one example of a gripped commodity product image 23, a partial image of a Bbox that corresponds to the commodity product items of "two bunches of grapes A" that are gripped by the user 2.

As illustrated in FIG. 40, the gripped commodity product image 23 is input to the image encoder 10I included in the CLIP model 10. As a result, the image encoder 10I outputs the embedded vector $I_1$ of the gripped commodity product image 23.

In contrast, in the text encoder 10T included in the CLIP model 10, the texts of "fruit", "fish", "meat", and "dairy products" that correspond to the elements included in the first hierarchy are input as the list of the class captions in accordance with the hierarchical structure illustrated in FIG. 38. In addition, at the time of an input of the text, similarly to the example illustrated in FIG. 17, "Prompt Engineering" is, of course, able to be performed.

As a result, the text encoder 10T outputs the embedded vector $T_1$ of the text "fruit", the embedded vector $T_2$ of the text "fish", the embedded vector $T_3$ of the text "meat", . . . , and the embedded vector $T_N$ of the text "dairy products".

Then, the degree of similarity between the embedded vector $I_1$ of the gripped commodity product image 23 and each of the embedded vector $T_1$ of the text "fruit", the embedded vector $T_2$ of the text "fish", the embedded vector $T_3$ of the text "meat", and the embedded vector $T_N$ of the text "dairy products" is calculated.

As indicated by the invert display of black and white illustrated in FIG. 40, in this example, the degree of similarity between the embedded vector $I_1$ of the gripped commodity product image 23 and the embedded vector $T_1$ of the text "fruit" is the maximum. Consequently, the CLIP model 10 outputs "fruit" as the prediction result of the class of the gripped commodity product image 23.

The prediction result of "fruit" included in the first hierarchy obtained in this way is not the terminal node in the hierarchical structure illustrated in FIG. 38, so that the inference of the CLIP model 10 is continued. In other words, as illustrated in FIG. 41, the texts of "grapes A" and "grapes B" that correspond to the elements belonging to the second hierarchy that is ranked lower than the first hierarchy in which the prediction result of "fruit" that belongs are input as the list of the class captions in accordance with the hierarchical structure illustrated in FIG. 38. In addition, at the time of an input of the text, similarly to the example illustrated in FIG. 17, "Prompt Engineering" is, of course, able to be performed.

As a result, the text encoder 10T outputs the embedded vector $T_1$ of the text "grapes A" and the embedded vector $T_2$ of the text "grapes B". Then, the degree of similarity between the embedded vector $I_1$ of the gripped commodity product image 23 and each of the embedded vector $T_1$ of the text "grapes A" and the embedded vector $T_2$ of the text "grapes B" is calculated.

As indicated by the invert display of black and white illustrated in FIG. 41, in this example, the degree of similarity between the embedded vector $I_1$ of the gripped commodity product image 23 and the embedded vector $T_1$ of the text "grapes A" is the maximum. Consequently, the CLIP model 10 outputs "grapes A" as the prediction result of the class of the gripped commodity product image 23.

The prediction result "grapes A" included in the second hierarchy obtained in this way is not the terminal node in the hierarchical structure illustrated in FIG. 38, so that the inference of the CLIP model 10 is continued. In other words, as illustrated in FIG. 42, the texts of "single bunch of grapes A" and "two bunches of grapes A" that correspond to the elements belonging to the third hierarchy that is ranked lower than the second hierarchy in which the prediction result of "grapes A" belongs are input as the list of the class captions in accordance with the hierarchical structure illustrated in FIG. 38.

As a result, the text encoder 10T outputs the embedded vector $T_1$ of the text "single bunch of grapes A" and the embedded vector $T_2$ of the text "two bunches of grapes A". Then, the degree of similarity between the embedded vector $I_1$ of the gripped commodity product image 22 and each of the embedded vector $T_1$ of the text "single bunch of grapes A" and the embedded vector $T_2$ of the text "two bunches of grapes A" is calculated.

As indicated by the invert display of black and white illustrated in FIG. 42, in this example, the degree of similarity between the embedded vector $I_1$ of the gripped commodity product image 23 and the embedded vector $T_2$ of the text "two bunches of grapes A" is the maximum. Consequently, the CLIP model 10 outputs "two bunches of grapes A" as the prediction result of the class of the gripped commodity product image 23.

As a result of the narrowing down process performed as described above, it is possible to specify that the commodity product item included in the gripped commodity product image 23 is "two bunches of grapes A", and also, it is also possible to specify that the number of gripped commodity products is "two bunches". From the aspect of a practical use, the second detection unit 117 performs the following determination, in addition to the banana trick described above. That is, the second detection unit 117 determines whether or not the number of commodity product items that has been registered at a checkout register by way of a manual input is less than the number of commodity product items that has been specified by the image analysis obtained by the zero-shot image classifier. At this time, if the number of commodity product items that has been registered at a checkout register by way of a manual input is less than the number of commodity product items that has been specified by the image analysis, it is possible to detect a fraud that is conducted by scanning the number of commodity product items that is less than the actual number of purchased commodity product items caused by a banana trick.

In the case where a fraud by cheating the number of commodity product items to be purchased conducted in this way has been detected, if a banana trick (the number of items) has been detected by the second detection unit 117, the alert generation unit 118 is able to generate an alert addressed to the user 2. As this type of alert addressed to the user 2, it is possible to include the number of commodity product items that has been registered at a checkout register, and the number of commodity product items that has been specified by image analysis obtained from the zero-shot image classifier.

Figure 43:
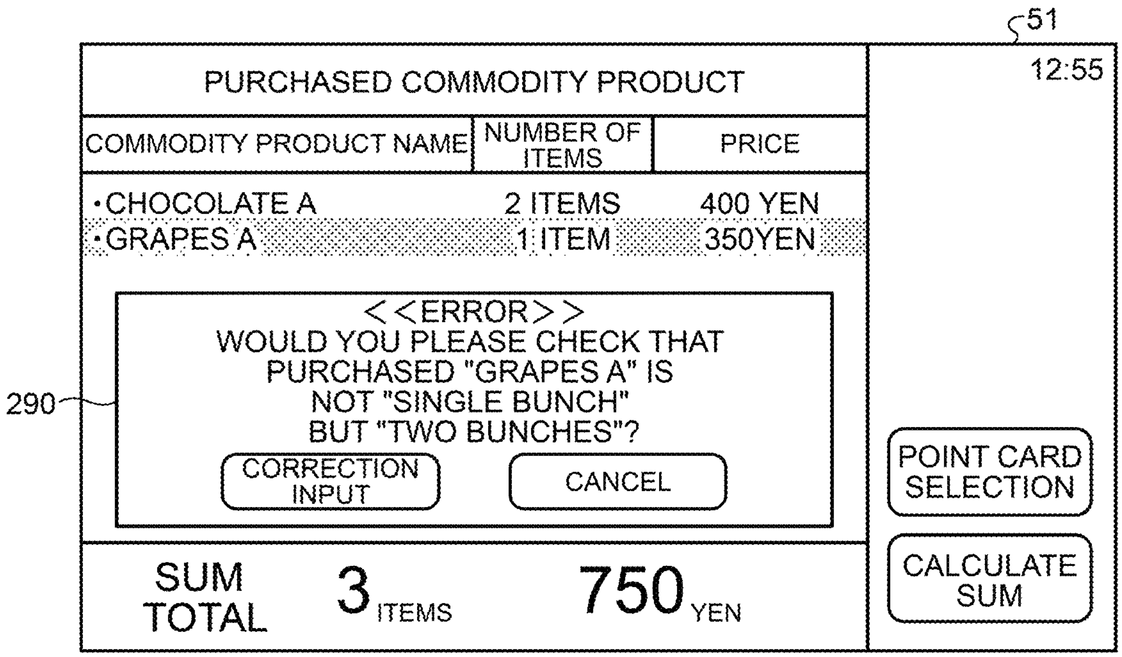
FIG. 43 is a diagram (7) illustrating a display example of an alert.

FIG. 43 is a diagram (7) illustrating a display example of an alert. FIG. 43 illustrates the alert that is displayed on the self-service checkout register 50 at the time of detection of the fraud by cheating the number of commodity product items to be purchased conducted in the second detection unit 117. As illustrated in FIG. 43, an alert window 290 is displayed on the touch panel 51 of the self-service checkout register 50. On the alert window 290, the number of commodity product items of "grapes A" that has been registered at a checkout register by way of a manual input and the number of commodity product items of "two bunches of grapes A" that has been specified on the basis of image analysis are displayed in a state in which both of the commodity product items are able to be compared. In addition to this, it is possible to include a notification to prompt to perform a manual input again in the alert window 290. According to this kind of display on the alert window 290, it is possible to warn a user of detection of a banana trick (the number of items) conducted by cheating the number of commodity product items of "grapes A" to be purchased by manually inputting "single bunch" instead of "two bunches". Consequently, it is possible to prompt to stop calculation of a payment amount remaining in an erroneous state of the number of commodity product items to be purchased, and as a result, it is possible to suppress a damage to the store caused by the banana trick (the number of items).

As another aspect, if a banana trick (the number of items) has been detected by the second detection unit 117, the alert generation unit 118 is able to generate an alert addressed to the persons who are involved in the store, for example, addressed to an administrator. As this sort of alert addressed to the administrator of the store, it is possible to include identification information on a category of a fraud and the self-service checkout register 50 in which the fraud has been detected, an estimated amount of damage caused by a fraudulent act, and the like.

Figure 44:
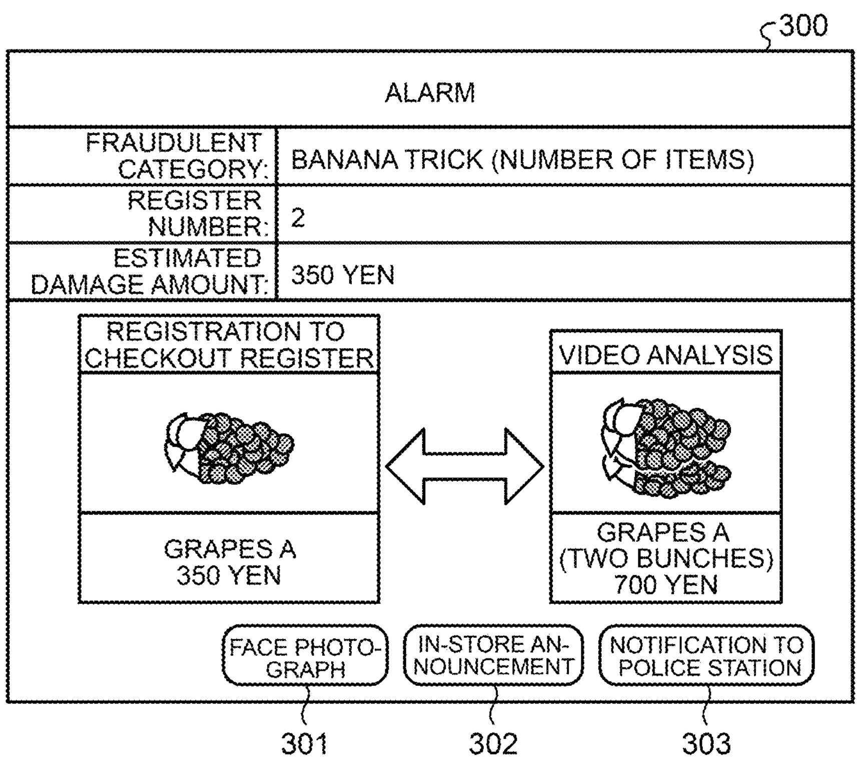
FIG. 44 is a diagram (8) illustrating a display example of an alert.

FIG. 44 is a diagram (8) illustrating a display example of an alert. FIG. 36 illustrates an alert that is displayed on the display unit of the administrator terminal 60 at the time of detection of a fraud by cheating the number of commodity product items to be purchased conducted in the second detection unit 117. As illustrated in FIG. 44, an alert window 300 is displayed on the display unit of the administrator terminal 60. On the alert window 300, a set of the number of commodity product items of "grapes A" that has been registered at a checkout register by way of a manual input and a price "350 yen" and a set of the number of commodity product items of "two bunches of grapes A" that has been specified by image analysis and a price "700 yen" are displayed in a state in which both of the commodity product items are able to be compared. Furthermore, on the alert window 300, fraud category "banana trick (the number of items)" related to a fraud conducted by cheating the number of commodity product items of "grapes A" to be purchased by manually inputting "single bunch" instead of "two bunches", the checkout register number "2" in which the banana trick (the number of items) is occurring, and an estimated amount of damage "350 yen (=700 yen−350 yen)" occurring at the time of calculation of a payment amount caused by the banana trick (the number of items) are displayed. In addition to this, on the alert window 300, GUI parts 301 to 303 and the like that receive a request to display a face photograph containing a captured face or the like of the user 2 who uses the self-service checkout register 50 in which a checkout register number "2" has been assigned, a request to make an announcement in the store, and a request to send a notification to a police station or the like, respectively, are displayed. According to this sort of display on the alert window 300, it is possible to implement a report about an occurrence of a damage of the banana trick (the number of items), the grasping of the degree of the damage, and, furthermore, presentation of various countermeasures against the damage. Consequently, it is possible to prompt the user 2 to cope with the banana trick (the number of items), and as a result, it is possible to suppress a damage to the store caused by the banana trick (the number of items).

Figure 45:
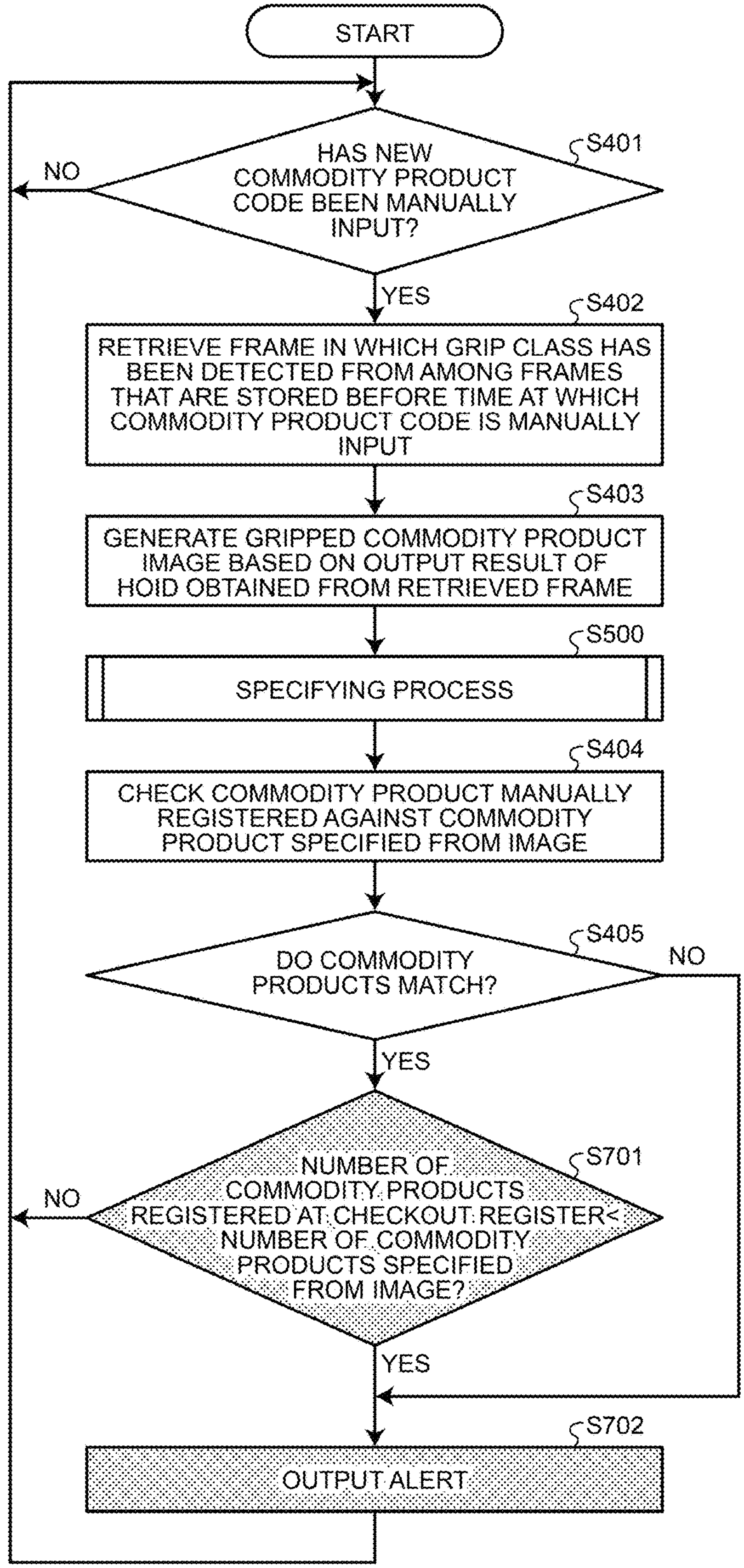
FIG. 45 is a flowchart illustrating the flow of a second detection process according to the application example 2.

In the following, a process of detecting the banana trick (the number of items) described above will be described. FIG. 45 is a flowchart illustrating the flow of the second detection process according to the application example 2. In FIG. 45, the same step number is assigned to the step in which the same process as that performed in the flowchart illustrated in FIG. 29 is performed, in contrast, a different step number is assigned to the step in which a process that is changed in the application example 2 is performed.

As illustrated in FIG. 45, regarding the processes performed at Step S401 to Step S405, the same processes as those performed in the flowchart illustrated in FIG. 29 are performed, but, in contrast, the process performed at a branch indicated at No at Step S405 and the subsequent process are different from the processes performed in the flowchart illustrated in FIG. 29.

Namely, if the commodity product items match (Yes at Step S405), the second detection unit 117 determines whether or not the number of commodity product items that has been registered at a checkout register by way of a manual input is less than the number of commodity product items that has been specified by image analysis (Step S701).

Here, if the number of commodity product items that has been registered at a checkout register by way of a manual input is less than the number of commodity product items that has been specified by image analysis (Yes at Step S701), the following possibility is increased. That is, it is possible to detect a banana trick (the number of items) conducted by manually inputting the number of commodity product items that is less than the actual number of purchased commodity product items caused by the banana trick. In this case, the alert generation unit 118 generates an alert of the banana trick (the number of items) that has been detected by the second detection unit 117, and outputs the generated alert (Step S702), and then, returns to the process at Step S401.

As described above, it is possible to implement detection of the banana trick (the number of items) by performing the second detection process in accordance with the hierarchical structure according to the application example 2.

5-3. Application Example 3

Figure 46:
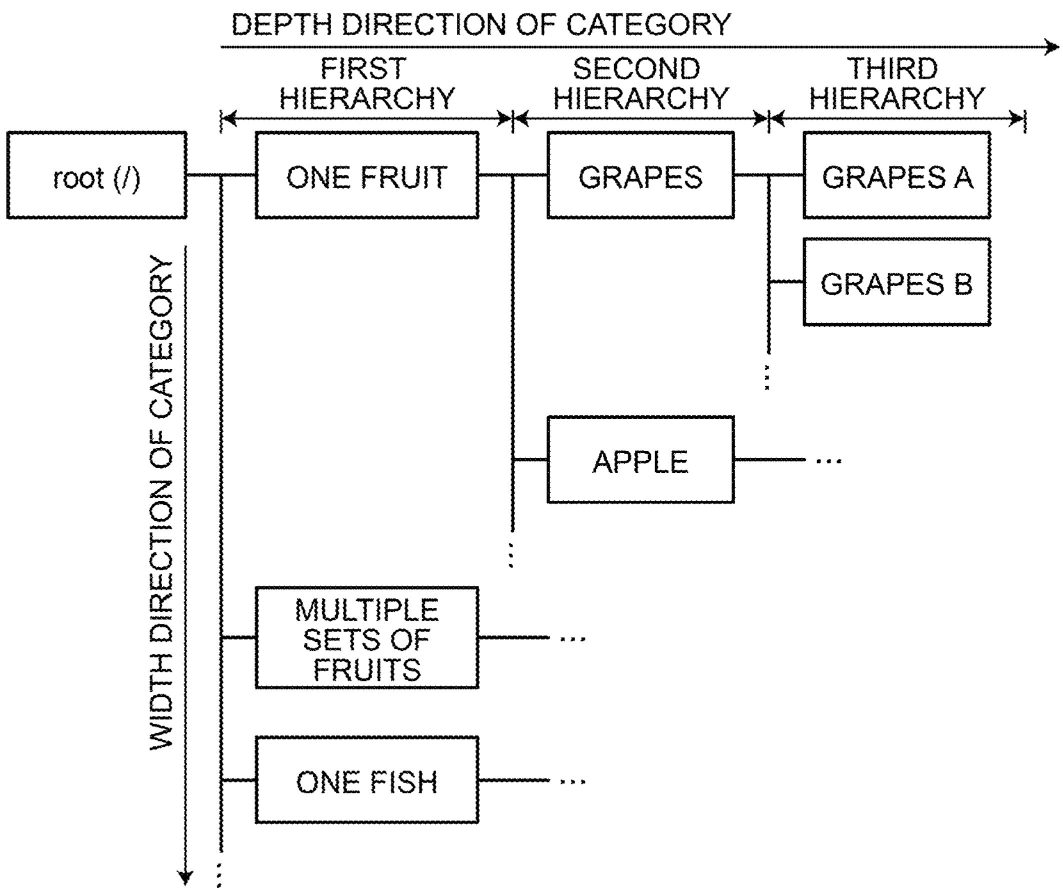
FIG. 46 is a diagram illustrating an application example 3 of a hierarchical structure.

In the application example 1 and the application example 2 described above, an example in which the element of the label that indicates the number of commodity products and the element of the label that indicates a unit of the number of commodity products are included in the third hierarchy has been described; however, the element of the label that indicates the number of commodity products and the element of the label that indicates that indicates a unit of the number of commodity products may be included any one of the hierarchies. FIG. 46 is a diagram illustrating an application example 3 of the hierarchical structure. FIG. 46 illustrates an example in which the element of the label that indicates the number of commodity products and the element of the label that indicates that indicates a unit of the number of commodity products are included in the first hierarchy.

As illustrated in FIG. 46, the first hierarchy, the second hierarchy, and the third hierarchy are included in the hierarchical structure according to the application example 3. Among these, in the first hierarchy, as an example of the labels that include the number of commodity products, a unit of the commodity products, and the large classification of the commodity product, an element of "a piece of fruit", an element of "a plurality of pieces of fruit", and the like are included, respectively. Furthermore, in the second hierarchy, as another example of the small classification of the commodity products, an element of "grapes", an element of "apple", and the like are included. Furthermore, in the third hierarchy, as an example of the commodity product item, an element of "grapes A", an element of "grapes B", and the like are included.

In this way, even when the element of the label that indicates the number of commodity products and the element of the label that indicates a unit of the number of commodity products are included in any one of the hierarchies, it is possible to detect a fraud by cheating the number of purchased commodity products conducted by the above described label switch (the number of items), the above described banana trick (the number of items), and the like.

5-4. Application Example 4

In the first embodiment described above, as an example of the attribute of the commodity product, in addition to the category (the large classification and the small classification), an example in which the price attribute is added to the template; however, the attribute of the commodity product is not limited to this. For example, from the aspect of enhancing the accuracy of embedding a text of a class caption included in the zero-shot image classifier to a feature space, an attribute of "color", "shape", or the like may be added to the template. In addition to this, from the viewpoint of suppressing a shortage of stock in a store, an attribute of "quantity in stock" or the like may be added to the template.

Figure 47:
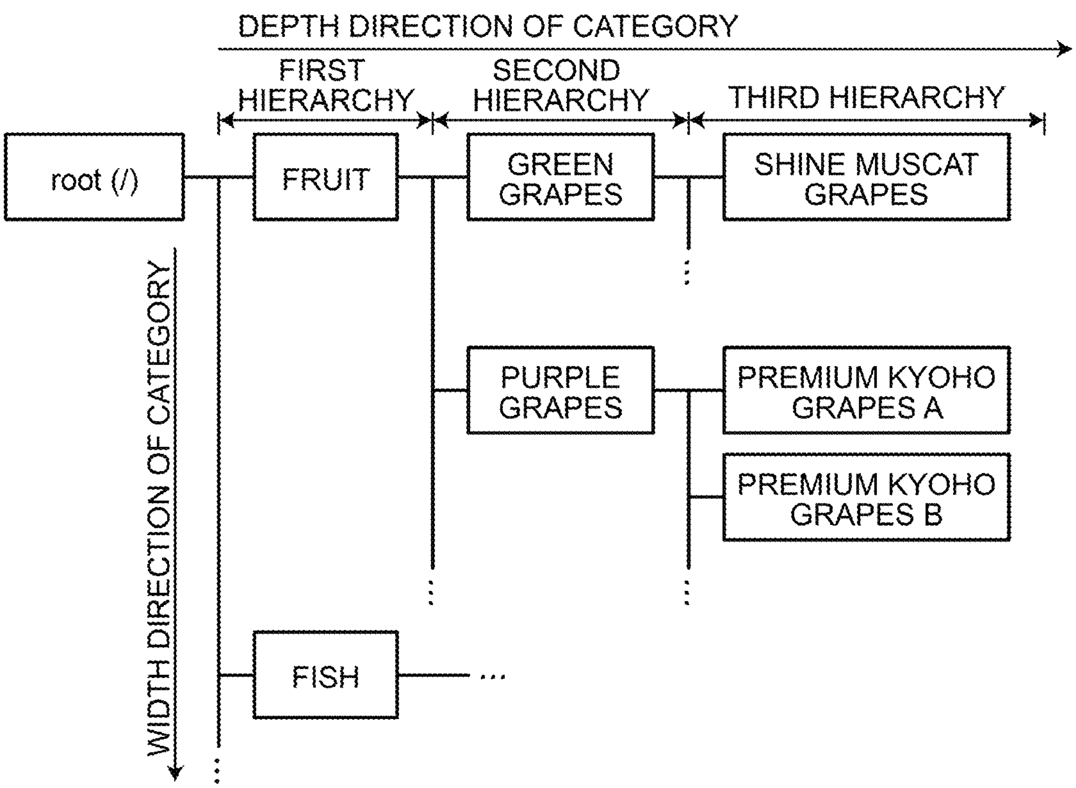
FIG. 47 is a diagram illustrating an application example 4 of a hierarchical structure.

FIG. 47 is a diagram illustrating the application example 4 of the hierarchical structure. In FIG. 47, as an example of the attribute of the commodity product, an example in which an element corresponding to the attribute of "color" is added to each of the elements included in the second hierarchy is indicated. As illustrated in FIG. 47, in the hierarchical structure according to the application example 3, the first hierarchy, the second hierarchy, and the third hierarchy are included. Among these, in the first hierarchy, as an example of the large classification of the commodity products, the elements of "fruit", "fish", and the like are included. Furthermore, in the second hierarchy, as one example of a color of the commodity product, the elements of "green grapes", "purple grapes", and the like are included. Furthermore, in the third hierarchy, as an example of the commodity product item belonging to the element of "green grapes" included in the second hierarchy, "Shine Muscat grapes" is included, and, in addition, as an example of the commodity product item belonging to the element "purple grapes" included in the second hierarchy, "premium Kyoho grapes A" and "premium Kyoho grapes B" are included.

In this way, as an example of the attribute of the commodity product, as a result of the element of "color", "shape", or the like being added to the template, it is possible to enhance the accuracy of the accuracy of embedding a text of a class caption included in the zero-shot image classifier to a feature space.

5-5. Application Example 5

In the first embodiment described above, the hierarchical structure data has been indicated as one example of the reference source data in which the attribute of the commodity product is associated with each of the plurality of hierarchies, and example in which one or a plurality of commodity product candidates are specified by being referred to by the zero-shot image classifier has been indicated. In addition, an example in which, in the hierarchical structure data, from among the candidates for the a large number of types of commodity products that are targeted for the replacement, the class captions that correspond to the plurality of commodity product candidates that are arranged in the inside of a store at the present moment are listed has been indicated as merely one example; however, the example is not limited to this.

As merely one example, the hierarchical structure data may be generated on the basis of the commodity products that are arrived at the store at the time of year for each time of year. For example, in the case where the replacement of the commodity products in the store is performed every month, the data generation unit 112 generates the hierarchical structure data as follows at each time of year. Namely, the hierarchical structure data is generated for each time of year in a scheme of, for example, the hierarchical structure data related to the commodity products to be arrived in November in 2022, the hierarchical structure data related to the commodity products to be arrived in December in 2022, the hierarchical structure data related to the commodity products to be arrived in January in 2023, and the like. After that, the fraud detection unit 115 refers to the hierarchical structure data corresponding to the time at which the commodity product item has been specified from among the pieces of hierarchical structure data that are stored for each time of year, and inputs the obtained result to the text encoder included in the zero-shot image classifier. Consequently, it is possible to change the reference source data that is referred to by the zero-shot image classifier in conformity to the replacement of the commodity products performed in the store. As a result, even if the life cycle of each of the commodity products stocked in the store is short, it is possible to implement stable accuracy of specifying a commodity product item including before and after the replacement of the commodity products.

5-6. Numerical Value

The number of self-service checkout registers and cameras, examples of numerical values, examples of the training data, the number of pieces of training data, the machine the learning models, each of the class names, the number of classes, the data formats, and the like that are used in the embodiment described above are only examples and may be arbitrarily changed. Furthermore, the flow of the processes descried in each of the flowcharts may be changed as long as the processes do not conflict with each other. In addition, a model generated from various algorithms, such as a neural network, may be used for each of the models.

In addition, regarding a scan position and a position of a shopping basket, the information processing apparatus 100 is also able to use a known technology, such as another machine learning model for detecting a position, an object detection technology, or a position detection technology. For example, the information processing apparatus 100 is able to detect a position of a shopping basket on the basis of a difference between frames (image data) and a change in frames in time series, so that the information processing apparatus 100 may also perform detection by using the difference between frames and the change in frames in time series, or may also generate another model by using the difference between frames and the change in frames in time series. Furthermore, by designating a size of the shopping basket in advance, the information processing apparatus 100 is also able to identify the position of the shopping basket in the case where an object with that size has been detected from the image data. In addition, the scan position is a position that is fixed to an extent, so that the information processing apparatus 100 is also able to identify the position designated by an administrator or the like as the scan position.

5-7. System

The flow of the processes, the control procedures, the specific names, and the information containing various kinds of data or parameters indicated in the above specification and drawings can be arbitrarily changed unless otherwise stated. Furthermore, specific examples, distributions, numerical values, and the like described in the embodiment are only examples and can be arbitrarily changed.

Furthermore, the specific shape of a separate or integrated device is not limited to the drawings. For example, the video image acquisition unit 113 and the fraud detection unit 115 may be integrated, or the fraud detection unit 115 may be separated to the first detection unit 116 and the second detection unit 117. In other words, all or part of the device can be configured by functionally or physically separating or integrating any of the units in accordance with various loads or use conditions. In addition, all or any part of each of the processing functions performed by the each of the devices can be implemented by a CPU and by programs analyzed and executed by the CPU or implemented as hardware by wired logic.

5-8. Hardware

Figure 48:
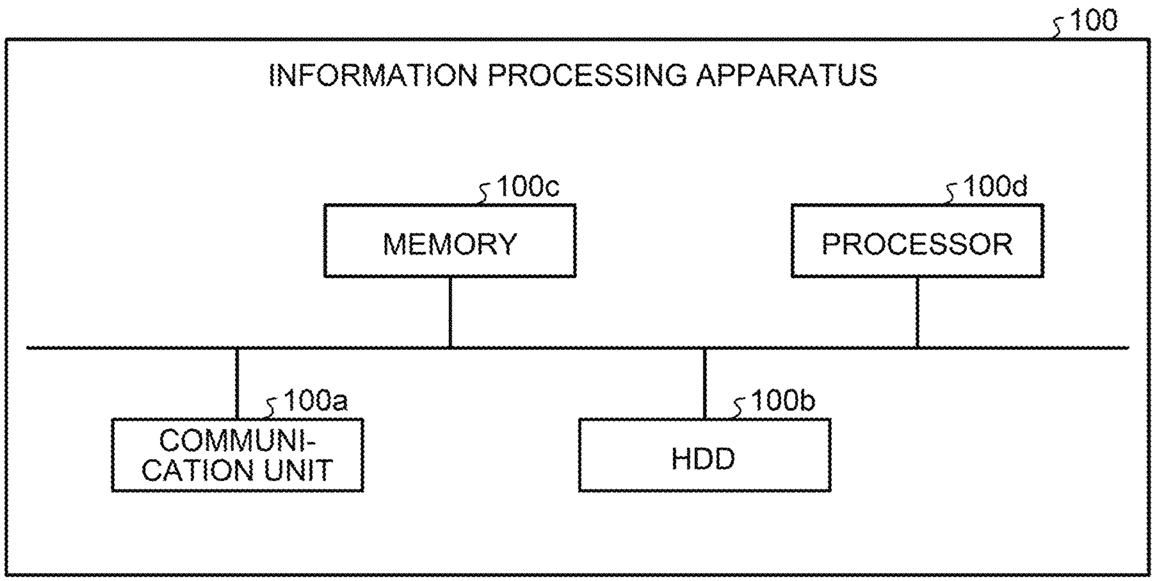
FIG. 48 is a diagram illustrating an example of a hardware configuration of the information processing apparatus.

FIG. 48 is a diagram illustrating an example of a hardware configuration of the information processing apparatus. Here, as one example, the information processing apparatus 100 will be described. As illustrated in FIG. 48, the information processing apparatus 100 includes a communication device 100*a*, a hard disk drive (HDD) 100*b*, a memory 100*c*, and a processor 100*d*. In addition, each of the units illustrated in FIG. 48 is connected each other via a bus or the like.

The communication device 100*a* is a network interface card or the like, and communicates with another device. The HDD 100*b* stores therein programs and the DB that operate the function illustrated in FIG. 2.

The processor 100*d* operates the process that executes each of the functions described above in FIG. 2 or the like by reading the programs that execute the same process as that performed by each of the processing units illustrated in FIG. 2 from the HDD 100*b* or the like and loading the read program in the memory 100*c*. For example, the process executes the same function as that performed by each of the processing units included in the information processing apparatus 100. Specifically, the processor 100*d* reads, from the HDD 100*b* or the like, the programs having the same function as that performed by each of the machine learning unit 111, the data generation unit 112, the video image acquisition unit 113, the self-service checkout register data acquisition unit 114, the fraud detection unit 115, the alert generation unit 118, and the like. Then, the processor 100*d* executes the process for executing the same process as that performed by each of the machine learning unit 111, the data generation unit 112, the video image acquisition unit 113, the self-service checkout register data acquisition unit 114, the fraud detection unit 115, the alert generation unit 118, and the like.

In this way, the information processing apparatus 100 is operated as an information processing apparatus that executes an information processing method by reading and executing the programs. In addition, the information processing apparatus 100 is also able to implement the same function as that described above in the embodiment by reading the programs described above from a recording medium by a medium recording device and executing the read programs described above. In addition, the programs described in another embodiment are not limited to be executed by the information processing apparatus 100. For example, the embodiment described above may also be similarly used in a case in which another computer or a server executes a program, or in a case in which another computer and a server cooperatively execute the program with each other.

The programs may be distributed via a network, such as the Internet. Furthermore, the programs may be executed by storing the programs in a recording medium that can be read by a computer readable medium, such as a hard disk, a flexible disk (FD), a CD-ROM, a magneto-optical disk (MO), a digital versatile disk (DVD), or the like, and read the programs from the recording medium by the computer.

Figure 49:
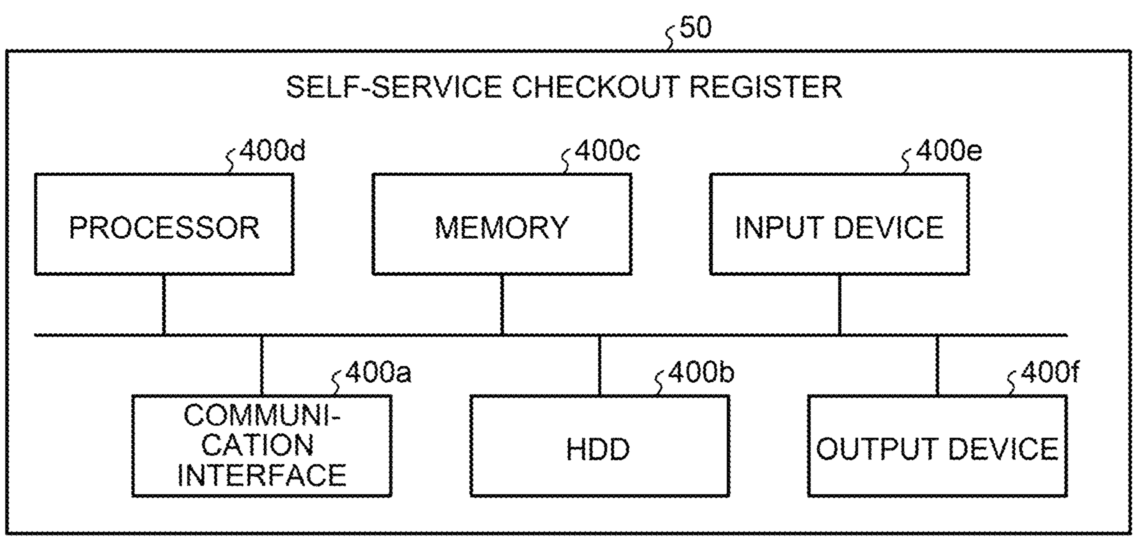
FIG. 49 is a diagram illustrating an example of a hardware configuration of the self-service checkout register.

In the following, the self-service checkout register 50 will be described. FIG. 49 is a diagram illustrating an example of a hardware configuration of the self-service checkout register 50. As illustrated in FIG. 49, the self-service checkout register 50 includes a communication interface 400*a*, a HDD 400*b*, a memory 400*c*, a processor 400*d*, an input device 400*e*, and an output device 400*f*. In addition, each of the units illustrated in FIG. 49 is connected each other via a bus or the like The communication interface 400*a* is a network interface card or the like, and communicates with another device. The HDD 400*b* stores therein programs and data that operate each of the functions of the self-service checkout register 50.

The processor 400*d* is a hardware circuit that operates the process that executes each of the functions of the self-service checkout register 50 by reading the program that executes the process of each of the functions of the self-service checkout register 50 from the HDD 400*b* or the like and loading the read program in the memory 400*c*. In other words, the process executes the same function as that performed by each of the processing units included in the self-service checkout register 50.

In this way, by reading and executing the program for executing the process of each of the functions of the self-service checkout register 50, the self-service checkout register 50 is operated as an information processing apparatus that performs an operation control process. Furthermore, the self-service checkout register 50 is also able to implement each of the functions of the self-service checkout register 50 by reading the programs from a recording medium by a medium reading device and executing the read programs. In addition, the programs described in another embodiment are not limited to be executed by the self-service checkout register 50. For example, the present embodiment may also be similarly used in a case in which another computer or a server execute a program, or in a case in which another computer and a server cooperatively execute a program with each other.

Furthermore, the programs that execute the process of each of the functions of the self-service checkout register 50 can be distributed via a network, such as the Internet. Furthermore, these programs can be executed by recording the programs in a recording medium that can be read by a computer readable medium, such as a hard disk, a flexible disk (FD), a CD-ROM, a magneto-optical disk (MO), a digital versatile disk (DVD), or the like, and read the programs from the recording medium by the computer.

The input device 400*e* detects various input operations performed by a user, such as an input operation performed with respect to the programs executed by the processor 400*d*. Examples of the input operation include a touch operation or the like. In a case of the touch operation, the self-service checkout register 50 further includes a display unit, and the input operation detected by the input device 400*e* may be a touch operation performed on the display unit. The input device 400*e* may be, for example, a button, a touch panel, a proximity sensor, or the like. In addition, the input device 400*e* reads a bar code. The input device 400*e* is, for example, a bar code reader. The bar code reader includes a light source and an optical sensor and scans the bar code.

The output device 400*f* outputs data that is output from the program executed by the processor 400*d* via external device, such as an external display device, that is connected to the self-service checkout register 50. In addition, in the case where the self-service checkout register 50 includes a display unit, the self-service checkout register 50 need not include the output device 400*f*.

According to an aspect of an embodiment, it is possible to suppress a label switch conducted in a self-service checkout register.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein an alert generation program that causes a computer to execute a process comprising:

acquiring video image of a person who is scanning a code of a commodity product to an accounting machine;

inputting the acquired video image to a zero-shot image classifier as a machine learning model to specify, from among a plurality of commodity product candidates arranged in a store in which the accounting machine is installed, a commodity product candidate that corresponds to the commodity product that is included in the video image;

acquiring an item of the commodity product that has been registered to the accounting machine by scanning the code of the commodity product to the accounting machine; and generating, when an item of the commodity product candidate specified by the machine learning model and the item of the commodity product acquired from the accounting machine do not match, an alert that indicates an abnormality of the commodity product that has been registered to the accounting machine.

2. The non-transitory computer-readable recording medium according to claim 1, wherein The machine learning model specifies, from among a plurality of commodity product candidates that are set in advance, a commodity product candidate that corresponds to the commodity product that is included in the video image.

3. The non-transitory computer-readable recording medium according to claim 2, wherein the inputting includes inputting the video image to an image encoder that is included in the machine learning model, inputting a plurality of texts that correspond to the plurality of commodity product candidates to a text encoder that is included in the machine learning model, and specifying, based on a degree of similarity between a vector of the video image that is output by the image encoder and a vector of the text that is output by the text encoder, the commodity product candidate that corresponds to the commodity product that is included in the video image from among the plurality of commodity product candidates.

4. The non-transitory computer-readable recording medium according to claim 3, wherein the machine learning model refers to reference source data in which an attribute of the commodity product is associated with each of a plurality of hierarchies, and the inputting includes specifying the commodity product candidate by inputting the video image to the image encoder, inputting a text to the text encoder for each attribute of the commodity product that is included in a first hierarchy, narrowing down, based on the degree of similarity between the vector of the video image that is output by the image encoder and the vector of the text that is output by the text encoder, the attribute that corresponds to the commodity product that is included in the video image from among the attributes of the commodity products that are included in the first hierarchy, inputting the video image to the image encoder, inputting a text to the text encoder for each attribute of the commodity product that is included in a second hierarchy obtained by narrowing down the attributes of the commodity products that are included in the first hierarchy, and specifying, based on the degree of similarity between the vector of the video image that is output by the image encoder and the vector of the text that is output by the text encoder, the attribute that corresponds to the commodity product that is included in the video image from among the attributes of the commodity products that are included in the second hierarchy.

5. The non-transitory computer-readable recording medium according to claim 1, wherein the generating includes generating an alert that warns of a mismatch between the item of the specified commodity product candidate and the item of the commodity product acquired from the accounting machine.

6. The non-transitory computer-readable recording medium according to claim 1, wherein the generating includes generating an alert that includes either a price difference of an amount of money for a purchase between the item of the specified commodity product candidate and the item of the commodity product acquired from the accounting machine or identification information on the accounting machine.

7. The non-transitory computer-readable recording medium according to claim 6, wherein the process further includes transmitting the alert to a terminal that is used by a store clerk.

8. The non-transitory computer-readable recording medium according to claim 1, wherein the accounting machine is a self-service checkout terminal.

9. The non-transitory computer-readable recording medium according to claim 2, wherein the inputting includes referring to, by the machine learning model, reference source data in which an attribute of the commodity product is associated with each of a plurality of hierarchies and specifying the plurality of commodity product candidates, and the reference source data is the plurality of commodity product candidates that are arranged in a store at a present moment from among candidates for a large number of types of commodity products that are targeted for a replacement.

10. An alert generation method comprising:

acquiring video image of a person who is scanning a code of a commodity product to an accounting machine;

inputting the acquired video image to a zero-shot image classifier as a machine learning model to specify, from among a plurality of commodity product candidates arranged in a store in which the accounting machine is installed, a commodity product candidate that corresponds to the commodity product that is included in the video image;

acquiring an item of the commodity product that has been registered to the accounting machine by scanning the code of the commodity product to the accounting machine; and generating, when an item of the commodity product candidate specified by the machine learning model and the item of the commodity product acquired from the accounting machine do not match, an alert that indicates an abnormality of the commodity product that has been registered to the accounting machine.

11. An information processing apparatus comprising:

a memory; and a processor coupled to the memory and the processor configured to:

acquire video image of a person who is scanning a code of a commodity product to an accounting machine;

input the acquired video image to a zero-shot image classifier as a machine learning model to specify, from among a plurality of commodity product candidates arranged in a store in which the accounting machine is installed, a commodity product candidate that corresponds to the commodity product that is included in the video image;

acquire an item of the commodity product that has been registered to the accounting machine by scanning the code of the commodity product to the accounting machine; and generate, when an item of the commodity product candidate specified by the machine learning model and the item of the commodity product acquired from the accounting machine do not match, an alert that indicates an abnormality of the commodity product that has been registered to the accounting machine.

* * * * *